United States Patent
Krunic et al.

(10) Patent No.: US 12,002,224 B2
(45) Date of Patent: Jun. 4, 2024

(54) APPARATUS AND METHOD FOR PROTECTING AGAINST ENVIRONMENTAL HAZARDS

(71) Applicant: HS VK IDEA FACTORY, LLC, Westminster, CO (US)

(72) Inventors: Veljko Krunic, Westminster, CO (US); Helen Stella, Westminster, CO (US)

(73) Assignee: HS VK IDEA FACTORY LLC, Westminster, CO (US)

( * ) Notice: Subject to any disclaimer, the term of this patent is extended or adjusted under 35 U.S.C. 154(b) by 150 days.

(21) Appl. No.: 17/215,319

(22) Filed: Mar. 29, 2021

(65) Prior Publication Data

US 2021/0304420 A1    Sep. 30, 2021

Related U.S. Application Data

(60) Provisional application No. 63/073,231, filed on Sep. 1, 2020, provisional application No. 63/050,518, filed on Jul. 10, 2020, provisional application No. 63/009,661, filed on Apr. 14, 2020, provisional application No. 63/000,732, filed on Mar. 27, 2020.

(51) Int. Cl.

| G06T 7/246 | (2017.01) |
| G06T 7/12  | (2017.01) |
| G06V 40/20 | (2022.01) |

(52) U.S. Cl.
CPC ............... G06T 7/248 (2017.01); G06T 7/12 (2017.01); G06V 40/28 (2022.01); *G06T 2207/30196* (2013.01); *G06T 2207/30204* (2013.01)

(58) Field of Classification Search
CPC . G06T 7/248; G06T 7/12; G06T 2207/30196; G06T 2207/30204; G06T 7/0002; G06V 40/28
See application file for complete search history.

(56) References Cited

U.S. PATENT DOCUMENTS

| 8,344,893 B1* | 1/2013 | Drammeh ............ G08B 21/245 340/573.1 |
| 2012/0150333 A1 | 6/2012 | De Luca |
| 2012/0255969 A1 | 10/2012 | Lin |
| 2013/0221027 A1* | 8/2013 | Woelbing ................. A47K 5/10 222/63 |
| 2016/0062469 A1* | 3/2016 | Abi-Rached ............ G06F 3/017 345/156 |
| 2016/0171709 A1 | 6/2016 | Kim |
| 2016/0314683 A1 | 10/2016 | Felch |
| 2016/0362051 A1* | 12/2016 | Clair-Chalupka ........ A61L 2/16 |
| 2017/0076042 A1 | 3/2017 | Katz |
| 2017/0156454 A1* | 6/2017 | Abadi ................. A44C 5/0053 |
| 2017/0215655 A1* | 8/2017 | Ophardt ................. G06F 3/167 |

(Continued)

*Primary Examiner* — Dhaval V Patel

(74) *Attorney, Agent, or Firm* — DUANE MORRIS LLP; Gregory M. Lefkowitz; Joaquin Hernandez

(57) ABSTRACT

The disclosures are directed to methods and apparatuses that allow for one or more of personal sanitizing/decontamination of a user, prevention of the touching of exposed parts of the user's body, tracking of surface sanitizing/decontamination status, tracking of the interpersonal distance, and sanitization of personal electronics (e.g., a mobile phone). In addition, data relating to a user's usage of the various components of the system may be tracked, and artificial intelligence (AI) techniques may be employed to mine for patterns of user behavior in the system.

26 Claims, 37 Drawing Sheets

(56) References Cited

U.S. PATENT DOCUMENTS

2017/0318964 A1* 11/2017 McKnight .................. A61L 2/22
2018/0314793 A1* 11/2018 Gross ..................... G16B 40/20
2020/0253683 A1*  8/2020 Amanatullah ......... G06V 20/00

* cited by examiner

APPARATUS AND METHOD FOR PROTECTING AGAINST ENVIRONMENTAL HAZARDS

CROSS-REFERENCES TO RELATED APPLICATIONS

The application incorporates by reference U.S. Provisional Patent Application No. 63/000,732, filed Mar. 27, 2020, and entitled "METHOD AND APPARATUS FOR THE IMPROVEMENT OF SANITATION AND SAFETY IN THE PRESENCE OF ENVIRONMENTAL HAZARDS," U.S. Provisional Patent Application No. 63/009,661, filed Apr. 14, 2020, and entitled "APPARATUS AND METHOD FOR PROTECTING AGAINST ENVIRONMENTAL HAZARDS," U.S. Provisional Patent Application No. 63/050,518, filed Jul. 10, 2020, and entitled "APPARATUS AND METHOD FOR PROTECTING AGAINST ENVIRONMENTAL HAZARDS," and U.S. Provisional Patent Application No. 63/073,231, filed Sep. 1, 2020, and entitled "SCRUB SPRAY," each incorporated in their entirety.

FIELD OF THE INVENTION

The disclosure relates generally to protecting against environmental hazards and tracking contamination.

BACKGROUND

Humans often operate in an environment that presents hazards, such as contamination from bacteria, fungi, and viruses. To operate safely in such an environment, a person may have to change their behavior to accommodate the environment. Unfortunately, such accommodation is often not intuitive and requires training and, at least some of the time, reinforcement. Even when properly trained, a person's behavior does not always comply with recommended best practices. For example, the person may not focus on their behaviors to assure they comply with the recommended practices, or they may be distracted or fatigued and thus not comply. In some examples, the person may not know how to comply with behavior recommendations, or may not be aware of any such behavior recommendations. Moreover, in at least some examples, any recommended behaviors, even if followed, may not be completely effective in avoiding the environmental hazards. For example, a person may unknowingly contact a surface that is contaminated (e.g., with a virus). As such, there are opportunities to address the protection of individuals operating in hazardous environments.

SUMMARY

In some embodiments, an apparatus includes a memory storing instructions, and a processor communicatively coupled to the memory. The processor is configured to execute the instructions to receive an image of a scene, and determine at least one marker within the scene. The processor is also configured to execute the instructions to determine a boundary of an object within the scene, and modify the boundary based on the at least one marker. Further, the processor is configured to execute the instructions to track a movement of the object within additional images of the scene based on the determined boundary.

In some embodiments, a method by at least one processor includes receiving an image of a scene, and determining at least one marker within the scene. The method also includes determining a boundary of an object within the scene, and modifying the boundary based on the at least one marker. Further, the method includes tracking a movement of the object within additional images of the scene based on the determined boundary.

In some embodiments, a non-transitory, computer readable medium includes instructions stored thereon. The instructions, when executed by at least one processor, cause the at least one process to perform operations including receiving an image of a scene, and determining at least one marker within the scene. The operations also include determining a boundary of an object within the scene, and modifying the boundary based on the at least one marker. Further, the operations include tracking a movement of the object within additional images of the scene based on the determined boundary.

In some embodiments, an apparatus includes a memory storing instructions, and a processor communicatively coupled to the memory. The processor is configured to execute the instructions to receive an image of a scene, and determine an object within the scene. The processor is also configured to determine a boundary of the object within the scene, and track a movement of the object within additional images of the scene based on the determined boundary.

In some embodiments, a method by at least one processor includes receiving an image of a scene, and determining an object within the scene. The method also includes determining a boundary of the object within the scene, and tracking a movement of the object within additional images of the scene based on the determined boundary.

In some embodiments, a non-transitory, computer readable medium includes instructions stored thereon. The instructions, when executed by at least one processor, cause the at least one process to perform operations including receiving an image of a scene, and determining an object within the scene. The operations also include determining a boundary of the object within the scene, and tracking a movement of the object within additional images of the scene based on the determined boundary.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
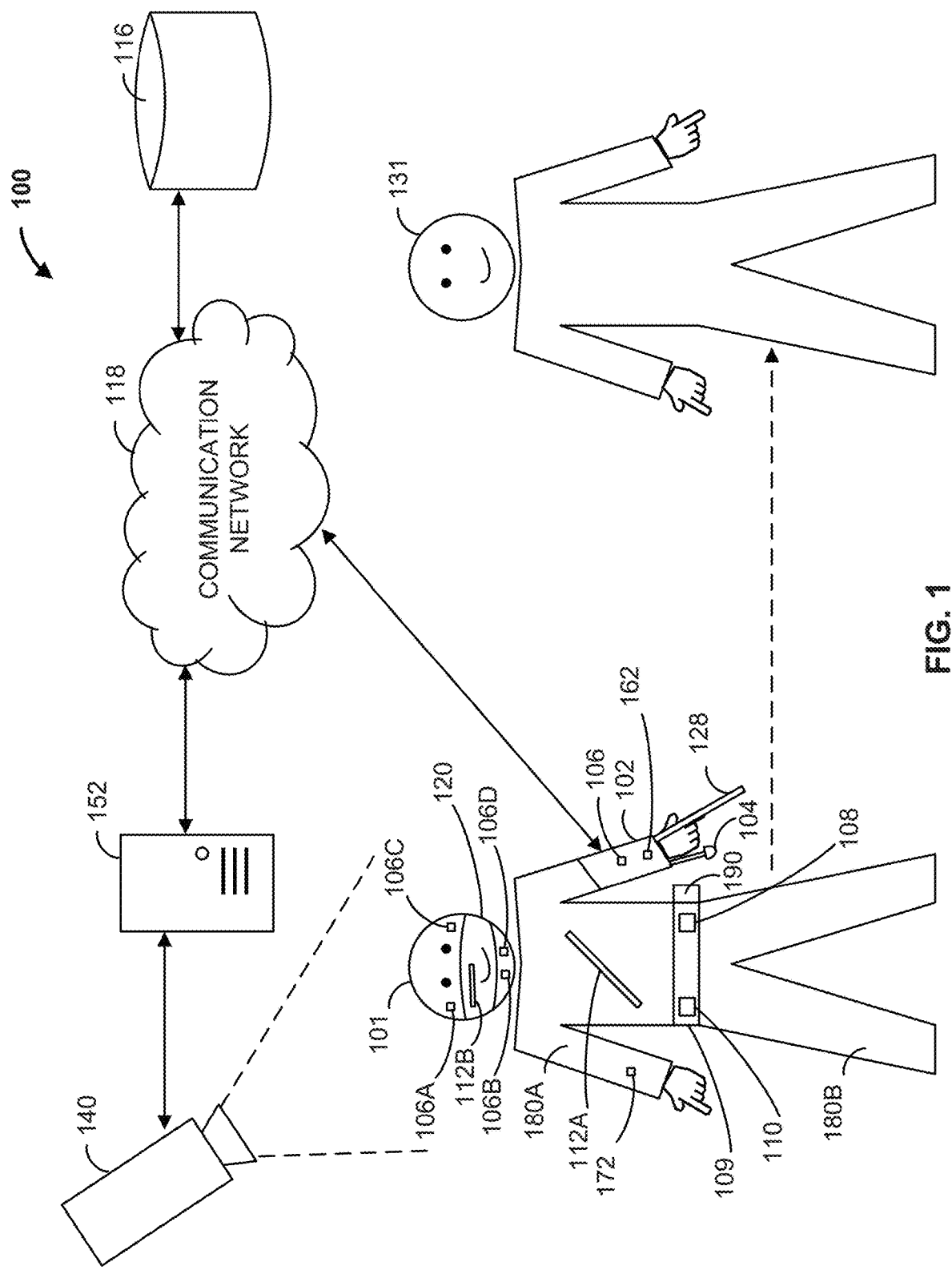
FIG. 1 is a block diagram of a personal sanitation and protection system in accordance with some embodiments.

Disclosed herein are embodiments of apparatus and corresponding methods that allow a user to sanitize their hands or other parts of their body, to know which surfaces are correctly cleaned, and to know which surfaces are clean and which ones are not (e.g., contaminated with a hazard, such as bacteria, fungi, or virus). In some examples, the embodiments allow for the aggregation of data relating to the utilization of such an apparatus, as well as for determining statistics about human perception of hazard levels in their environment. Further, and in some examples, the embodiments allow for determining and tracking the transmission of disease contamination, such as due to airborne transmissions.

For example, the embodiments may allow for the identification of people and places that may be at an increased risk of exposure to viruses such as the COVID-19 virus, bacteria, fungi, and other infectious diseases. In some examples, the embodiments may allow for easier use of personal sanitizers in the context of the disease outbreak (including, but not limited, on diseases caused by COVID-19), tracking of the cleanliness of the surface, and training in/tracking of proper use of the PPE. The methods and devices facilitate the observance of recommended best practices, such as maintaining recommended interpersonal distances, correcting the use of a PPE (e.g., a respirator), and the avoidance of touching one's face, eyes, or other exposed body part. The methods and device may, for example, determine whether a person correctly washes their hands (e.g., using the smart sink described herein). Some of the parts of the presented apparatus are wearable devices that are intended to be worn by the user.

More particularly, at least some embodiments are directed to methods and apparatus that allow for one or more of: 1) personal sanitation and/or decontamination; 2) prevention of contact with exposed parts of a person's body; 3) tracking of surface sanitation and/or decontamination status; 4) training in the use of handwashing techniques; 5) maintenance and/or enforcement of proper interpersonal distance; 6) the tracking of patterns of use of sanitation and/or decontamination activities; 7) detecting user behavior within an environment and employing spatial and/or time-based analytics based on the user behavior to understand human perception of the environment relating to a level of cleanliness of that environment; 8) tracking the movement of persons or parts thereof to determine contamination; 9) tracking objects which may be contaminated, and tracking objects which were correctly cleaned; and 10) tracking the travel of fomite, airborne, and droplet based contamination through physical spaces.

In some embodiments, a method and apparatus employ artificial intelligence (AI) processes to track objects, such as wash cloths or other cleaning objects or devices, to determine whether the objects have sanitized a surface, such as the surface of a table. The AI processes, which may include computer vision processes, may be executed to detect markers attached to the objects, and to detect movement of the objects. In some examples, the movement of the markers are tracked to determine movement of the objects. In some examples, the AI processes operate on virtual markers that are used to determine the boundaries of objects. Based on the determined boundaries, the method and apparatus may determine the parts of the surface that have been (e.g., properly) sanitized.

In some embodiments, a method and apparatus employ AI processes to identify one or more persons and/or one or more objects in an image. The apparatus may determine whether a person touched an object or another person, and may determine that the person (or part thereof) is contaminated if the person touched the object (and vice versa—that the object was contaminated by the person). In some embodiments the method and apparatus may recognize movement, and/or relative positions, of body parts, such as a hand. Further, the apparatus may determine, based on the determined movements, whether the hand was sanitized.

In some embodiments, a method and apparatus use personal sanitizers to, upon initiation, automatically clean body parts, such as hands, in the context of a disease outbreak (including, but not limited, on diseases caused by COVID-19), and further may enable manipulation of potentially contaminated objects in an environment around a person without needing to touch the objects by hand. In some embodiments, a method and apparatus train persons in proper handwashing. Further, in some embodiments, a method and apparatus determine events that trigger when hands should be washed, and/or when hands have been properly washed.

In some embodiments, a method and apparatus receive an image from a camera directed to a sink, and determine a location of a hand based on the image. Further, the method and apparatus determine a hand movement is satisfied based on the location and/or position of the hand. The method and apparatus also determine whether the hand is sanitized based on the hand movement and/or position, and generate and store data based on the determination of whether the hand is sanitized. In some examples, determining the hand movement is satisfied comprises determining an orientation of the hand based on the image, and comparing the orientation of the hand to a second image characterizing the hand movement.

In some embodiments, a method and apparatus receive sensor data from a sensor characterizing a movement and, based on the sensor data, provide a first signal to a motor to cause the dispensing of a sanitizing solution. Further, the method and apparatus provide a second signal to the motor to cause the dispensing of the sanitizing solution to cease. In some examples, the dispensing of the sanitizing solution is to a back of a hand.

In some embodiments, a method and apparatus receive a first image, and determine a first object in a room based on the first image. The method and apparatus also receive a second image, and determine a second object in the room based on the second image. Further, the method and apparatus determine the first object has contaminated the second object. The method and apparatus also generate contamination graph data characterizing that the first object has contaminated the second object, and store the contamination graph data in a database. In some examples, determining the first object has contaminated the second object comprises determining the first object has touched the second object. In some examples, determining the first object has contaminated the second object comprises determining the first object has come within a distance of the second object. In some examples, determining the first object has contaminated the second object comprises determining the first object is within an airflow distance of the second object.

In some embodiments, a method and apparatus detect a surface's cleanliness by tracking when and where all or a part of the surface was cleaned. In some embodiments, a method and apparatus track interpersonal distances, and further may notify persons when an interpersonal distance is breached.

In some examples, a method and apparatus improve a person's safety when operating in an environment in which a bacteriological, chemical, fungi, viral, radiation, atmospheric, or other environmental hazard requires the use of sanitation and/or PPE. The method and apparatus may track patterns of use of personal sanitation (e.g., washing hands), and patterns of use of PPE. In some examples, the method and apparatus employ data mining, machine learning, and/or AI techniques to track the patterns of use. The tracked information may be used to understand the spread and patterns of diseases, for example.

In some examples, a method and apparatus improve hand and surface sanitation by allowing a person to sanitize their hands without the need for touching personal devices. In some examples, a method and apparatus track the status of surface sanitation. In some examples, a method and apparatus alert a person when they are about to touch a body part, such as their eyes or face, or other parts of their body.

Some embodiments are directed to an apparatus and method that train a person about the wrong use of the protective equipment by detecting patterns of inappropriate use of the protective equipment.

In some examples, a method and apparatus aggregate data related to the use of personal sanitation devices and detected changes in patterns of the use of such devices regarding time and/or spatial factors, as well as data related to the proximity to other people.

The apparatus, systems, and methods described herein may be designed to be commercially practicable and usable for any past and/or possible future epidemic, pandemic, or other type of environmental hazard. In some examples, the apparatuses are manufactured to be aesthetically pleasing so that they may be worn as jewelry.

In some embodiments, a computing device is configured to: receive image data of a scene; detect at least one marker within the scene based on the image data; determine a sanitized portion of an object based on the detected marker; and generate display data characterizing the sanitized portion of the object.

In some embodiments, a computing device is configured to: receive image data of a scene; detect presence of markers within the scene based on the image data; determine boundaries of the objects on the image; optionally modify determined boundaries of the objects, based on information in the markers; determine a sanitized portion of an object based on the position of cleaning elements (such is cleaning cloth) in image data; and generate display data characterizing the sanitized portion of the object.

In some embodiments, a computing device is configured to: receive first image data of a scene; detect a first position of a cleaning cloth within the scene based on the first image data; receive second image data of the scene; detect a second position of the cleaning cloth within the scene based on the second image data; detect a movement of the cleaning cloth based on the first position and the second position; determine a sanitized portion of an object based on the determined movement; and generate display data characterizing the sanitized portion of the object.

In some embodiments, a computing device is configured to: receive first image data of a scene; detect a first position of a cleaning cloth within the scene based on the first image data; receive second image data of the scene; detect a second position of the cleaning cloth within the scene based on the second image data; detect a movement of the marker based on the first position and the second position; determine a sanitized portion of an object based on the determined movement; and generate display data characterizing the sanitized portion of the object.

In some embodiments, a computing device is configured to: receive first image data of a scene; detect a first position of a marker within the scene based on the first image data; receive second image data of the scene; detect a second position of the marker within the scene based on the second image data; detect a movement of the marker based on the first position and the second position; determine a sanitized portion of an object based on the determined movement; and generate display data characterizing the sanitized portion of the object.

In some embodiments, a computing device is configured to: receive first image data of a scene; determine initial object boundary based on first image data; detect a first position of a marker within the scene based on the first image data; modify initial object boundary based on the information in marker; receive second image data of the scene; determine second initial object boundary based on second image data; detect a second position of the marker within the scene based on the second image data; modify second initial object boundary based on the information in marker; detect a movement of the object based on the first position and the second position of object, and its modified boundaries in first and second image; determine a sanitized portion of an object based on the determined movement; and generate display data characterizing the sanitized portion of the object.

In some embodiments, a computing device is configured to: receive data from an accelerometer mounted on a subject's arm; determine a rotation of the subject's arm based on the data; determine that the rotation matches a predetermined gesture; and activate an alarm. In some examples, the computing device determines a movement of the subject's arm based on the data, and determines whether the rotation and the movement matches the predetermined gesture.

In some embodiments, a method comprises: dispensing sanitizing material in response to a first input; extending a manipulator in response to a second input; detecting a distance from at least one sensor; and enabling an alarm when the detected distance is below a threshold.

In some embodiments, a method comprises: receiving, by a computing device mounted on a subject's arm, a signal from a sensor located on the subject's face; determining a distance from the sensor based on the signal; determining whether the distance is below a threshold; and activating an alarm.

In some embodiments, a method comprises: receiving, by a computing device, data from an accelerometer mounted on a subject's arm; determining a rotation of the subject's arm based on the data; determining whether the rotation matches a predetermined gesture; and activating an alarm. In some examples, the method comprises determining a movement of the subject's arm based on the data, and determining that the rotation and the movement matches the predetermined gesture.

Among other advantages, at least some embodiments may protect a user from environmental hazards by facilitating and directing better use of protective gear in a way that reduces user exposure to environmental risks. Further, some embodiments may detect whether hands have been properly washed, and some embodiments may train persons to properly wash hands (e.g., for sanitation purposes). At least some embodiments may also allow for more convenient personal sanitizing processes. Further, at least some embodiments may allow for real-time tracking of the cleaning of surfaces, as well as for analyzing and tracking various patterns of the cleaning of surfaces and of the use of PPE. In addition, at least some embodiments may allow for human protection in the presence of environmental hazards caused by any virus, bacteria, fungi, chemical, or other hazard. Examples of such hazards include (but are not limited to) diseases such as COVID-19, MRSA, SARS, MERS, and Ebola, as well as situations in which there is an outbreak of drug-resistant bacteria or fungi, for example.

Moreover, the various embodiments may improve the safety of the user's operation in any situation in which bacteriological, chemical, viral, radiation, fungi, atmospheric, or other environmental hazards require the use of the sanitizing material and/or Personal Protection Equipment (PPE). Furthermore, the various embodiments may improve human protection in the presence of any disease for which available prevention methods include better sanitation and hygiene. Persons of ordinary skill in the art having the benefit of these disclosures may recognize other advantages to the various embodiments as well.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a personal sanitizing and protection system 100 that may sanitize and protect a person 101 from various environmental hazards. The personal sanitizing and protection system 100 includes hand sanitizing device 102, personal protection equipment (PPE) 180A, 180B, or both. The PPE can include a first PPE 180A that the person 101 wears over an upper portion of their body (e.g., over the person's 101 chest and arms) and a second PPE 180B that the person wears over a lower portion of the body (e.g., over legs of the person 101). In some examples, PPE 180 may include one or more of a facemask, a face shield, eyeglasses, boots, gloves, and a helmet. The hand sanitizing device 102 can be worn around an arm of person 101. For example, the hand sanitizing device 102 may be worn around the arm of the person 101. In embodiments that include the PPE, the hand sanitizing device 102 can be worn on the outside of PPE 180A or, in some examples, on the inside of PPE 180A. In some embodiments, components of hand sanitizing device 102 may be worn on different parts of PPE 180A, 180B, or on different parts of person's 101 body.

The hand sanitizing device 102 includes a sanitizer 104 that provides sanitization material, such as antibacterial liquid (e.g., lotion, gel, foam, etc.), to the person 101. For example, the sanitizer 104 may provide sanitizing material to the person's 101 hand. The hand sanitizing device 102 also includes a manipulator 128 that allows for manipulation of objects, such as buttons, doorknobs, keys of a keyboard, etc.).

Hand sanitizing device 102 may further serve as a controller for one or more components of the personal sanitizing and protection system 100. For example, hand sanitizing device 102 may be communicatively coupled to one or more of PPE effectors 112A, 112B, sensors 106A, 106B, 106C, 106D, 108, and alarm 110 as further described below.

Hand sanitizing device 102 may also be communicatively coupled with a computing device 152 and a database 116 over communication network 118. Computing device 152 may be a server, a web server, a cloud-based server, a computer, a laptop, a portable device such as a cellphone or a smartphone, or any other suitable computing device. Database 116 can be a remote storage device, such as a cloud-based server, a disk (e.g., a hard disk), a memory device on another application server, a networked computer, or any other suitable remote storage. Although shown remote to hand sanitizing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), a Body Area Network (BAN), a Personal Area Network (PAN), a Near-me Area Network (NAN), or any other suitable network. Communication network 118 can provide access to, for example, the Internet.

Figure 2:
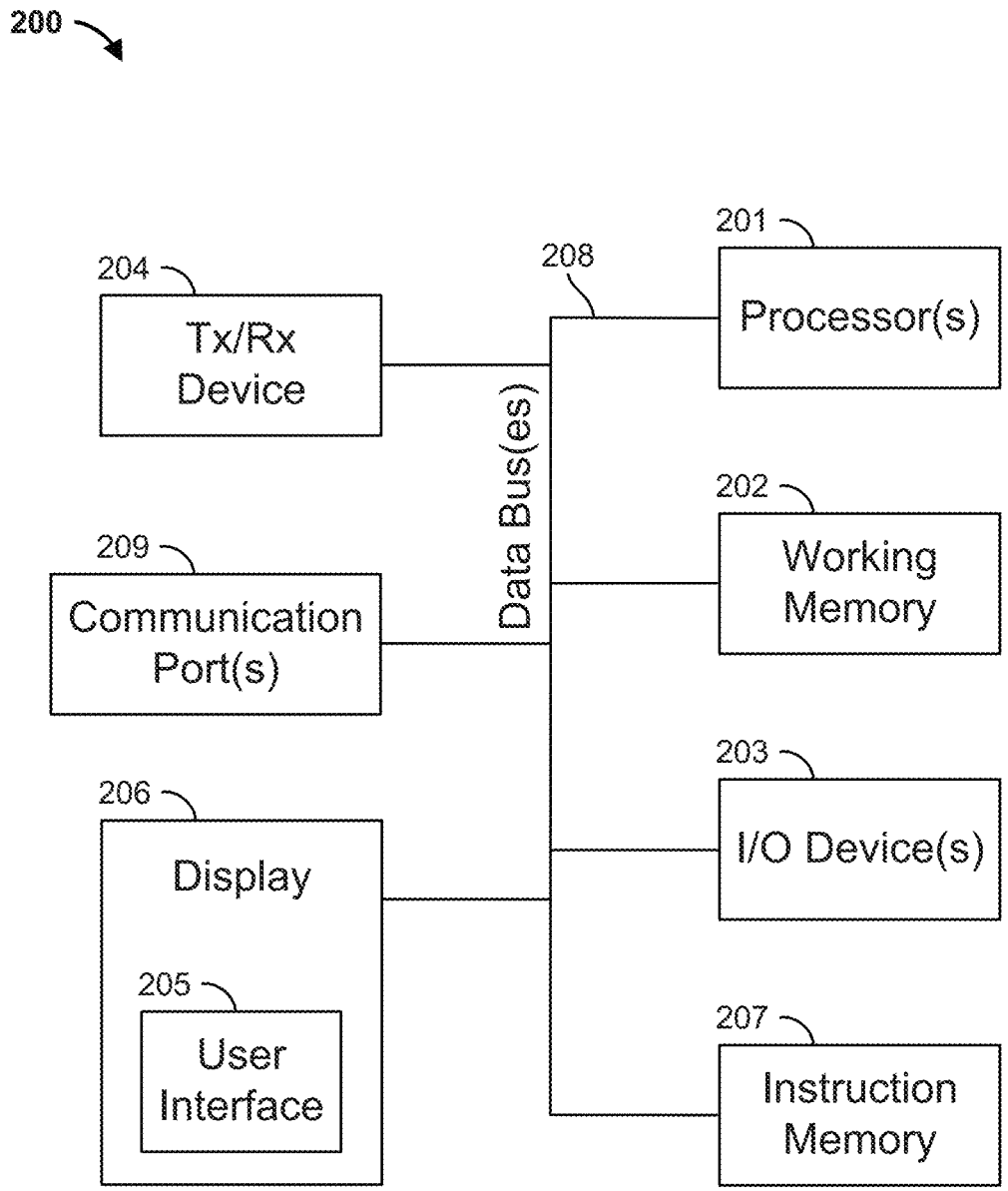
FIG. 2 is a block diagram of a personal sanitation and protection computing device in accordance with some embodiments.

FIG. 2 illustrates an example of a control device 200. In some examples, hand sanitizing device 102 includes control device 200. In this example, control device 200 includes one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory, an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of system data classification computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 209 allow for the transfer (e.g., uploading or downloading) of data.

Display 206 can display user interface 205. User interfaces 205 can enable user interaction with control device 200. For example, user interface 205 can be a user interface for an application ("App") that allows a user to configure hand sanitizing device 102. In some examples, a user can interact with user interface 205 by engaging input-output devices 203. In some examples, display 206 can be a touchscreen, where user interface 205 is displayed on the touchscreen. In some examples, display 206 is a UI Communication Effector that can communicate using modalities such as audio, visual, temperature, smell, or haptic.

Transceiver 204 allows for communication with a network, such as communication network 118 of FIG. 1. For example, if communication network 118 is a cellular network, transceiver 204 is configured to allow communications with the cellular network. Processor(s) 201 is operable to receive data from, or send data to, a network, such as communication network 118, via transceiver 204.

Referring back to FIG. 1, hand sanitizing device 102 may include one or more manipulators 128. Manipulator 128 may be a stick that allows for the pressing of buttons in an elevator, a hook that allows for the operation of a lever-style doorknob, a clamp, or any other device that allows for manipulation of an object or the environment. Additionally, PPE 180A and/or PPE 180B could include one or more PPE effectors 112A. Each PPE effector 112A may allow the person 101 to manipulate an area underneath PPE 180A and/or PPE 180B. For example, each PPE effector 112A may be communicatively coupled to hand sanitizing device 102. In some examples, a PPE effector 112A is communicatively coupled to hand sanitizing device 102 via a wire, such as a wire that run underneath PPE 180A and/or PPE 180B. In some examples, a PPE effector 112A is wirelessly coupled to hand sanitizing device 102, such as via a Bluetooth®, ZigBee®, WiFi®, BAN, PAN, NAN, or any other suitable wireless connection. As described further below, hand sanitizing device 102 may detect various gestures made by person 101 and, in response, transmit a signal to PPE effector 112A to cause PPE effector 112A to move. As such, person 101 may cause PPE effector 112A to move to scratch an area of skin underneath PPE 180A.

Person 101 also wears a mask 120. Mask 120 may be any suitable mask, such as a surgical mask, a respirator (e.g., N95 mask), that includes a PPE effector 112B that, for example, allows for manipulation of an area underneath mask 120. For example, PPE effector 112B may allow person 101 to scratch an area of their face underneath mask 120 without having to remove or adjust mask 120. As with PPE effector 112A, PPE effector 112B may also be communicatively coupled to hand sanitizing device 102 via a wired or wireless connection.

In some embodiments, the person 101 can wear a belt 109 to which various personal sanitizing and protection system 100 components can be attached. For example, sensor 108, alarm 110, and portable sanitizing device 150 are attached to belt 109. In some examples, sensor 108 and alarm 110 are communicatively coupled to hand sanitizing device 102 via a wired or wireless communication link. In some examples, sensor 108 and/or alarm 110 are located on or within hand sanitizing device 102.

Sensor 108 may be a passive sensor, an infrared (IR) sensor, a heat sensor, a proximity detector, a Hall effect sensor, a magnetometer, a time of flight sensor, a radar sensor, a laser sensor, or any other suitable sensor for detecting distance from objects. In some examples, alarm 110 may be any suitable device that alerts the user. For example, alarm 110 may be an audible alarm, such as a buzzer, or may be a vibrating device. In some examples, alarm 110 may vibrate in addition to or instead of providing an audible alarm. For example, the user may configure alarm 110 to produce an audible alarm and/or vibrate when enabled. In some examples, sensor 108 is directly communicatively coupled to alarm 110 via a wired, or wireless, communication link.

Sensor 108 may detect whether person 101 is within a threshold distance of another object, such as another person 131. If sensor 108 detects that person 101 is within the threshold distance of the other object, sensor 108 may cause alarm 110 to provide an indication, such as a sound or a vibration. For example, sensor 108 may transmit to hand sanitizing device 102 data indicating a person 131 is closer than a threshold distance from the wearer. Hand sanitizing device 102 may receive the data and determine, based on the data, whether the detected object (e.g., person 131) is within a threshold distance of the wearer (e.g., sensor 108). For example, hand sanitizing device 102 may compare the distance received in the data to the threshold distance. The threshold distance may be preprogrammed within hand sanitizing device 102, or may be obtained from database 116, for example. If the distance is less than or equal to the threshold distance, hand sanitizing device 102 may activate one or more alarms 110 to alert person 101 that they are within the threshold distance to another object.

Sensors 106A, 106B, 106C may operate similarly to sensor 106. In this example, sensors 106A, 106B, 106C are positioned on various areas of a face or facemask 120 of person 101. In some examples, sensors 106A, 106B, 106C may be located on the hands, or other areas of person's 101 body. Each of sensors 106A, 106B, 106C may be a passive sensor, an IR sensor, a heat sensor, a proximity detector, a Hall effect sensor, a magnetometer, a time of flight sensor, a radar sensor, a laser sensor, a marker suitable for optical detection, a magnet, or any other suitable sensor for detecting distance from an object. Hand sanitizing device 102 may be communicatively coupled to each of sensors 106A, 106B, 106C, and may determine a distance to each of sensors 106A, 106B, 106C. For example, hand sanitizing device 102 may receive a signal (e.g., data) from each of sensors 106A, 106B, 106C and, based on each signal, may determine a distance of the hand sanitizing device 102 to each of the sensors 106A, 106B, 106C. Hand sanitizing device 102 may further determine whether any of the distances is below a corresponding threshold. For example, hand sanitizing device 102 may store a corresponding threshold distance for each of the 106A, 106B, 106C. The threshold distances may be the same, in some examples, or may be different in other examples. For example, the threshold distance from sensor 106C may be less than the threshold distance to 106A. If hand sanitizing device 102 determines that any distance is below the corresponding threshold, hand sanitizing device 102 may enable alarm 110 (e.g., cause alarm 110 to make an audible noise). As will be apparent, this system can be used to notify the user that their hand is too close to their face. The alarm 110 serves to remind and train the user to keep their hands away from their face to prevent transmission of disease caused by germs, bacteria, fungi, or viruses contacting the wearer's mouth, nose, or eyes.

In some embodiments, sensors 106A, 106B, 106C are markers located on the face and/or mask of person 101. The markers may be primarily (or exclusively) visible in parts of the light spectrum that lay outside of the visible light spectrum. In one example, a camera 140 may be mounted on an arm of the person 101 and configured to capture images that include the markers. The markers may reflect IR/UV light from the camera. The markers may have known dimensions, and the camera 140 may measure a distance to the markers based on the markers apparent size in the images, the camera's known field of view, and the knows dimensions of the markers.

In some embodiments, portable sanitizing device 150 allows for the sanitizing of various items, such as personal electronic devices. For example, person 132 may place an item, such as a cellphone, within portable sanitizing device 150. Person 132 may then provide an input to portable sanitizing device 150 and, in response, portable sanitizing device 150 may begin sanitizing the item. In some examples, upon completing the sanitizing of the item, portable sanitizing device 150 provides an indication that the item has been sanitized. For example, portable sanitizing device 150 may include an external LED that illuminates when an item has been completely sanitized. In some examples portable sanitizing device 150 detects when the item has been removed. In response, portable sanitizing device 150 may cause the LED to turn off.

Personal sanitizing and protection system 100 may further include one or more cameras 140 communicatively coupled to computing device 152 and/or hand sanitizing device 102 over communication network 118. Each camera 140 is operable to capture images and/or, in some examples, video. For example, each camera 140 may be a video camera, a digital camera, a satellite-based camera, a security camera, or any other suitable camera. Each camera 140 may capture images (e.g., still images, frames of video), and store the captured images in database 116.

The images may be captured in any part of the spectrum (e.g., visual spectrum, IR spectrum, UV spectrum, etc.). The video camera 140 may be specifically tuned to be sensitive in the spectrum of human body temperature, and as such be coupled with the rest of the system 100 to detect whether a person 131 with a fever is nearby (e.g., within a threshold distance of) the person 101.

Computing device 152 may obtain the images from database 116, and determine whether person 101 is properly using PPE 180A, 180B. For example, computing device 152 may execute one or more artificial intelligence algorithms, such as machine learning algorithms, that operate on the obtained images to determine whether person 101 has performed one or more predetermined actions, such as touching of the person's 101 face or the improper washing of person's 101 hands. If computing device 152 determines that the person 101 performed any of the predetermined actions, computing device 152 may generate and transmit a communication identifying the predetermined action to the wearer. For example, the communication may be an email, a text message, or a message displayed within an application that executes within an electronic device such as a cellphone, for example. The communication may be transmitted to person 101, to a health facility, or to any other entity. For example, computing device 152 may allow for the configuring of recipients to the communications, and the configuration may be stored in database 116. In some examples, the communications with person 101 may include audio, visual, temperature, or haptic communications.

In some examples, computing device 152 receives data from hand sanitizing device 102, and may determine whether the person 101 performed any of the predetermined actions based on the received data. For example, hand sanitizing device 102 may transmit sensor data, such as sensor data from one or more of sensors 106A, 106B, 106C, 108, recorded distances from one or more of sensors 106A, 106B, 106C, 108, and alarm data indicating whether alarm 110 was activated.

In some examples, the hand sanitation device 102 employs a sensor 106 to detect angular velocities. For example, the sensor 106 may be a gyroscope. In some examples, the hand sanitation device 102 may employ an accelerometer and a gyroscope, and may detect the user's gesture based on data from the accelerometer (accelerometer data) and data from the gyroscope (gyroscope data).

In some examples, the hand sanitation device 102 employs a button 162 to determine when a user wishes to sanitize their hands. For example, the hand sanitation device 102 may dispense the sanitizing material upon detecting that the button has been pressed (e.g., pushed).

In yet other examples, to dispense the sanitizing material, hand sanitation device 102 may include an RFID token 172 on an opposite arm or hand of the user (e.g., opposite of the arm with the hand sanitation device 102). Hand sanitation device 102 may include an RFID detector, and may dispense the sanitation material when the RFID token is detected (e.g., by processor 201). In some examples, hand sanitation device 102 employs proximity detection using sensors such as, but not limited to, Hall effect sensors, IR or radar sensors, laser sensors, time of flight sensors, ultrasonic sensors, or tilt sensor/ball switches. The hand sanitation device 102 may dispense the sanitizing material when a threshold distance is detected to the one or more sensors. In some examples, hand sanitation device 102 employs sound-based activation (e.g., by detecting a particular audible command) to dispense the sanitizing material.

Figure 3:
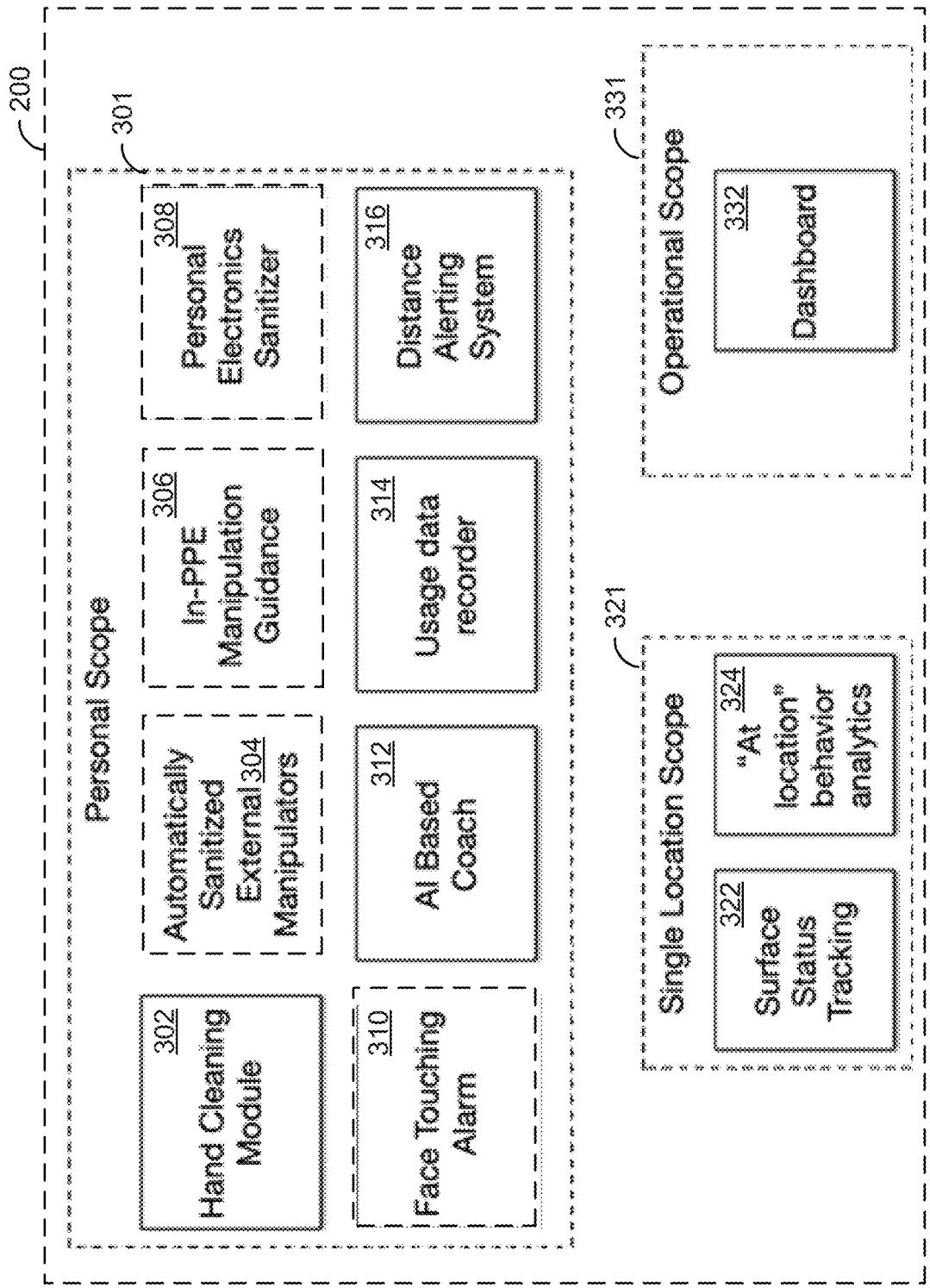
FIG. 3 is a block diagram of modules that can be performed by the personal sanitation and protection computing device of FIG. 2 in accordance with some embodiments.

FIG. 3 illustrates various modules 301, 321, 331 of the control device 200 that may be implemented by, for example, the hand sanitizing device 102 of FIG. 2, or other devices as described herein (e.g., computing device 152, component 3210, component 3220, or system 900). For example, the various modules 301, 321, 331 may be implemented by processor 201 executing instructions stored in instruction memory 207. The various modules 301, 321, 331 include personal scope modules 301, location scope modules 321, and operation scope modules 331.

Personal scope modules 301 include hand cleaning module 302, AI-based coach module 312, usage data recorder module 314, and distance alerting system module 316. In some examples, personal scope modules 301 may include one or more of automatically sanitized external manipulators module 304, in-PPE manipulation guidance module 306, personal electronics sanitizer module 308, and face touching alarm module 310.

Hand cleaning module 302 identifies and characterizes sanitizing and/or cleaning functions of hand sanitizing device 102. Automatically sanitized external manipulator module 304 identifies and characterizes functions of hand sanitizing device 102 to control manipulator 128. In-PPE manipulation guidance module 306 identifies and characterizes functions for control of PPE effectors 112A, 112B. Personal electronics sanitizer 308 identifies and characterizes functions of the portable sanitizing device 150.

Face touching alarm module 310 identifies and characterizes functions of hand sanitizing device 102 associated with detecting when person 101 is about to touch their face. For example, the functions may include determining a distance from a sensor 106A, 106B, 106C, and enabling, or disabling, alarm 110.

AI-based coach module 312 identifies and characterizes computing device 152 functions related to determining when person 101 performs one or more predetermined actions. For example, AI-based coach module 312 may identify and characterize functions related to obtaining images from database 116, algorithms to detect predetermined actions based on the images, and for transmitting communications identifying the detected predetermined actions.

In some examples, AI-based coach module 312 can include and/or apply one or more artificial intelligence models (e.g., algorithms), such as computer vision models or machine learning models, to track objects within received images. For example, AI-based coach module 312 may receive images from camera 140, and may track objects within the images based on applying an artificial intelligence model to the images. For example, and based on received images, a body part, such as a hand or foot, of a person may be tracked based on applying an artificial intelligence model to the received images. The body part may be tracked across several images, such as images that make up a video, to determine one or more movements of the body part. Further, and based on the determined movements, control device 200 may determine whether the body part has been thoroughly washed.

Usage data recorder module 314 identifies and characterizes functions of hand sanitizing device 102 associated with obtaining and storing data, such as sensor data, sanitizing device 102 usage data, and event data. For example, sensor data may include data received from one or more sensors 106A, 106B, 106C, 108, and event data may include determinations that a distance is within a corresponding threshold. The event data may further include timestamp data, such as a date and/or time of when the distance was determined to be within the corresponding threshold. In some examples, the functions include storing the data in database 116.

Distance alerting system module 316 identifies and characterizes functions of hand sanitizing device 102 associated with determining that a detected distance is within a corresponding threshold. For example, distance alerting system module 316 may include functions related to detecting a distance from a sensor 108 to a person 131, and enabling an alarm 110 if the distance is within a predetermined threshold.

Single location scope modules 321 include surface status tracking module 322 and analytics module 324. Surface status tracking module 322 may identify and characterize functions of a cleaning detection system to track whether objects have been cleaned or, in some examples, contaminated, as described herein. Analytics module 324 may identify and characterize functions related to determining and storing analytics of the cleaning detection system as described herein. Analytics module 324 may also use buzzers 110 to "guide" a person toward a preferred path through an environment (e.g., to plan path that avoids biggest concentration of the people.

Operational scope modules 331 include a dashboard module 332, which identifies and characterizes functions related to the presentation of device usage information, cleaning detection system data, and hand cleaning module 302 data. For example, dashboard module 332 may identify and characterize functions related to detected abnormal patterns of usage information, including ineffective use of PPE 180A, 180B, and coming within threshold distances of others, as described herein. As another example, surface status tracking module 322 may apply one or more artificial intelligence models to images (e.g., images received from camera 140) to track an object, such as a cloth, along a surface, such as a table top. Control device 200 may track the object across received images to determine areas of the surface that have been cleaned by the object. Various algorithms, such are AI and machine learning algorithms, may be employed to analyze patterns of data made available to the dashboard module 332.

Figure 4:
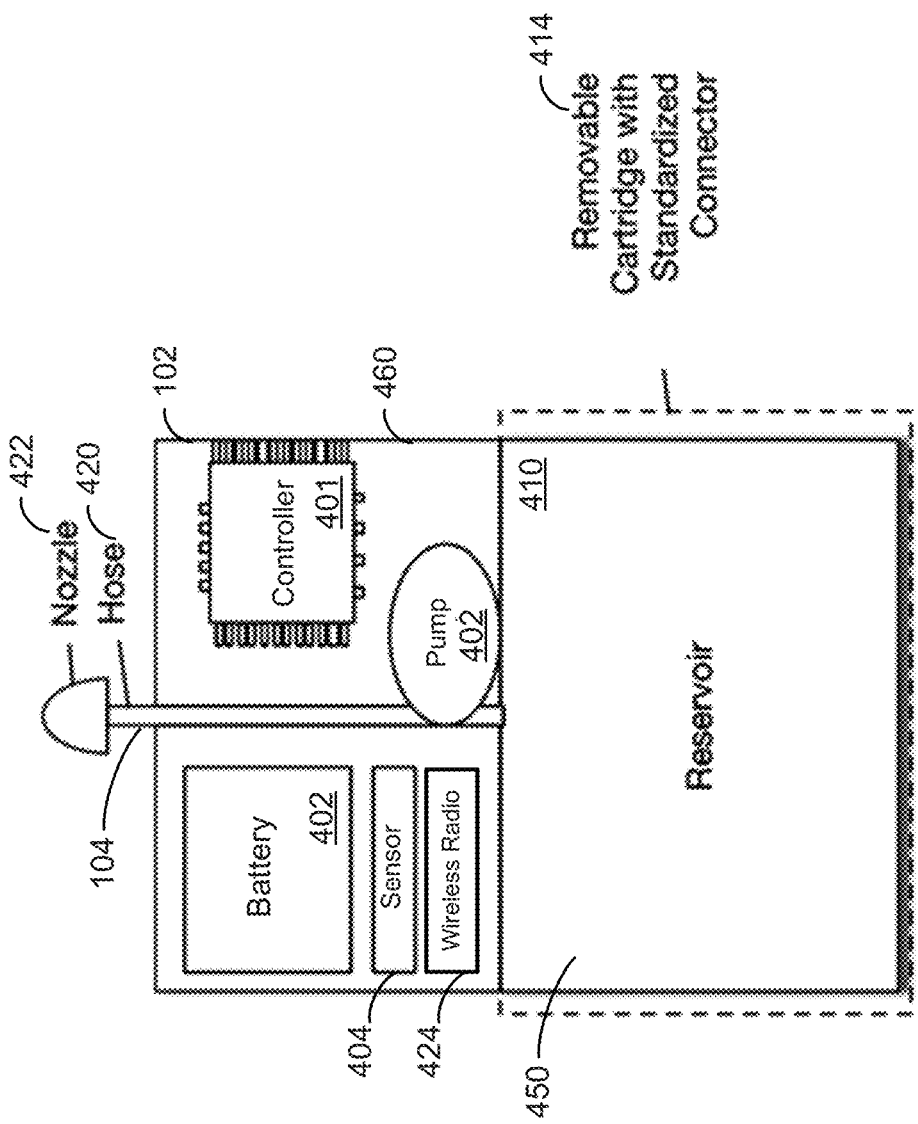
FIG. 4 illustrates a block diagram of a hand sanitation device in accordance with some embodiments.

FIG. 4 illustrates an embodiment of hand sanitizing device 102. In this example, an enclosure 460 includes a pump 402, a controller 401 (e.g., a processor 201), a battery 402, a sensor 404, a wireless radio 424, and a reservoir 410. Sensor 404 may be accelerometer, optical sensor (operating in any suitable part of light spectrum), IR sensor, proximity sensor, laser sensor, motion detection sensor, Hall effect sensor, radar-based sensor, or any other suitable sensor or combination of such sensors. The pump 402 is employed to provide sanitizing material 450 from reservoir 410 through hose 420 and out through nozzle 422. Pump 402 may be a peristaltic pump, or any suitable pump, and may be controlled by controller 401. For example, controller 401 may provide a first signal to pump 402 to activate pump 402, thereby causing pump 402 to pump sanitizing material 450 out of reservoir 410. Controller 401 may also provide a second signal to pump 402 to deactivate pump 402. In some examples, various gestures detected by controller 401, such as gestures detected based on accelerometer data from accelerometer 404, may correspond to different amounts of sanitizing material 450 to be dispensed. Further, controller 401 may aggregate usage data, such as the amount of sanitation material dispensed, and may provide the usage data to wireless radio 424 for transmission (e.g., such as to network 118).

Figure 5:
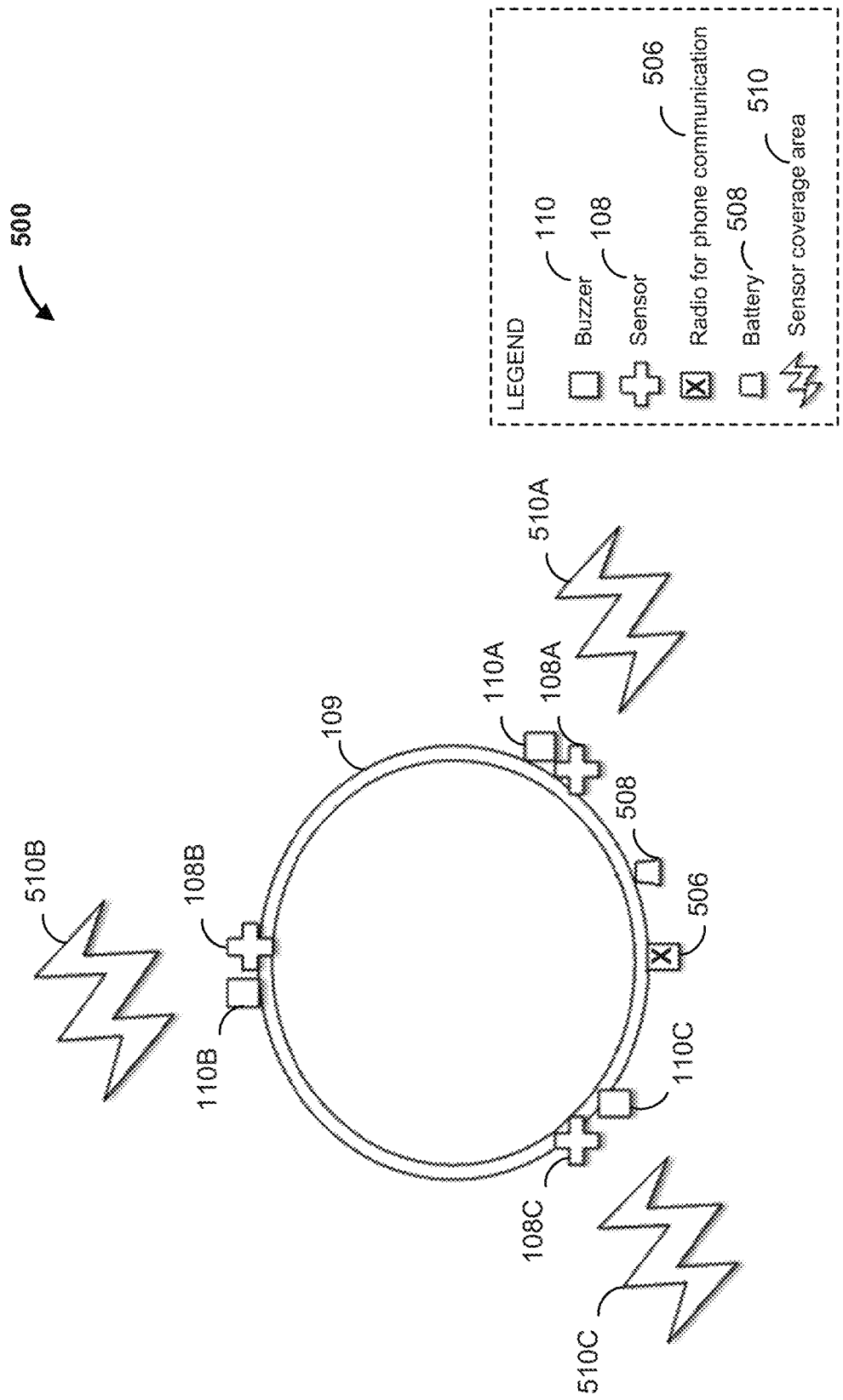
FIG. 5 illustrates a block diagram of a distance alerting system in accordance with some embodiments.

FIG. 5 illustrates a distance alerting system 500 that includes at least one buzzer 110, at least one sensor 108, at least one radio 506, and at least one battery 508 mounted to belt 109. Distance alerting device 500 allows for the detection of objects within coverage areas 510. For example, sensor 108A may detect objects within sensor coverage area 510A. In some examples, when sensor 108A detects an object within sensor coverage area 510A, sensor 108A transmits a signal to buzzer 110A. In response, buzzer 110A sounds an audible alarm. Similarly, sensor 108B may detect objects within sensor coverage area 510B, and may cause buzzer 110B to sound an audible alarm when an object is detected. Sensor 108C may detect objects within sensor coverage area 510C, and may cause buzzer 110C to sound an audible alarm when an object is detected within a sensor coverage area.

In some examples, buzzer 110C sounds an audible alarm at a higher frequency as the distance to the person or object decreases. For example, as the distance from a sensor 108 to an object decreases, computing device 200 may cause the buzzer 110C to sound an alarm at higher frequencies. For example, the computing device 200 may store a frequency table that maps ranges of distances to one or more frequencies, and may cause the buzzer 110C to sound an audible alarm at a frequency based on the frequency table. In some examples, computing device 200 causes the volume of the buzzer 110C to change as the distance to the person or object changes.

In some examples, each buzzer 110A, 110B, 110C is a vibrator that includes a vibration motor. The vibrator vibrates when enabled. In some examples, the vibration motor that is closest to the direction from which the distance is breached is enabled, so that the user is aware of both the fact that that a recommended interpersonal distance has been breached, as well as a direction or side from which the recommended interpersonal distance was breached.

In some examples, the vibrator vibrates at a higher frequency as the distance to the person or object decreases. For example, as the distance from a sensor 108 to an object decreases, computing device 200 may cause the vibrator to vibrate at higher frequencies. The computing device 200 may store a frequency table that maps ranges of distances to one or more frequencies, and may cause the vibrator to vibrate at a frequency based on the frequency table, for example.

In some examples, sensors 108A, 108B, 108C transmit a signal to a computing device 200, such as computing device 200 of hand sanitizing device 102, when an object is detected. The computing device 200 determines whether the object is at a distance within a threshold, such as a threshold preconfigured and stored in database 116. The threshold may be an interpersonal distance recommendation or requirement, such as 6 feet. If the object is within the threshold, computing device 200 may enable the corresponding buzzer 110A, 110B, 110C to send an audible or haptic alarm. In some examples, computing device 200 transmits event data, such as the detection of objects and, in some examples, timestamp data of when the objects were detected, to computing device 152. Computing device 152 may store the event data in database 116.

As such, distance alerting system 500 allows a user to recognize when an interpersonal distance between the user and other objects or people are violated. Distance alerting system 500 may guide a user to move in a safe direction, for example. For example, a person 101 may not be a particularly good judge of distance, such as determining how far 6 feet is from the person. Moreover, recommended interpersonal distances may change, or be different, for various hazards. In some examples, a person may not even know that an interpersonal distance recommendation has changed. In some examples, even if a person is aware of the interpersonal distance recommendation, the person may not see another person approaching from behind them, and thus may not act to avoid violating the interpersonal distance recommendation.

To alleviate these concerns and others, distance alerting system 500 allows for the configuration of interpersonal distances. In some examples, the interpersonal distances may be configured by a central entity, such as computing device 152, in database 116. Each distance alerting system 500 may obtain the interpersonal distances from database 116, and use them to determine if an object or person is violating the recommendation. Alternately, the interpersonal distances can be adjusted manually by the user.

Sensors 108A, 108B, 108C may be passive, optical (operating in any suitable part of light spectrum), IR, proximity, laser, motion detection, or radar-based sensors, or any other suitable sensor. Distance alerting system 500 may employ any number of sensors 108 and buzzers 110.

In some examples, buzzers 110 issue an audible alarm (such as an audio tone or audio warning) that an approaching person hears. In some examples, distance alerting system 500 receives interpersonal distance recommendations using "over the air" updates. For example, distance alerting system 500 may be communicatively coupled with a wireless network, such as communication network 118, or a user's phone (e.g., via Bluetooth®), and follows service "in the cloud" that provides recommended interpersonal distances. As such, distance alerting system 500 may update new or updated recommended distances automatically, even as the recommendations change.

In some examples, sensors 108 are temperate sensors and detect a temperature of oncoming objects or persons. In some examples, camera 140 captures thermal images of oncoming persons or objects, and computing device 152 may determine whether a temperature of the person or object is above a threshold temperature based on the thermal images. If the determined temperature is above the threshold temperature, computing device 152 may cause buzzer 110 to sound an alarm.

In some examples, sensors 108 are made part of the environment itself. If an interpersonal distance recommendation is violated, the sensors 108 may cause one or more buzzers 110 to sound an alarm that can be heard by those in the environment.

As another example, a violation of interpersonal distance recommendations may be determined based on video supplied by one or more drones flying in an environment. In some examples, the drones are also outfitted with sensors 108 (e.g., such as optical sensors operating in any suitable part of the light spectrum). Based on one or more of captured video and data from the sensors 108, violations of interpersonal distance recommendations may be determined. An example of this implementation would include flying a drone over a public area, detecting that people are not respecting interpersonal distance recommendations, and flying to the participants that are too close together to warn them to keep a distance. In order to better measure the distance between persons, the drone may change its position to better measure the distance using triangulation processes.

In some examples, two or more persons 101 may wear distance alerting systems 1500. When both of the persons 101 approach each other, the systems 500 may negotiate with each other using radio signaling (such as, but not limited to, Bluetooth® signal). The systems 500 may decide how their users should move to keep a recommended interpersonal distance between them. In some examples, each system 500 would cause a vibrator to vibrate with a different patter of vibration, and the enabled vibrator (e.g., the vibrator vibrating) would be one on a side of each user's body opposite the direction in which each user should move. In other words, the location of the vibration would indicate to the user that the user is not to move in that direction (e.g., should move away from that direction).

One reason for providing the vibration from the opposite side from the one that the person should move to is to capitalize on the person's instincts—a person is more likely to move away from a vibrating signal that indicates a hazard. Such a mechanism reduces the chance that people would violate interpersonal distance recommendations. Among other advantages, the system can guide a user even when other user is not equipped with an additional system (e.g., based on the analysis of the video stream from camera 140). Moreover, the system can guide one through a crowded area (e.g., on the busy street) while reducing interpersonal contact (e.g., a minimum amount of interpersonal contact).

Figure 6:
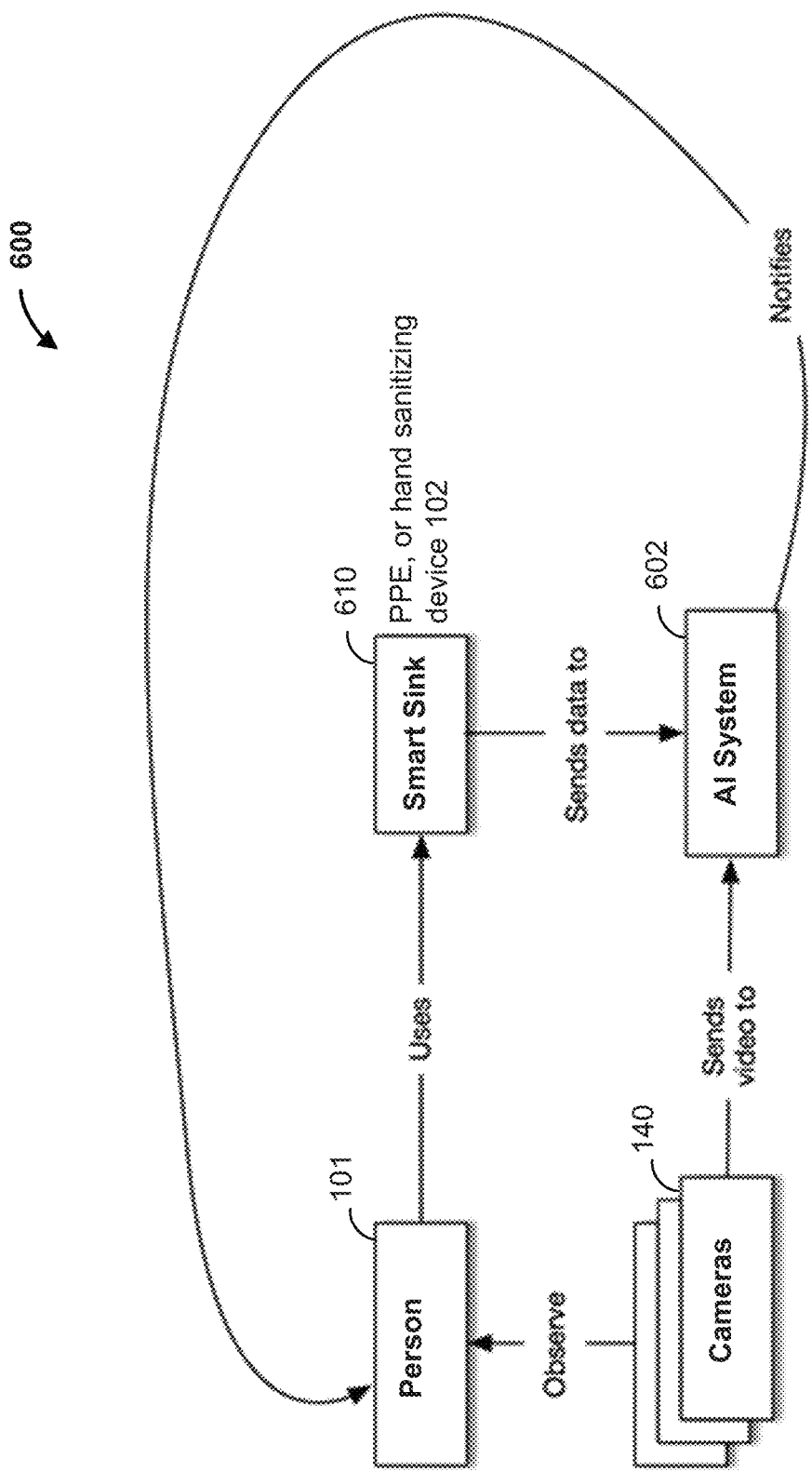
FIG. 6 illustrates a handwashing training system in accordance with some embodiments.

FIG. 6 illustrates a training system 600 that may train a person 101 proper handwashing techniques. Cameras 140 take images, such as still images or video, of person 101. The cameras provide the images to an artificial intelligence (AI) system 602. AI system 602 may be, for example, a server, such as computing device 152, that can apply one or more artificial intelligence models (e.g., algorithms) to data (e.g., image data). In addition, person 101 may be equipped with one or more of the various devices and/or systems described herein, such as the hand sanitizing device 102, sensors 106, distance alerting system 500, manipulator 128, alarm 109, or PPE effectors 112A, 112B.

In addition, training system 600 includes smart sink 610 (e.g., a smart sink as described in FIG. 25), which can determine whether a person has correctly washed their hands. Smart sink 610 may include, for example, a PPE or hand sanitizing device 102. Smart Sink 610 may receive image data, such as from one or more cameras, and determine if person 101 completed one or more hand washing moves in accordance with one or more hand washing rules.

AI system 602 may perform one or more AI processes, such as the execution of one or more machine learning algorithms, to notify person 101 of any hazards. For example, AI system 602 may send a communication to person 101 to notify them that another entity, such as an object or person, is within a recommended interpersonal distance of the person. The communication may be an SMS (e.g., text) or email, for example. In some examples the communication may be a sound, haptic, visual, or temperature based communication. In some examples, AI system 602 notifies the person by sounding an alarm 110.

In some examples, AI system 602 may track the proper use of PPE, such as PPE 180A, 180B worn by person 101. For example, AI system 602 may employ a combination of AI-based video recognition (e.g., based on video received from cameras 140), and instrumentation information from a mask (e.g., as received from smart sink 610), to train person 101 in the proper use of the mask.

In some examples, AI system 602 records data related to the usage of the various modules, such as those discussed with respect to FIG. 3. The data may be analyzed to determine patterns of the person's 101 usage of sanitizing solution, for example. Changes in the usage patterns may indicate an abnormality that can then be investigated on an epidemiological level. For example, four types of anomalies that are of particular epidemiological interest are described below. AI system 602 may determine any of the four anomalies below, and store an indication of the determination, as well as corresponding data, in database 116.

"This location is different"—if a threshold percentage of people at some location start sanitizing more often, that may indicate a dirty location. In a situation when such a location is frequently visited or is prominent, the location may need to be more frequently inspected and/or cleaned. The locations may be defined according to geospatial clustering methods. Clustering may be based on the clustering of geospatial positions using clustering algorithms such as k-means, DB SCAN, OPTICS, and DENCLUE.

"This person is different"—if a group of people begin sanitizing near a particular person, it is possible that the person is giving off signs that they are ill. This may be a useful clue for contact tracing.

"The user is different"—change in the pattern of user's behavior (e.g., since yesterday, the week before, etc.) may indicate a concern about the user's own health.

"They were too close"—if the interpersonal distance between two parties is breached and the user is later found to be infected, the other party may now be at risk for infection. AI system 602 may determine contact tracing by correlating data related to a breach in interpersonal distance with, for example, a phone location of other people who were at the location when the interpersonal distance was breached.

Anomalies may be determined based on the various established methods in the field of time series modeling and analytics (e.g., fitting ETS/ARIMA/LSTM based model to the time series, and then detecting anomalies from the fitted time model). When an anomaly is detected, and in accordance with one or more privacy and data usage policies, the anomaly is reported to the operational scope dashboard for investigation by, for example, epidemiologists.

Not everyone knows how to use PPE correctly. During the 2020 COVID-19 pandemic, many people decided to use surgical masks or N95 respirators when going outside or to travel. Unfortunately, many of those people used them incorrectly, as evidenced by various photographs, news reports, and videos.

Modern optical image and video recognition methods used in computer vision and machine learning have an ability to recognize (e.g., classify) objects in an image (such as a "head" or an "arm"). The methods may also identify which pixel on each image is part of each object, for example, by using the algorithms from the field of the image segmentation, object segmentation and semantic segmentation algorithms. When applied to video, AI system 602 may employ (e.g., execute) such computer vision and machine learning algorithms to determine when a user has touched their face (e.g., a classification of an image as "touched" or "not touched"), or that PPE is not being correctly worn or adjusted (e.g., a classification of an image as "correct" or "incorrect" for the placement of a mask). Examples of such vision algorithms include convolutional neural networks such as ResNET or GoogleNet.

When combined with the camera and image of the user, this capability allows for the use of AI for training large segments of a population in the proper use of PPE. In some examples, training system 600 may employ vision recognition algorithms that are trained with images of people using PPE correctly and incorrectly. A person 101 may then use the system, and AI system 602 may receive video from cameras 140 recording the person 101. AI system 602 may score a user's usage and may generate information about whether the person used PPE correctly and, if not, may direct the person 101 to information about what they did wrong. As an example, AI system 602 may detect an incorrect fitting of a mask and/or respirator, and/or the touching of one's face while wearing a mask.

In some examples, AI system 602 may be used to train persons in the proper use of PPE. For example, AI system 602 may be used to train users, such as medical staff, in properly wearing and using PPE. A particular form of PPE is a respirator, such as an N95 mask. This type of PPE works best when there is a proper seal between the mask and the face.

The AI system 602 may first be trained, such as with supervised data consisting of images of properly worn masks (e.g., with no broken seal, or a nose sticking out of the facemask), and images of improperly worn masks (e.g., with a broken seal).

In some examples, AI system 602 identifies portions of video received from cameras 140 that include anomalies, and stores data indicating the portions of video in a memory device, such as database 116. For example, AI system 602 may identify an anomaly as described herein, and further identify a beginning frame (e.g., beginning timestamp) and a last frame (e.g., last timestamp) of video that includes the anomaly. AI system 602 may store an indication of the beginning and last frames in database 116. A trainer may then review video of the anomaly based on the stored beginning and last frames. As such, AI system 602 allows a human trainer to review the video that AI system 602 has highlighted as problematic in the use of PPE, saving the trainer time and effort in identifying anomalies.

In some examples, AI system 602 includes a camera 140 for image recognition and a computing device 200 that executes a deep learning network to determine that all appropriate hand washing movements have been made. FIG. 24 through 26 and FIG. 35 describe exemplary embodiments related to the training and/or detection of appropriate hand washing movements.

Figure 7:
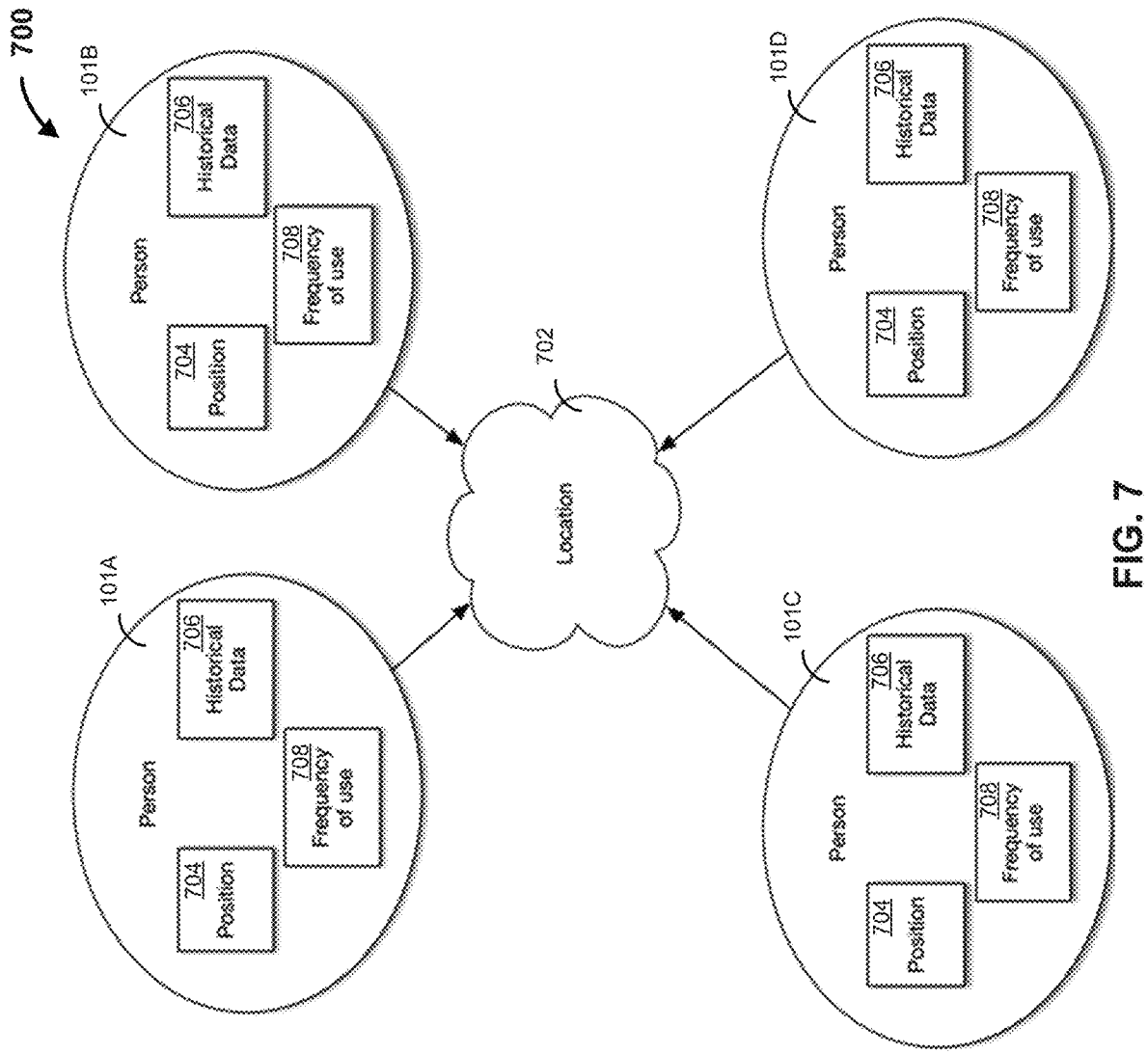
FIG. 7 illustrates a block diagram of a behavior tracking system in accordance with some embodiments.

FIG. 7 illustrates a behavior tracking system 700 that identifies person 101A, person 101B, person 101C, and person 101D, as well as a location 702. Associated with each person is a position 704 (e.g., using GPS data), historical data 706 (e.g., as captured by hand sanitizing device 102 or AI system 602), and frequency of use 708 (e.g., as captured by smart sink 610). The figure illustrates how the combination of data about the usage of personal area devices (e.g., hand sanitizing devices 102), in addition to the user's location data, can be used to make statistical inferences about problematic locations 702. For example, AI system 602 may determine that location 702 is a location where users are using their PPE differently than they are supposed to (e.g., differently than recommended). Such a location 702 may be unsanitary, or problematic in some other way, from an epidemiological perspective. As another example, AI system 602 may determine that, based on positions 704 for each person 101A, 101B, 101C, 101D, two or more of the persons will violate a recommended interpersonal distance at location 702. In some examples, such as when persons that don't typically violate interpersonal distance recommendations are violating interpersonal distance recommendations, AI system 602 may determine that the location 702 is making maintaining social distancing difficult (e.g., location 702 is a very narrow space that puts people in close proximity).

Figure 8:
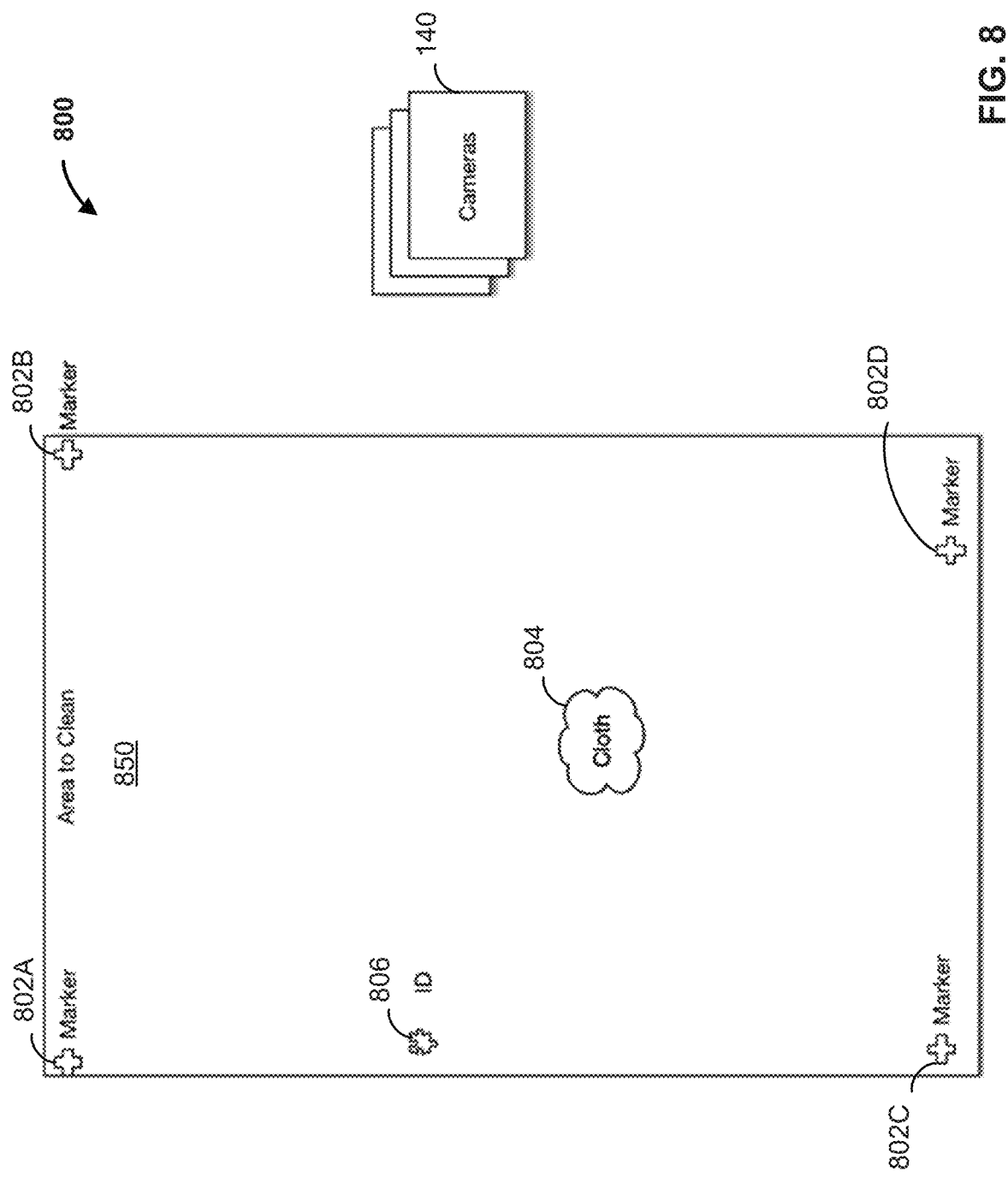
FIG. 8 illustrates a block diagram of a cleaning detection system in accordance with some embodiments.

FIG. 8 illustrates a cleaning detection system 800 that detects areas that have been cleaned. In this example, cameras 140 are positioned to capture images (e.g., video) of an area 850 that includes a cleaning cloth 804. The cleaning cloth 804 may be a distinctive color that a computing device 200, based on executing video imaging algorithms from video captured by cameras 140, can easily detect. The video imaging algorithms may include AI algorithms used to perform image recognition, object detection, or image and instance segmentation. Computing device 200 may execute the video imaging algorithms to determine a position of the cleaning cloth 804, and the position is tracked over time to determine which areas of the surface have been cleaned. A set of markers 802A, 802B, 802C, 802D may be used, in some examples, to mark the boundaries of area 850, and may also be used to identify movable objects. As an example, a marker 806 specifying object identity can be attached to a medical device that is on the movable cart on wheels, and the presence of the same marker 806 indicates the same object identity—"this is the same cart as it was in the room an hour ago, it is just moved to the different corner of the room (as opposed to the different, but similarly looking cart, that someone has brought in the room)."

Figure 14:
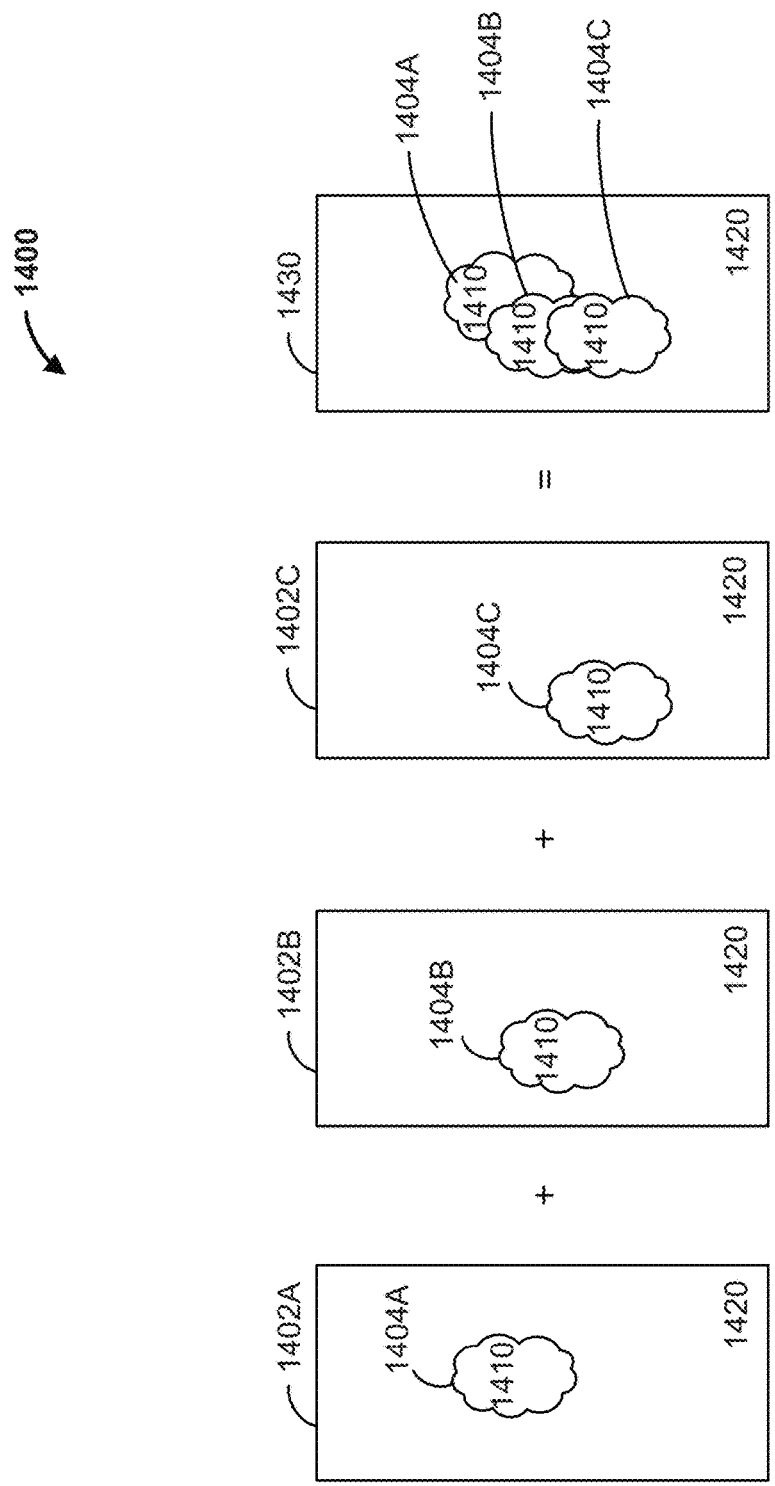
FIG. 14 illustrates item tracking by the personal monitoring system of FIG. 10 in accordance with some embodiments.

Computing device 200 may execute the video imaging algorithms to recognize which pixels, of images captured with cameras 140, belong to the cleaning cloth 804, and which pixels belong to other objects in the environment (e.g., the table or floor in the room that needs to be cleaned). By tracking changes of the position of the cleaning cloth 804 along area 850, the computing device 200 can determine which (and when) particular surfaces were cleaned. Similarly, the computing device 200 can determine which particular surfaces were not cleaned and for how long. FIG. 14 illustrates an item tracking 1400, for example.

Moreover, cleaning detection system 800 allows for tracking of the cleanliness of surfaces, such as the surface of area 850. In some examples, cleaning detection system 800 tracks a cleaning cloth 804 that is a highly distinctive color in multiple parts of the light spectrum (e.g., optical and IR) and is followed by cameras 140 in an optical and IR spectrum. The surface of area 850 may be reflective in some examples.

In some examples, the surface of area 850 is examined to determine if computing device 200 (e.g., executing computing vision algorithms) is able to establish precise boundaries during the analysis of images for object instance segmentation. Object instance segmentation algorithms (such are Mask R-CNN or Faster R-CNN) are able to determine which pixels on the image belong to which objects, but may get confused on the object boundaries and may incorrectly assign some boundary pixels to the wrong object. If precise boundaries cannot be established, one or more reference locators 802A, 802B, 802C, 802D can be added to the surface of area 850. In addition, another reference locator 806 may be added, and may be a highly distinctive sticker, for example. The computing device 200 may obtain images of the surface of area 1650 with the reference locators 802A, 802B, 802C, 802D, and may establish boundaries based on the reference locators 802A, 802B, 802C, 802D, as described herein. In addition, reference locator 806 may be placed on a movable object to establish the object's identity. A scene of area 850 is recorded with one or more cameras 140 (e.g., to avoid occlusions). Then, movement of the cleaning cloth 804 is tracked. When the central area of the cloth 804 covers a portion of the surface of an object (e.g., floor), that part of the surface is recorded as "clean." When the entire surface of the object is cleaned, the object is declared as clean. Objects that are not fully cleaned can be recognized and reported. Although a cleaning cloth 804 is illustrated, any suitable object can be tracked. For example, mops, sprayers, specialized cleaning devices, vacuum cleaners, or any other objects may be tracked. FIG. 14, for example, illustrates the tracking of objects, such as a cleaning cloth.

This approach may facilitate the tracking of the cleanliness of tables, large areas of hospitals, public spaces, or any other indoor areas that are typically cleaned with cloths. Furthermore, this approach is fully combinable with existing cleaning procedures and requires minimal training of the cleaning crew. In some examples, the person cleaning is to use a cleaning cloth 804 of a particular color, as expected by the computing device 200. The particular color of the cloth 804 makes it easier for the computing device 200 to recognize and track cloth 804 in the image and distinguish it from other objects.

In some examples, computing device 200 generates an AI reconstructed depth map of an image, and utilizes the image to recognize object depths as well as to determine object positions. In some examples, multiple cameras 140 capture images, and based on markers 802, the computing device 200 employs triangulation algorithms to determine the 3D positions of objects in a space.

In some examples, computing device 200 combines slower, deep learning-based vision recognition algorithms that operate on individual low-resolution frames with color range-based recognition algorithms, such as described below, that operate on high-resolution intermediate frames. For example, the computing device 200 may initially identify the cleaning cloth 804, and then may identify the colors that belong to the cloth 804 in prevailing lighting conditions in a room.

In some examples, rather than slower vision recognition algorithms (e.g., such as deep learning-based vision recognition algorithms), algorithms based on faster but less precise methods (e.g., such as color range-based recognition algorithms) may be employed to operate on the individual intermediate frames. For example, color range-based tracking is used on high definition video to determine the position of the cloth 804 between frames (e.g., keyframes) that are processed with deep learning. Frames that show a significant change from a previous frame when using color-based image segmentation are further processed via deep learning algorithms to filter out any influence of transient changes in corresponding lighting conditions.

In some examples, the methods and apparatus described may be employed to recognize a user's hand and detect the moment when a surface is touched by the user's hand. The touched surface may then be considered unclean (unless user hand is known to have been properly washed and not contaminated in the meantime). By keeping track of the user's movement in an environment through the time, the method and apparatus presented here may be used to identify areas/parts of environments that are or include fomites (i.e., are contaminated). Because this method may learn a graph of "this object is touched before that object," it may allow for determining which objects are contaminated if the other previously touched object is determined to be contaminated, as well as which users have touched the object after it was contaminated. The contamination may indicate the object that was touched by the hand, and, in some examples, the time the touch occurred.

For example, the methods and apparatus may notice that a doctor has touched an infected patient, walked to the other side of the room, and touched a table (e.g., see FIGS. 27 through 33). The methods and apparatus may determine that the table is a fomite until a cleaning of the table is detected. In this example, rather than a color of a cloth, a color of the doctor's hands/gloves is tracked.

One advantage of the cleaning detection system 800 is that it can work with both robot cleaners and human cleaners. For example, the cleaning detection system 800 can track robots that are cleaning, and may also track the cleaning of surfaces that may be reachable only by humans.

Figure 19:
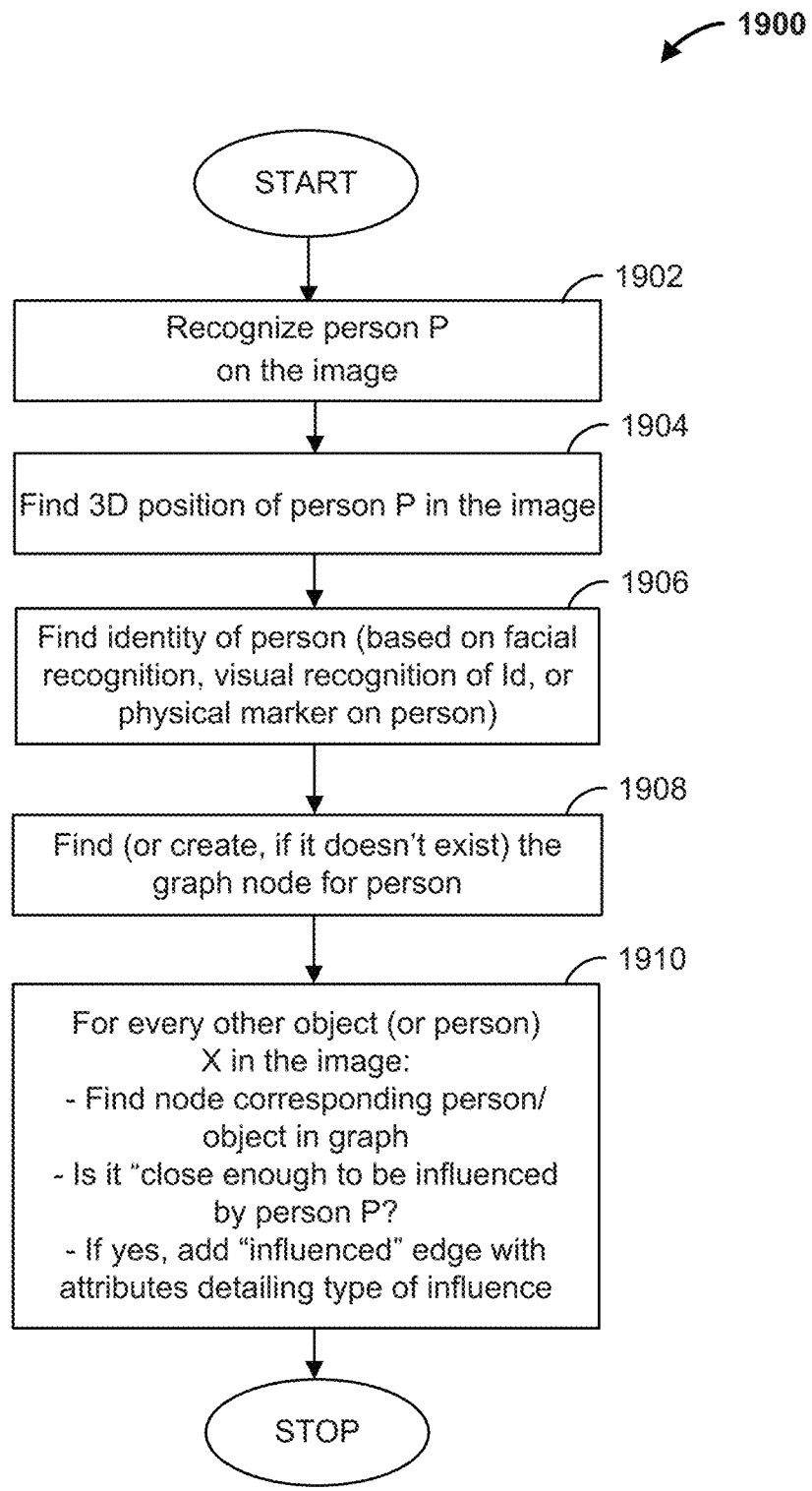
FIG. 19 is a flowchart of another example method that can be carried out by the personal sanitation monitoring system of FIG. 10 in accordance with some embodiments.

In addition to detecting that surface (or a person) is contaminated based on the direct touch of a surface, cleaning detection system 800 may also determine that contamination has occurred based on a person approaching the area/surface to a distance that allows droplet or airborne contamination (as described herein, e.g., see FIG. 19).

Figure 9:
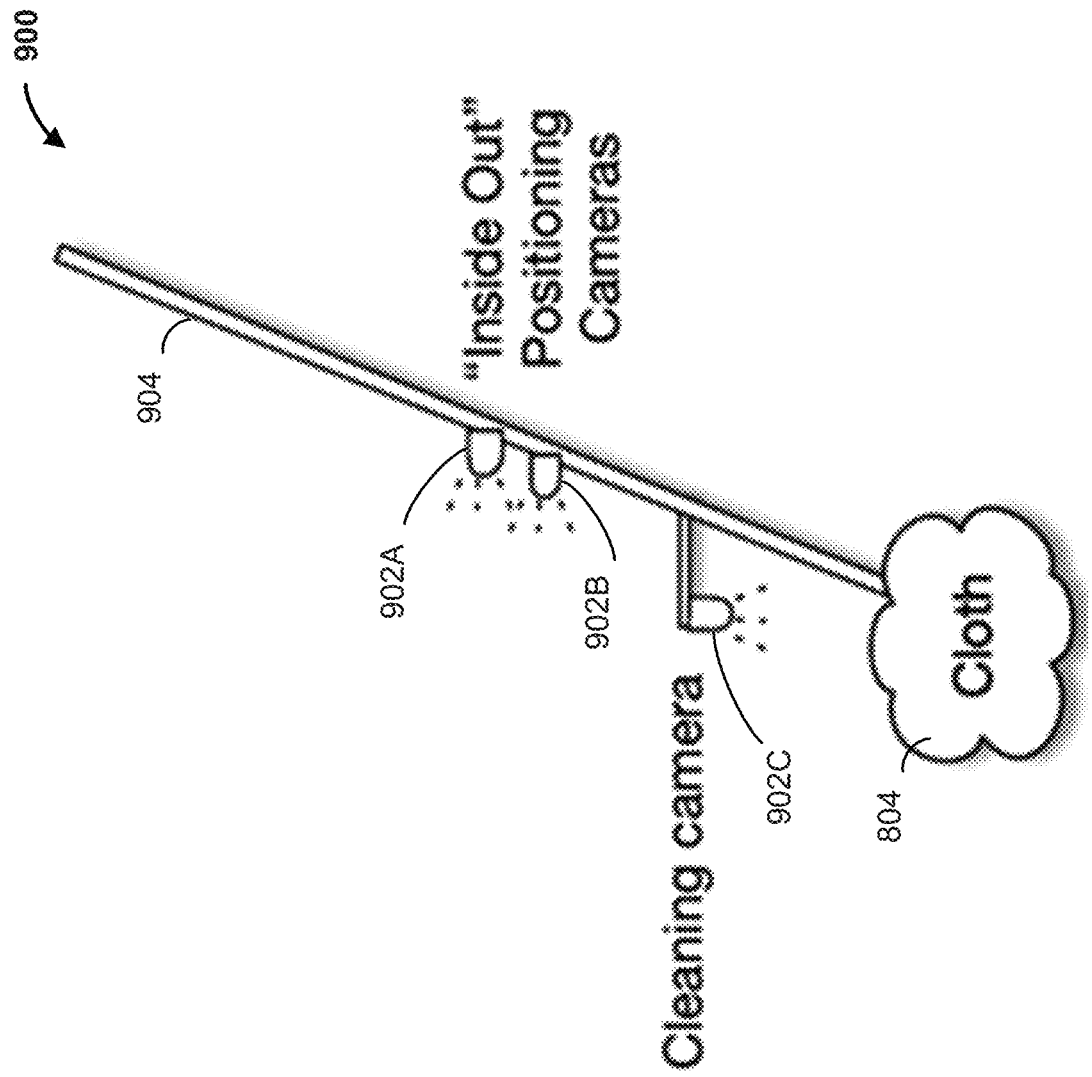
FIG. 9 illustrates a block diagram of a cleaning detection system in accordance with some embodiments.

In some examples, one or more cameras 140 are mounted on a cleaning device itself. For example, FIG. 9 illustrates a cleaning detection system 900 that includes a broom 904 that holds a cloth 804 at one end. Mounted to the broom 904 are positioning cameras 902A, 902B, and a cleaning camera 902C. The broom 904 may be tracked by a server, such as computing device 152, based on video provided by positioning cameras 902A, 902B. Positioning cameras 902A, 902B may be optical cameras that are part of an indoor positioning system. The indoor positioning system may be based, in some examples, on "inside out" optical position tracking, or can be based, in other examples, on any other form of indoor positioning system that can identify the location of the broom 904.

Cleaning camera 902C may operate as camera 140 described above with respect to FIG. 1. For example, based on images received from cleaning camera 902C, the computing device 152 can determine areas or objects in an environment that have been cleaned. Positioning cameras 902A, 902B, and cleaning camera 902C may be shock and liquid-proof, as well as impact resistant.

Figure 10:
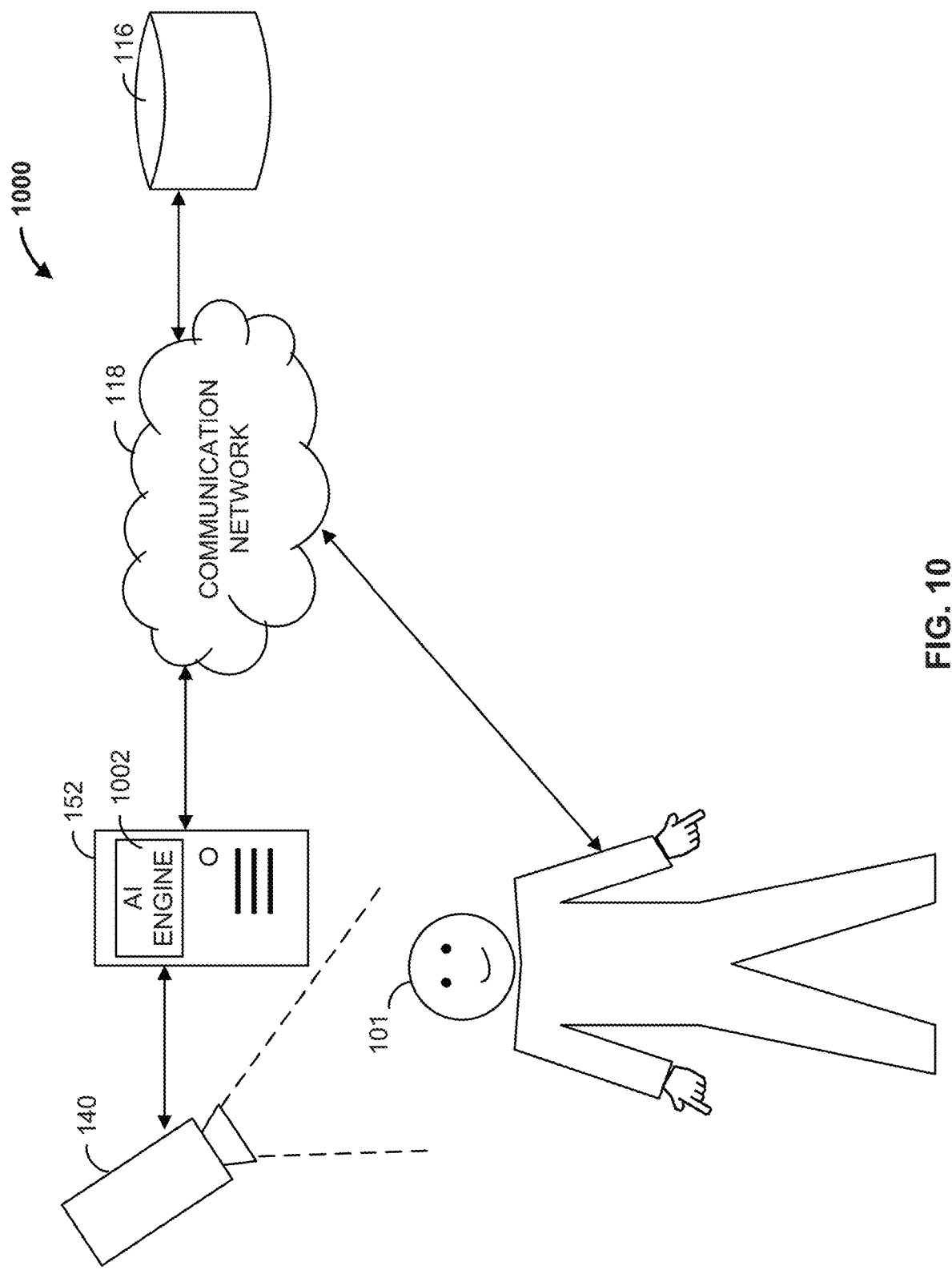
FIG. 10 is a block diagram of a personal monitoring system in accordance with some embodiments.

FIG. 10 illustrates a personal monitoring system 1000 that may monitor a person 101 to determine whether the person, or body parts of the person (e.g., hand), has been washed (e.g., properly washed). The personal monitoring system 1000 includes a computing device 152 communicatively coupled to a camera 140 (e.g., video camera) and a database 116. In some examples, each of computing device 152, camera 140, and database 116 are coupled to a communication network 118.

Computing device 152 may include one or more processing devices, such as processor(s) 201, that can execute instructions, such as instructions stored within instruction memory 207, to implement an AI engine 1002. AI engine 1002 may apply one or more artificial intelligence algorithms, such as computer vision algorithms, to detect objects within images received from camera 140.

For example, camera 140 may capture images of a scene that includes user 101. Computing device 152 may receive the images from camera 140. AI engine 1002 may apply a computer vision algorithm to detect an object with the images, such as a hand of user 101. Further, computing device 152 may determine a movement of the object based on a location of the object within the images. For example, computing device 152 may determine whether a plurality of movements of the object have been detected (see, e.g., FIG. 35). If the plurality of movements have been detected, computing device 152 may generate object status data indicating that the object, such as a hand, is cleaned. Otherwise, if the plurality of movements have not been detected (e.g., none, or only a subset, of the plurality of movements have been detected) computing device 152 may generate object status data indicating that the object is not cleaned. Computing device 152 may store the object status data within database 116, for example.

Figure 11:
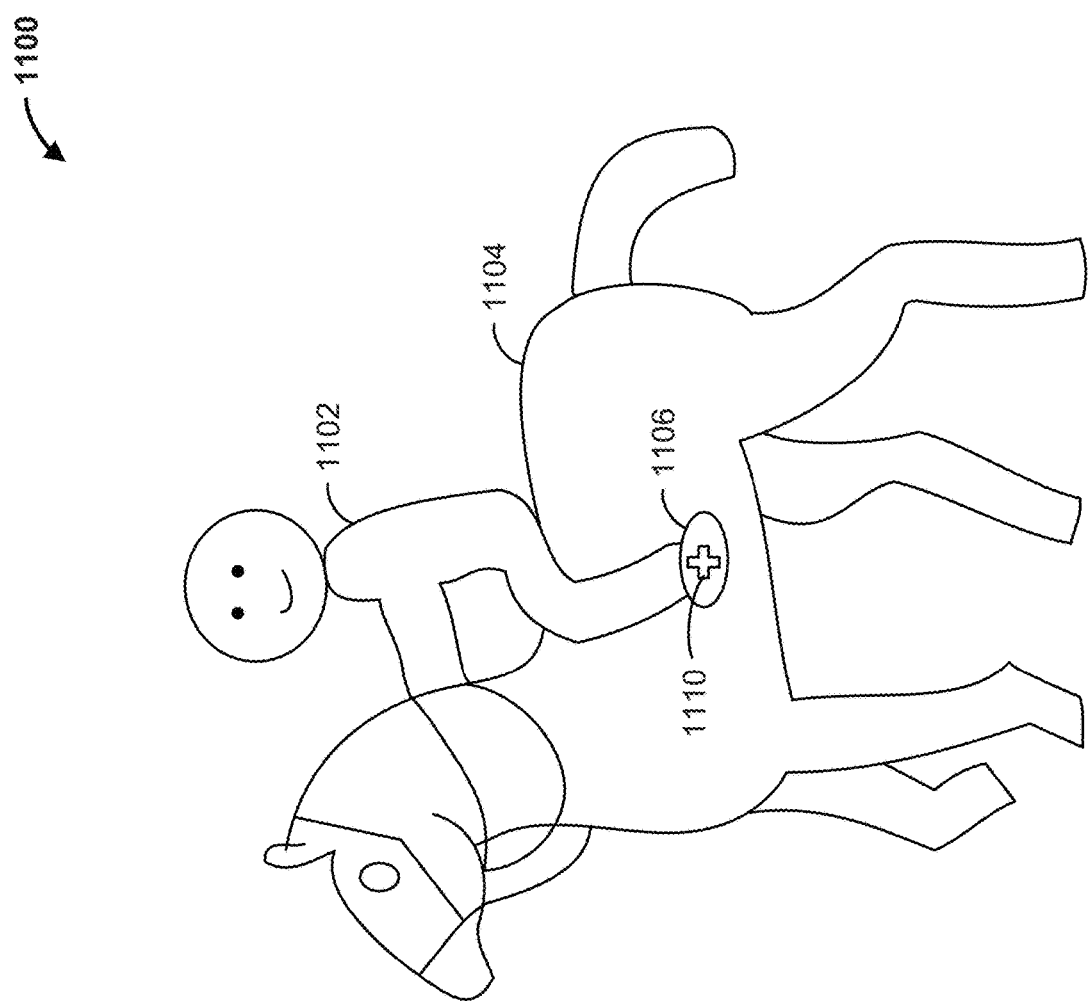
FIG. 11 is an image captured by the personal monitoring system of FIG. 10 in accordance with some embodiments.

In some examples, AI engine 1002 determines a position of an object within an image based on physical markers placed on the object. For example, FIG. 11 illustrates an image 1100 of a scene captured with a camera, such as camera 140. The scene includes a person (e.g., rider) 1102 and an animal 1104. In addition, in this example, the person 1102 has attached a marker 1110, similar to markers 802A, 802B, 802C, 802D described with respect to FIG. 8. AI engine 1002 may apply a computer vision algorithm to image data characterizing image 1100 to identify marker 1110.

In some examples, AI engine 1002 may apply a computer vision algorithm to image data to determine the boundaries/outline of the objects on the image, such is the outline of the rider 1102. While modern computer vision algorithms are pretty good in determining the boundaries of the object, they are not perfect, and it is possible that some of the areas of the image would be incorrectly attributed to belong not to the rider 1102, but, e.g., to the horse 1104. For example, assume that the left rider's foot is incorrectly characterized as being a part of the horse 1104, not the rider 1102. In that situation, a sticker 1110 may be added to the rider's left foot, indicating that "Area 1106 should be considered part of the rider." AI engine would identify marker 1110. The physical shape of marker 1110 is chosen to be highly distinctive and much easier for the AI algorithms to correctly recognize, then is the foot of the rider. The semantic meaning of the marker 1110 is stored in the database (such as database 116). Then when AI engine processes image 1100, it would attribute the left foot to be part of the rider.

In some examples, AI engine 1002 determines a position of rider 1102 within the image 1100 (e.g., a pixel coordinate location). Further, computing device 152 may determine a movement of rider 1102 based on positions determined by AI engine 1002 across sequential images of the scene. For example, computing device 152 may determine an upward motion, a downward motion, or a lateral motion of the marker 1110. Computing device 152 may store data indicating the determined motions within a memory device, such as within database 116.

Computing device 152 may determine whether the determined motions of the rider 1102 (e.g., in some examples, to which marker 1110 is attached) satisfy one or more predetermined motions. For example, database 116 may store motion data identifying and characterizing one or more predetermined motions. The motion data may characterize, for example, movements in a direction (e.g., up, down, at a particular angle, etc.) of a particular amount (e.g., a number of pixels, a percentage amount, distance in centimeters, etc.). Computing device 152 may obtain the motion data from database 116, and may determine if the determined movements satisfy one or more of the motions characterized by the motion data. In some examples, if the determined movements satisfy one or more of the motions characterized by the motion data, computing device 152 determines that an activity, such as a washing (e.g., cleansing), has taken place.

In some examples, computing device 152 determines a movement of an area of image 1100 based on detected movements of the object with identified marker 1110. For example, marker 1102 may be placed on a foot (e.g., heel) or shoe of person 1102. Computing device 152 may determine movements of the foot or shoe of person 1102 based on detecting movements of marker 1110. Computing device 152 may further determine whether detected movements of the rider's foot or shoe satisfy one or more predetermined motions, such as motions characterized the motion data stored within database 116. Computing device 152 may, in some examples, track the position of the rider's foot or shoe during the movement (e.g., what is the position of the foot or shoe on each individual frame of the video stream).

Although this discussion relates to a person that is a rider, it will be understood that the same algorithms discussed herein can be used to determine whether proper handwashing has occurred. For example, proper handwashing can be defined as the satisfaction of one or more predetermined movements. If all of these steps have occurred, the user can be notified that the surface has been properly cleaned. If fewer than all of the steps have occurred, the user can be notified that the surface has not been properly cleaned.

As a further example, proper surface cleaning is combination of the determination of position of the cloth and object being cleaned on the video, and tracking the movement of the cleaning cloth (which may include usage of the markers, as described herein, to assist to AI in determination of the boundaries of the object or cloth). Proper surface cleaning would require the coverage of the whole surface with the cloth during those movements (e.g. if we are using cleaning cloth to clean the table, did we completely covered the table with our wipes).

Further, in some examples, computing device 152 determines an object area 1106 of image 1100 based on a location of detected marker 1110. For example, computing device 152 may determine an object area 1106 of image 1100 that is a number of pixels in one or more directions from marker 1110. For example, the object area 1106 may be a number of pixels in each direction from marker 1110 that would fall within an ellipse 1106 that is specified as a part of the marker 1110 detailed attributes.

In some examples, a plurality of physical markers, such as markers 1110, may be placed around the circumference of an object such as a table. The AI engine 1002 may apply a computer vision algorithm that is trained to detect the physical markers to images of the table and, in response, determine boundaries of the table. In some examples, computing device 152 expands the boundaries to assure the entire table is located within the determined boundaries. For example, computing device 152 may enlarge the determined area by a predetermined amount (e.g., 5%), to better assure that the determined area includes the object.

Figure 12:
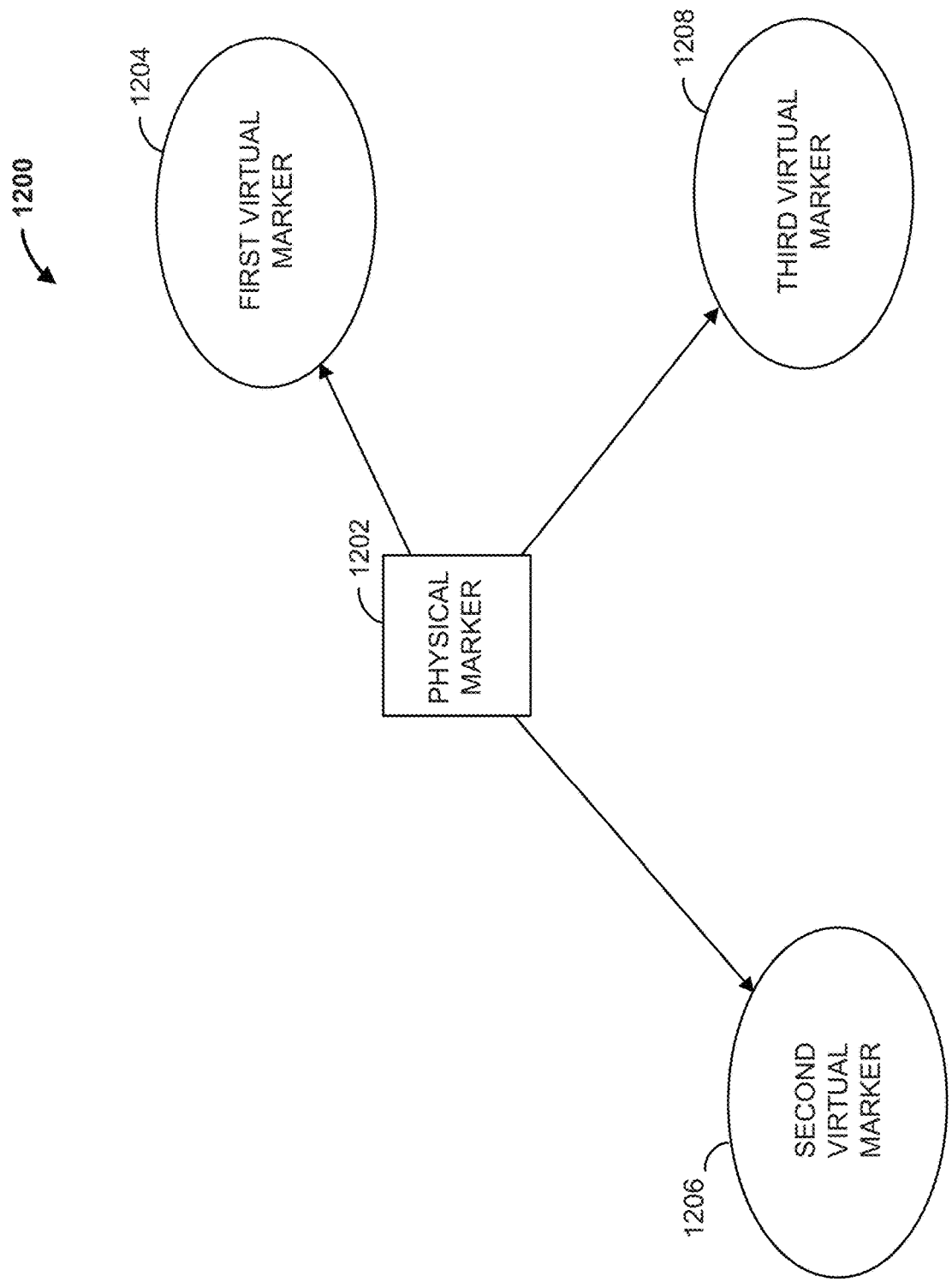
FIG. 12 illustrates markers that may be employed by the personal monitoring system of FIG. 10 in accordance with some embodiments.

In some examples, computing device 152 determines object area 1106 based on virtual markers generated for each physical marker 1110. For example, FIG. 12 illustrates a marker configuration 1200 that includes a physical marker 1202 (e.g., such as marker 1110), and a plurality of virtual markers including first virtual marker 1204, second virtual marker 1206, and third virtual marker 1208. Each of the plurality of virtual markers may be generated based on one or more virtual marker configurations, which may be stored in database 116. Marker configuration 1200 may identify and characterize one or more virtual markers 1204, 1206, 1208 in relation to a physical marker 1202. For example, a marker configuration may indicate that first virtual marker 1204 is located at a first position defined by a first distance (e.g., number of pixels, a percentage of an image resolution, a number of centimeters, etc.) from physical marker 1202 along a first line that is at a first angle (e.g., as measured from a vertical line that divides physical marker 1202 in half). Similarly, the virtual marker configuration may indicate that second virtual marker 1206 is located at a second position defined by a second distance from physical marker 1202 along a second line that is at a second angle, and that third virtual marker 1208 is located at a third position defined by a third distance from physical marker 1202 along a third line that is at a third angle. In addition to the linear distances between the markers, the angular orientation could also be specified (e.g. the first virtual marker 1204 is rotated 30 degrees around X axis from Physical marker 1202, where X axis is specified in the relation to the physical orientation of the Physical marker 1202).

A marker configuration 1200 may be generated for a particular object, such as a shoe, hand, face, or any other suitable object. As an example, computing device 152 may determine a physical marker 1202 within an image, such as marker 1110 within image 1100, and determine virtual markers 1204, 1206, 1208 based on the detected physical marker and a marker configuration. For example, computing device 152 may apply a marker configuration for heels or feet to determine object area 1106 of image 1100 of FIG. 11.

In some examples, rather than a physical marker 1202, AI engine 1002 may determine one or more features of image 1100, such as a face or eyes of a person 1102. Computing device 152 may then employ the detected feature as a physical marker 1202. For example, computing device 152 may determine one or more virtual markers, such as virtual markers 1204, 1206, 1208, based on the detected feature according to a marking configuration, and further determine an object area, such as object area 1106, based on the determined virtual markers.

Referring back to FIG. 11, in some examples, computing device 152 applies a segmentation algorithm to the image 1100 to determine a contour of a person 1102. In some examples, computing device 152 adjusts the determined contour based on object area 1106. For example, computing device 152 may determine a union of the determined contour and object area 1106 to determine an adjusted contour for person 1102. The adjusted contour may be, for example, a corrected contour, as the originally determined contour may not have accurately identified boundaries of person 1102 within image 1100.

Figure 13:
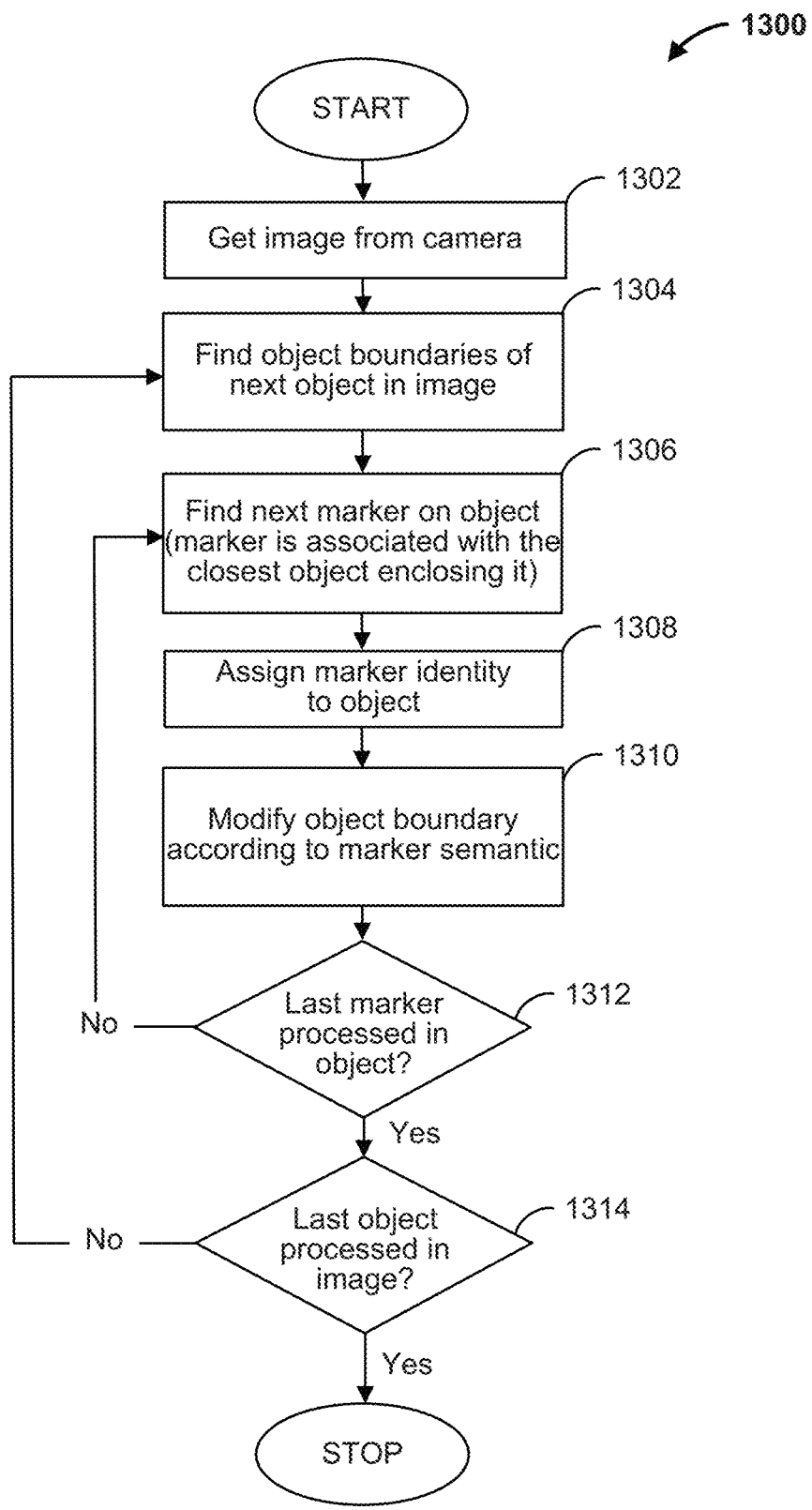
FIG. 13 is a flowchart of an example method that can be carried out by the personal monitoring system of FIG. 10 in accordance with some embodiments.

FIG. 13 is a flowchart of an example method 1300 (e.g., a marker resolution algorithm) that can be carried out by the personal monitoring system 1000. Beginning at step 1302, an image is received from a camera, such as from camera 140. At step 1304, object boundaries of an object are located within the image. For example, computing device 152 may apply an image segmentation algorithm to the received image to detect a boundary (e.g., contour) of the object. The object may be a person, such as person 1102, for example. Further, and at step 1306, a marker (e.g., physical or virtual marker) is identified within the image. For example, the marker may have been placed on a hand or foot of the person. At step 1308, the marker is assigned to the object determined at step 1304.

Figure 34:
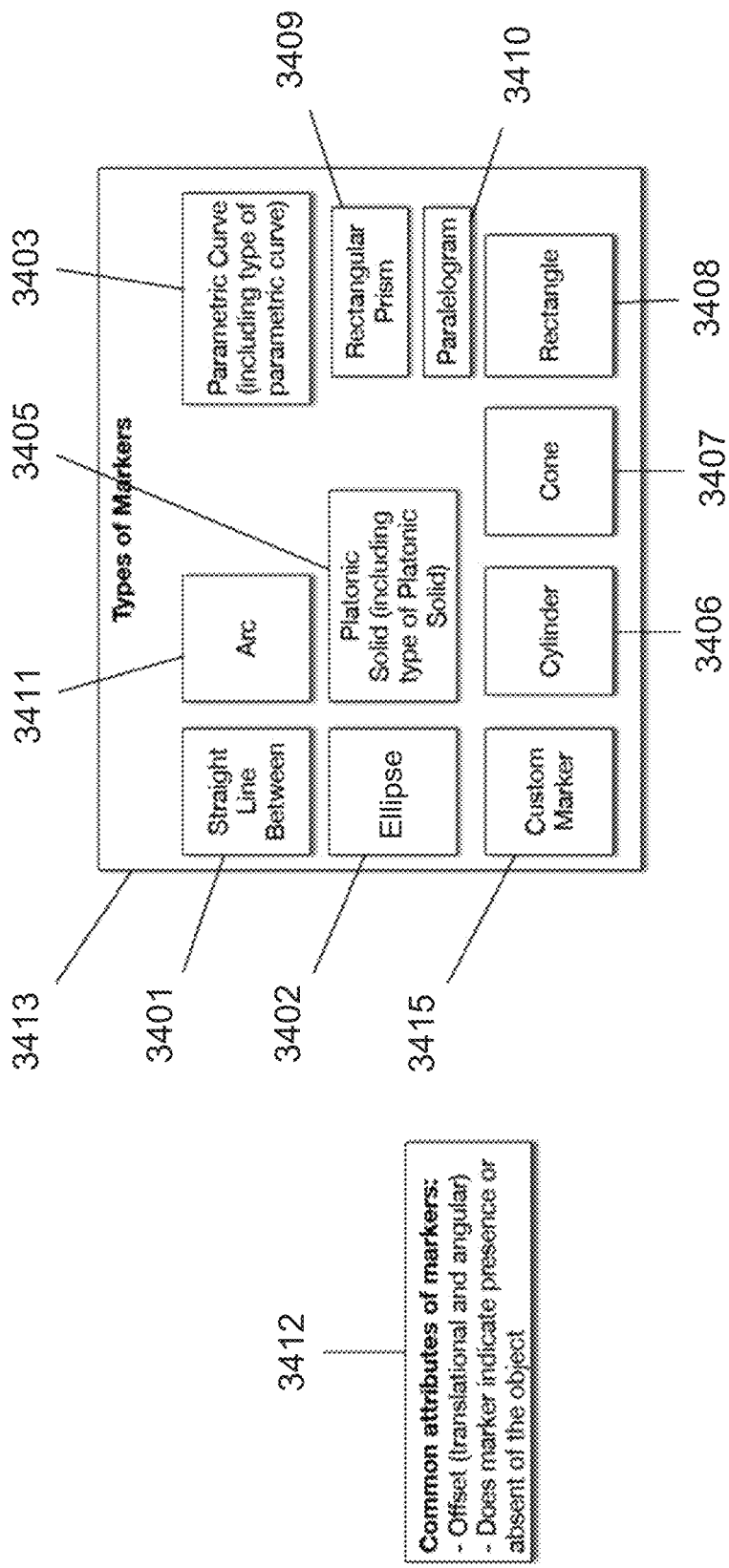
FIG. 34 illustrates attributes of various marker types, in accordance with some embodiments.

Further, and at step 1310, the boundary of the object is modified based on the identified marker. For example, computing device 152 may determine an area of the image based on the marker, and may adjust the boundary of the object by expanding the boundary to include the determined area of the image. The area of the image determined may be an area that is within a predetermined distance from a marker (e.g., FIG. 34 describes types of markers), or may be based on generating virtual markers in accordance with a marker configuration, for example. Computing device 152 may generate boundary data identifying and characterizing the boundary of the object, and may store the boundary data within database 116, for example. FIG. 34 and its corresponding description are directed to types of markers.

At step 1312, a determination is made as to whether the last marker for the object was processed. For example, if there are additional markers for the object, the method proceeds back to step 1306 to locate the next marker. If, however, there are no additional markers, the method proceeds to step 1314. At step 1314, a determination is made as to whether the last object in the image has been processed. For example, if there are additional objects within the image, the method proceeds back to step 1304 to find another object's boundaries. If, however, there are no additional objects, the method ends.

FIG. 14 illustrates item tracking 1400 by the personal monitoring system 1000 of FIG. 10. In this example, computing device 152 receives each of a first frame 1402A, second frame 1402B, and third frame 1402C of an image from, for example, a camera 140. In this example, the first frame 1402A includes an image of a cloth 1410 in a first position 1404A on a surface 1420 (e.g., a tabletop). The second frame 1402B includes an image of the cloth 1410 in a second position 1404B on the surface 1420, and the third frame 1402C includes an image of the cloth 1410 in a third position 1404C on the surface 1420. Computing device 152 may identify the cloth 1410 in each of the frames (e.g., based on applying computer vision algorithm to the images), and may further determine the position of the cloth 1410 on the surface 1420 in each frame.

For each frame, computing device 152 may determine a boundary of the cloth 1410, and may determine a portion of the surface 1420 that has been washed based on the boundary of the cloth 1410. For example, computing device 152 may determine that the portions of the surface 1420 that are covered by the cloth 1410 have been washed. In some examples, computing device 152 may determine that only portions of the surface 1420 that are within a predetermined distance from the center of the cloth 1410 have been washed. In some examples, computing device 152 may determine that only those portions of the surface 1420 that are within a predetermined percentage of the cloth boundary have been washed. For example, computing device 152 may determine that only portions that are within 75% of the area covered by the cloth 1410, as measured from the center of the cloth 1410 (e.g., the center or mass), have been cleansed. In some examples, computing device 152 may apply map data (e.g., stored in database 116) to the determined boundaries of the cloth 1410, where the map data identifies portions of the cloth 1410, such as portions determined to have cleansed the surface 1420. In some examples, the map data identifies portions of the cloth to experience pressure, such as from a person's hand.

In some examples, computing device 152 may generate virtual markers, such as first virtual marker 1204, second virtual marker 1206, and third virtual marker 1208, at each frame based on the detection of cloth 1410. As such, the boundary of the cloth 1410 at each frame may be adjusted based on the generated virtual markers.

Computing device 152 may combine the individual portions determined to be cleansed for each frame 1402A, 1402B, and 1402C, such as indicated in image 1430, and may store data indicating and characterizing the cleansed portions of surface 1420 in database 116. Computing device 152 may, for example, display an indication of which portions of the surface 1420 have been cleaned within a temporal period (e.g., the last hour, the last day, the last week, etc.) based on the stored data.

Figure 15:
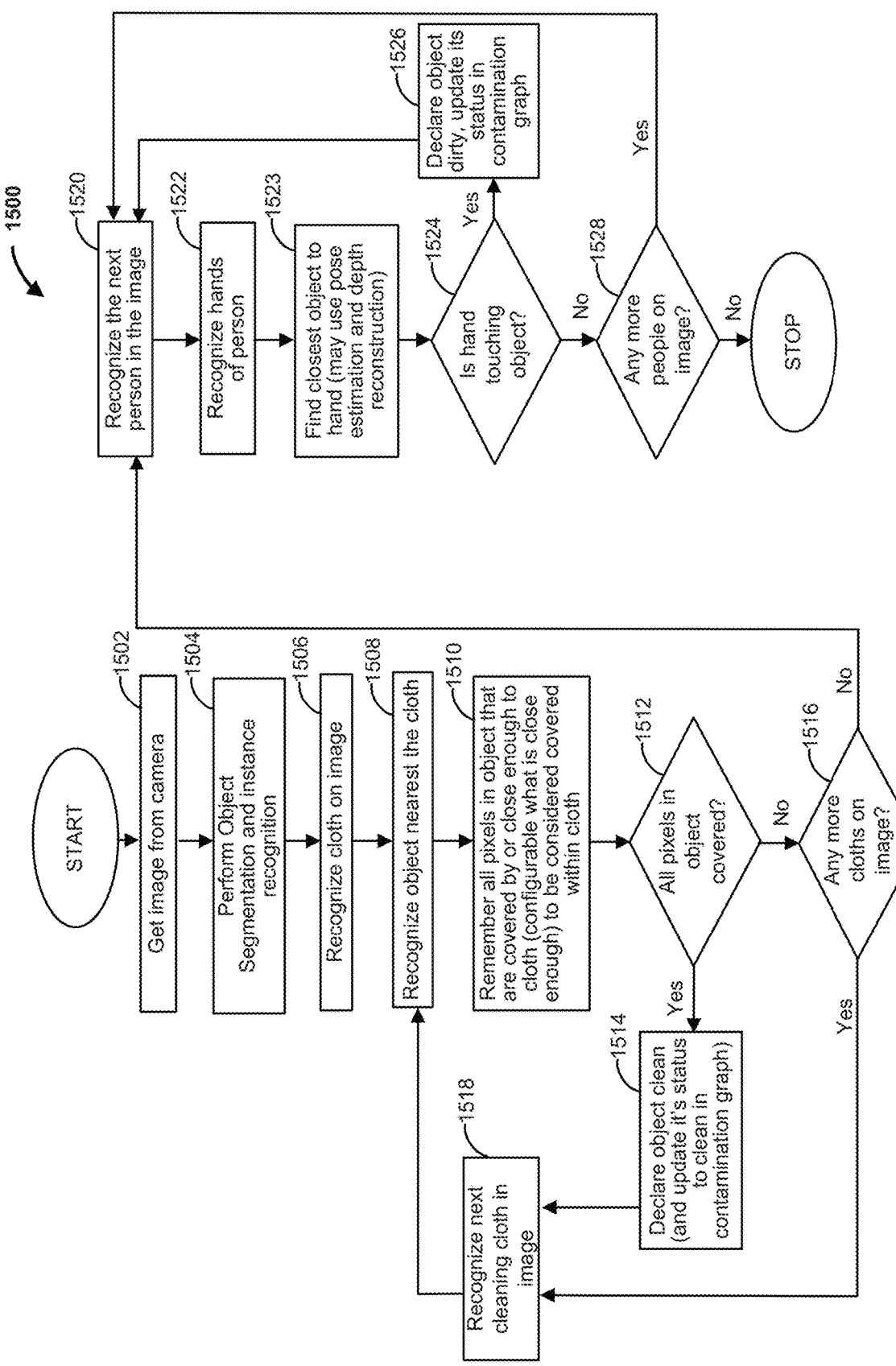
FIG. 15 is a flowchart of another example method that can be carried out by the personal monitoring system of FIG. 10 in accordance with some embodiments.

FIG. 15 illustrates a flowchart of an example method 1500 that can be carried out by the personal monitoring system 1000. Beginning at step 1502, an image is received from a camera, such as camera 140. At step 1504, computing device 152 performs object segmentation and instance recognition operations to, for example, detect a cloth within the image at step 1506. As an example, computing device 152 may apply one or more computer vision algorithms to the received image to identify a cloth, such as cloth 1410, and to determine the cloth's boundaries.

At step 1508, an object nearest the cloth is determined. For example, the object may be a surface, such as surface 1420 (e.g., a table). Proceeding to step 1510, an area of the object in the image is determined to be covered by the cloth. For example, computing device 152 may determine that only portions of the object that are within a predetermined distance from a center of the cloth are covered. In some examples, computing device 152 may determine that only those portions of the object that are within a predetermined percentage of a boundary of the cloth are covered. In some examples, computing device 152 may apply map data (e.g., stored in database 116) to determined boundaries of the cloth to determine portions of the object covered by the cloth. Computing device 152 determines pixels in the image corresponding to the portions of the object that are considered covered by the cloth.

At step 1512, a determination is made as to whether all pixels corresponding to the object have been considered covered by the cloth (e.g., in at least one of a previous number of images). If all pixels corresponding to the object have been considered covered by the cloth, the method proceeds to step 1514, where the object (e.g., surface 1420) is determined to be clean. In some examples, computing device 152 provides for display an indication that the object has been cleaned. The method then proceeds to step 1518. If, at step 1512, all pixels of the object have not been considered covered by the cloth (e.g., in at least one of a previous number of images), the method proceeds to step 1516.

At step 1516, a determination is made as to whether there are any more cloths within the image (for example, there are multiple cleaners in the room at the same time). For example, at steps 1504 and 1506, multiple cloths may have been detected based on the object segmentation and instance recognition operations applied to the image. If there are any additional cloths, the method proceeds to step 1518 where the next cloth is recognized (e.g., selected). The method then proceeds back to step 1508, to determine an object nearest the next cloth. Otherwise, at step 1516, if there are no additional cloths, the method proceeds to step 1520.

At step 1520, computing device 1520 detects a next person in the obtained image. For example, computing device 1520 may (e.g., via AI engine 1002) apply a computer vision algorithm to the received image data to detect the one or more persons. Proceeding to step 1522, a body part, such as a person's hands, of a person is detected. For example, computing device 1520 may apply one or more trained machine learning processes to detect a hand in the portion of the image that includes a detected person.

At step 1523, an object closest to the hand is determined. For example, the object may be a surface, such as surface 1420. At step 1524, a determination is made as to whether the hand is touching the object. Computing device 152 may determine that the hand is touching the object if any pixels corresponding to the hand are within a minimum threshold of pixels (e.g., 10) of the pixels corresponding to the object, or some minimum distance to object (e.g., 1 cm), for example. In some examples, computing device 152 determines that the hand is touching the object when pixels corresponding to the hand and to the object overlap or are adjacent one another. If computing device 152 determines that the hand is touching the object, the method proceeds to step 1526, where data is generated declaring the object dirty, and its status is updated in a contamination graph based on the data. The method then proceeds back to step 1520. Otherwise, if at step 1524, the hand is not touching the object, the method proceeds to step 1528.

At step 1528, a determination is made as to whether there are any additional persons in the image. If there is an additional person, the method proceeds back to step 1520 to recognize a next person in the image. If, however, at step 1528, there are no additional persons, the method ends.

Figure 16:
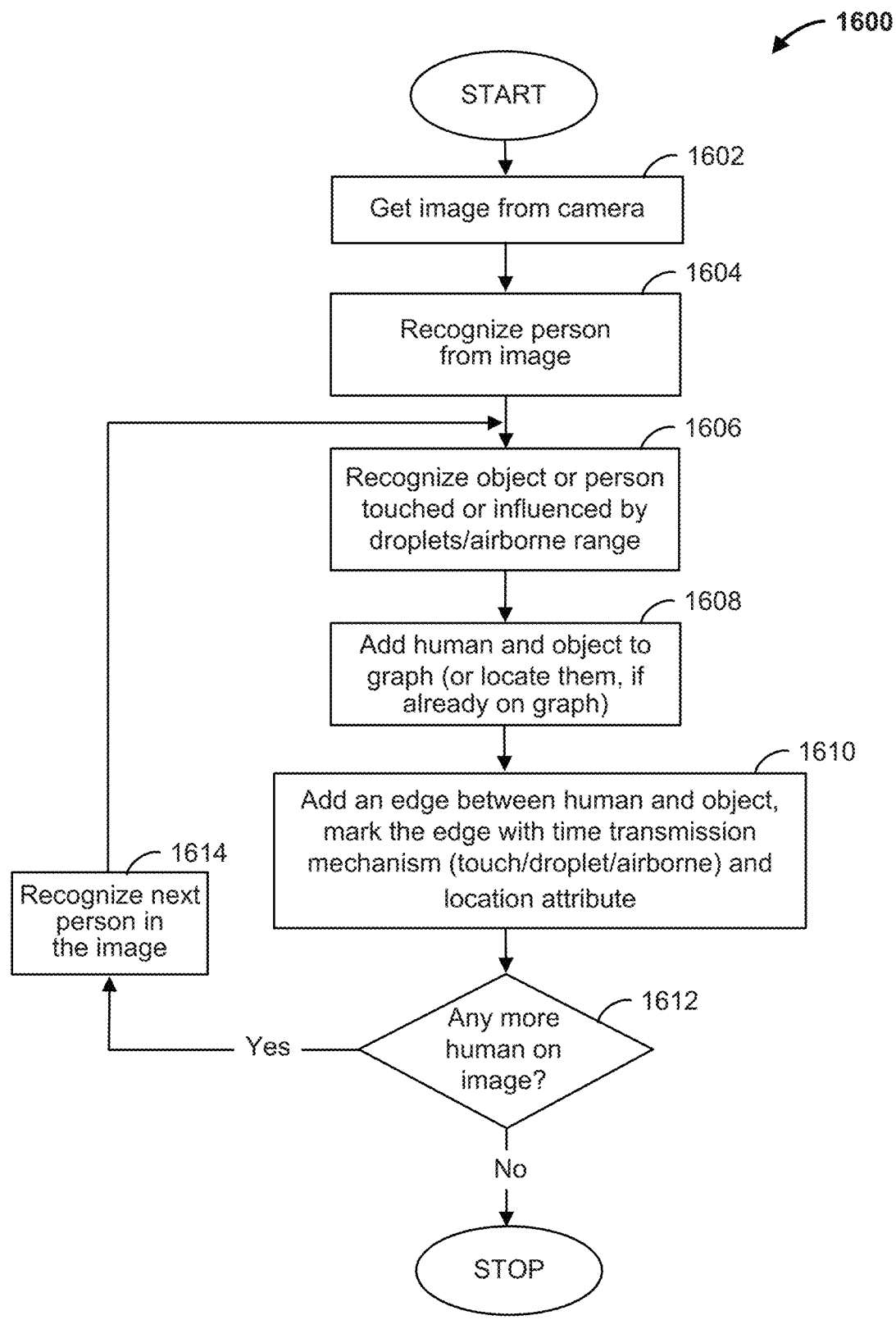
FIG. 16 is a flowchart of another example method that can be carried out by the personal monitoring system of FIG. 10 in accordance with some embodiments.

FIG. 16 illustrates a flowchart of an example method 1600 to generate a contamination graph and can be carried out by the personal monitoring system 1000. Beginning at step 1602, computing device 152 receives an image from a camera. At step 1604, computing device 152 detects a person in the image. Further, and at step 1606, computing device 152 determines that the person touched an object in the image, or, in some examples, approached within a droplet/airborne range. For example, computing device 152 may apply the method of FIG. 15 to determine the person touched the object. In some examples, if the person is determined not to have touched an object, the method proceeds to step 1612. In some examples, at step 1606, computing device 152 determines whether the person is within a range (e.g., droplet range or airborne range) of the room in which person from step 1604 is in.

At step 1608, computing device 152 generates graph data identifying and characterizing the detected person and object, and may store the graph data in a memory device, such as within database 116. In some examples, computing device 152 determines that the person and object have already been added to the graph data. At step 1610, computing device 152 updates the graph data to include an edge between the person and the object. In addition, computing device 152 tags the edge with one or more of time, transmission mechanism (touch/close-contact/droplet/airborne), and location attributes. The time attribute may indicate the time the image was captured (or received), and the location attribute may indicate a geographical location, such as an address, a zip code, or latitude and longitude coordinates, for example.

At step 1612, the computing device 102 determines if there are any additional people that were detected within the image at step 1604. If there is an additional person, the method proceeds to step 1614, where the additional person is recognized (e.g., selected). The method then proceeds back to step 1606, where an object that the additional person touched is determined. Otherwise, if at step 1612 there are no additional persons, the method ends.

Figure 17:
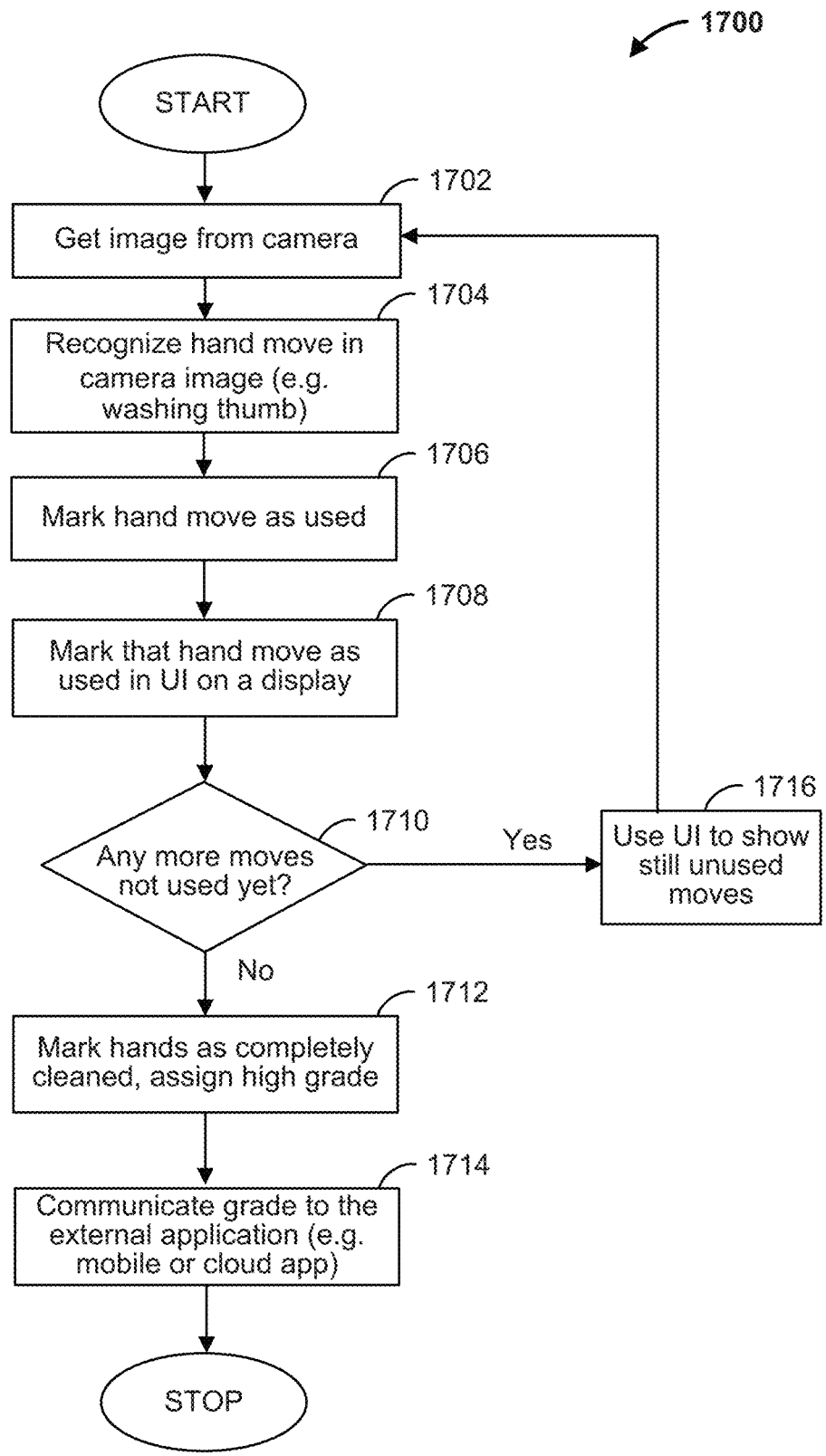
FIG. 17 is a flowchart of another example method that can be carried out by the personal sanitation monitoring system of FIG. 10 in accordance with some embodiments.

FIG. 17 illustrates a flowchart of an example method 1700 to detect proper handwashing techniques, and can be carried out by the personal monitoring system 1000. Beginning at step 1702, computing device 152 receives one or more images from a camera. At step 1704, computing device 152 determines that a body part, such as a hand, has satisfied one more movements (see, e.g., FIG. 35) based on the one or more images. For example, as described herein, computing device 152 may determine a location of the body part in each image, and determine that a movement has occurred based on one or more of the locations. For example, computing device 152 may determine that a hand is in a predetermined orientation, and thus has performed a particular handwashing move. Further, the computing device 152 may determine that the body part has satisfied a predetermined body part movement (e.g., based on movement data stored in database 116).

Proceeding to step 1706, the computing device 152 generates data indicating that the hand has used a particular move and, at step 1708, displays an indication that the move was used. At step 1710, a determination is made as to whether the body part has satisfied all body part moves. If the body part has not satisfied all body part moves, the method proceeds to step 1716, where computing device 152 provides for display an indication of the body part moves the body part is yet to accomplish. The method then proceeds back to step 1702.

If, however, at step 1710 the body part has satisfied all of the body part moves, the method proceeds to step 1712. At step 1712, computing device 152 generates data indicating that the body part has satisfied all body part moves, and assigns a "high" grade to the person for completing the body part moves. Computing device 152 may, at step 1714, provide for display the grade for the person. For example, the grade may be displayed on a mobile application (e.g., that executes on a mobile device, such as a mobile phone). The method then ends.

For example, the method may determine whether a person has washed their hands properly. If all steps are completed, the high grade is assigned. However, if all steps are note completed (e.g., the thumbs are not washed properly), the user is notified of these areas of improvement.

Figure 18:
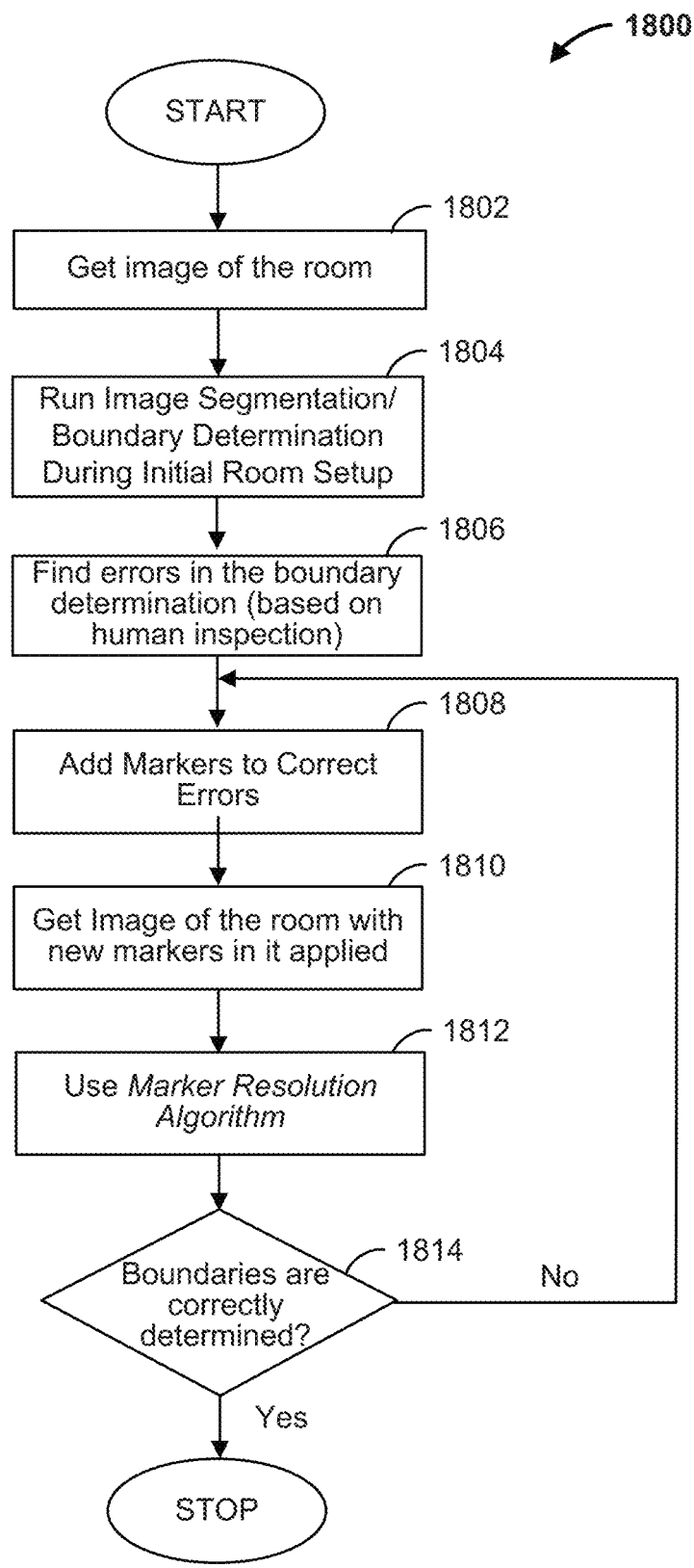
FIG. 18 is a flowchart of another example method that can be carried out by the personal monitoring system of FIG. 10 in accordance with some embodiments.

FIG. 18 illustrates a flowchart of an example method 1800 that can be carried out by the personal monitoring system 1000. The method 1800 may place physical or virtual markers in an environment, to modify AI boundary segmentation. Beginning at step 1802, computing device 152 obtains an image of a room. For example, computing device 152 may receive the image from camera 140. At step 1804, computing device 152 executes an image segmentation algorithm to determine boundaries of objects in the room. Further, and at step 1806, errors in the boundary are determined. For example, a user may view the contours of the objects in relation to the object themselves in the image, and determine there is an offset between the determined contours and the objects.

At step 1808, markers are added to the objects to correct for the discrepancy. For example, the user may add physical markers, such as physical marker 1202, to one or more of the objects. In some examples, placing markers includes the user generating virtual makers, such as first virtual marker 1204, with the marker configuration data stored in database 116. At step 1810, another image is obtained from the room. Further, and at step 1812, computing device 152 applies a marker resolution algorithm to the obtained image. The marker resolution algorithm identifies the markers within the image, and combines an area of the image associated with the marker with the contour generated for the object to generate an adjusted contour for the object. The marker resolution algorithm may correspond to the method of FIG. 13, for example. In some examples, a user may, via a graphical user interface, generate virtual makers, such as first virtual marker 1204, based on marker configuration data stored in database 116. The area of the image associated with the marker may be based on the virtual markers, as described herein.

The method proceeds to step 1814, where a determination is made as to whether the boundaries have been correctly determined. For example, computing device 152 may present within a display (e.g., display 206) selectable options for a user, where one option indicates the boundaries of the object are not correct, and another option indicates that the boundaries of the object are not correct. If the boundaries of the objects are incorrect, the method proceeds back to step 1808, where additional markers are added to the objects. Otherwise, if the boundaries are correct, the method ends.

FIG. 19 illustrates a flowchart of an example method 1900 that can be carried out by the personal monitoring system 1000. Beginning at step 1902, computing device 152 detects a person "P," among one or more persons, in an image received, for example, from a camera. At step 1904, a 3-dimensional position of the person "P" is determined within the image. For example, computing device 152 may apply triangulation of images from multiple cameras, or may apply a trained machine learning or computer vision process to determine the person "P" in the image, and may further determine the 3D position of the person, including a depth of the person in the image. At step 1906, computing device 152 determines an identity of the person. In some examples, the person is identified based on the execution of facial recognition algorithms. In some examples, person "P" is identified based on detecting a marker (such is marker 806 or marker 1110) on person "P." For example, each of a plurality of persons may wear a marker at a designated area on their person. Based on where the marker is detected on the person or an identifying aspect of the marker, computing device 152 identifies the person.

Proceeding to step 1908, a graph node of a contamination graph (see, e.g., FIG. 30) is generated for the person. If a node has already been created for the person, the node for the person is determined within the graph.

At step 1910, operations are performed for any other person detected within the image at step 1902. The operations include, for each other object or person in the image, finding the node with the other person or object in the graph, and determine whether the other person or object is within a predetermined distance (e.g., 6 feet) to the original person. The predetermined distance may be, for example, a number of pixels when the geometry of room, and camera position in the room, is known. If the original person is within the predetermined distance to the other person or object, computing device 152 generates an edge between the original person and the other person or object, and tags the edge as "influenced." In some examples, computing device 152 further tags the influenced edge with additional attributes, such as an attribute describing a type of influence (e.g., "touched," "close contact," "contaminated," "within droplet range," "time of contact," etc.). The method then ends.

Figure 20:
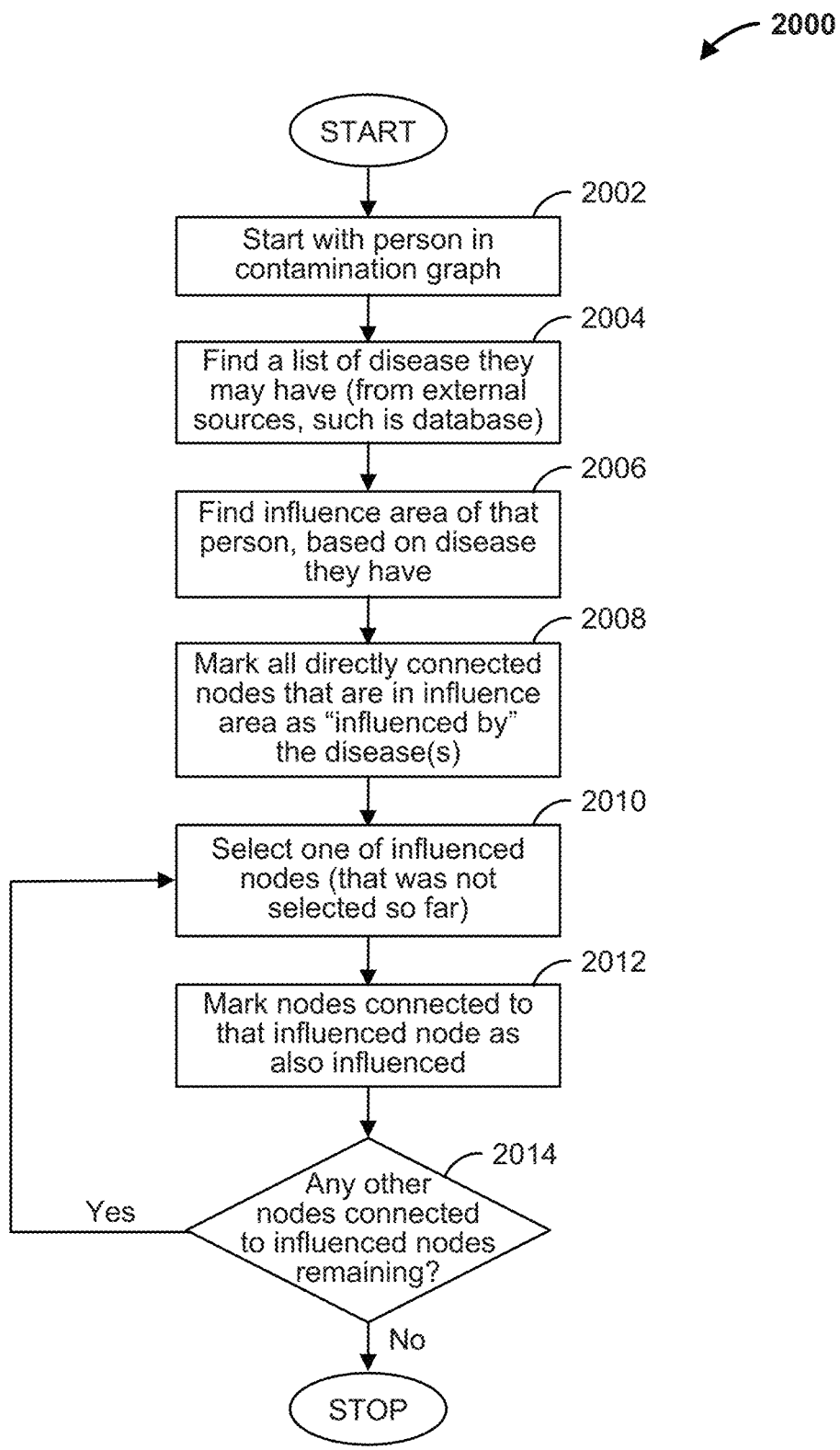
FIG. 20 is a flowchart of another example method that can be carried out by the personal monitoring system of FIG. 10 in accordance with some embodiments.

FIG. 20 illustrates a flowchart of an example method 2000 to determine how a known disease of any particular person in the graph would influence the contamination of other nodes in the graph, and can be carried out by the personal monitoring system 1000. Beginning at step 2002, computing device 152 obtains a contamination graph, such as a graph as described herein, from a memory device, such as database 116. The contamination graph may include a node for a person, such as a node as described with respect to FIG. 19.

At step 2004, commuting device 152 communicates with a server to obtain a list of diseases the person may have due to contaminations with other objects as identified by the graph. At step 2006, computing device 152 may determine an influence area of the person based on the types of diseases. Proceeding to step 2008, computing device 152 tags all connected nodes in the graph as "influenced by" the types of diseases for the person. A node may be considered directly connected when a time attribute of an edge between nodes indicates a time that is after the person was created in the contamination graph.

The direct connection between nodes means not only that there is an edge between the nodes, but that appropriate attributes of the edge match—e.g. if the disease of the person transfers only by touch, then only edges that are marked with touch, but not airborne, type of influence would be considered connected. Similarly, time when edge is created would be taken into account—e.g. if the edge between nodes was added after the person from step 2002 already left the room, and the disease requires immediate close contact with the person 2002 to transmit, those nodes wouldn't be considered to be influenced.

At step 2010, one of the influenced nodes is selected. At step 2012, computing device 152 also tags nodes that are connected to the influenced node as influenced. The method then proceeds to step 2014, computing device 152 determines whether any other "influenced" nodes remain. "Influenced" relation between the nodes may depend on the characteristics of a particular disease—e.g., an airborne disease may be known not to stay airborne after 1 hour, so people who were in the room 2 hours later may be unaffected. If any additional influenced nodes remain, the method proceeds back to step 2010 to select the next influenced node. Otherwise, if no influenced nodes remain, the method ends.

Figure 21:
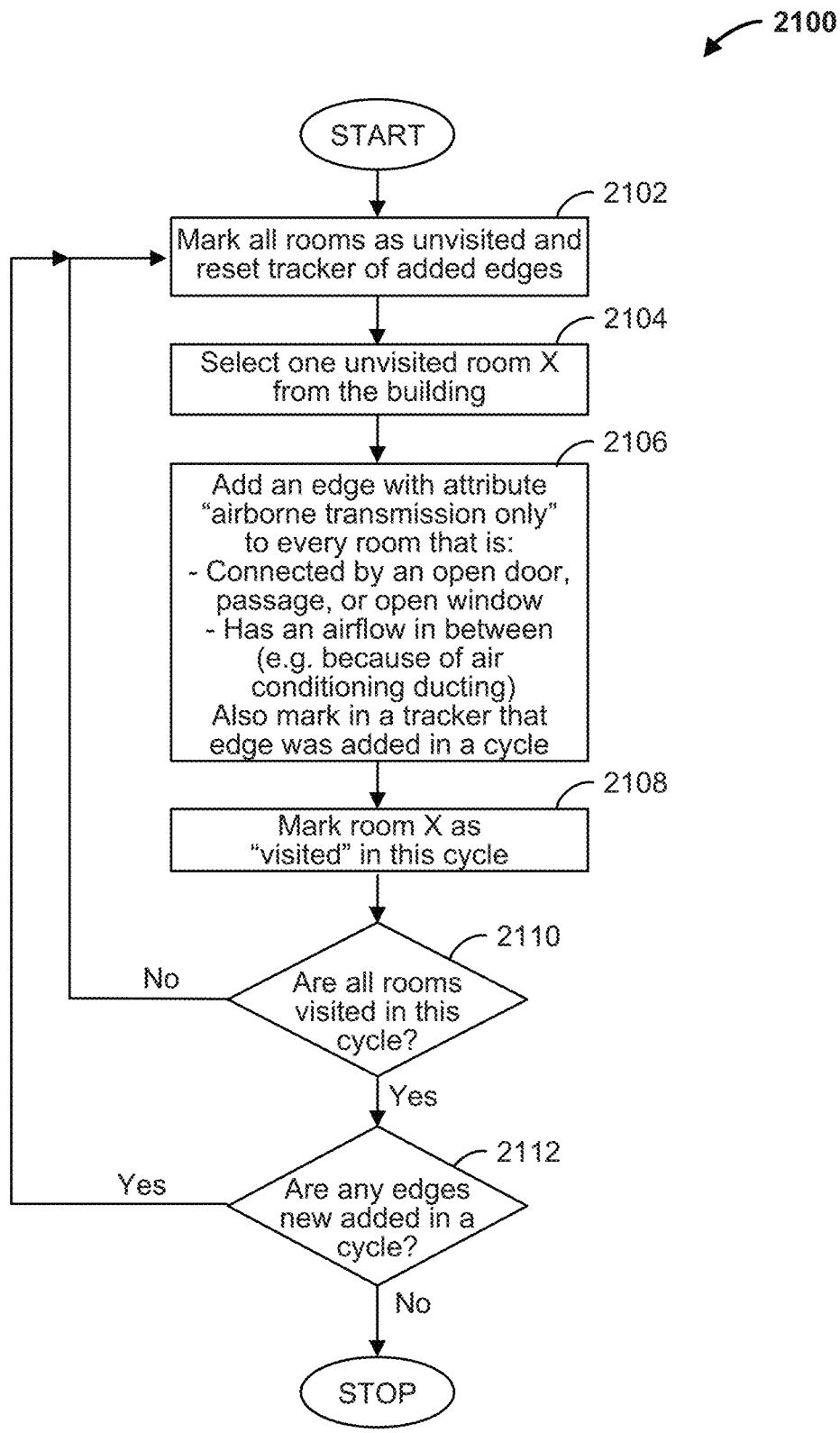
FIG. 21 is a flowchart of another example method that can be carried out by the personal monitoring system of FIG. 10 in accordance with some embodiments.

FIG. 21 illustrates a flowchart of an example method 2100 that can be carried out by the personal monitoring system 1000. That flowchart may generate the portion of a contamination graph that describes airborne transmission. Beginning at step 2102, computing device 152 generates graph data identifying a plurality of rooms as unvisited with no edges associated with any of the rooms. At step 2104, computing device 152 selects an unvisited room "X" from the plurality of rooms. At step 2106, an edge is added from the selected room to any other rooms which are connected by an open door, passageway, open window, air conditioning/HVAC system flow, or any other situation where airflow is allowed between the room. Further, the edge is tagged with an attribute of "airborne transmission only."

At step 2108, the room is tagged with an attribute of "visited" in a current cycle. At step 2110, computing device 152 determines if all rooms have been visited in the current cycle. If all rooms have not yet been visited in the current cycle, the method proceeds back to step 2102. Otherwise, if all rooms have been visited in the current cycle, the method proceeds to step 2112.

At step 2112, computing device 152 determines if there are any edges that were added in the current cycle. If any edges were added, the method proceeds back to step 2102. Otherwise, if no edges were added, the method ends.

Figure 22:
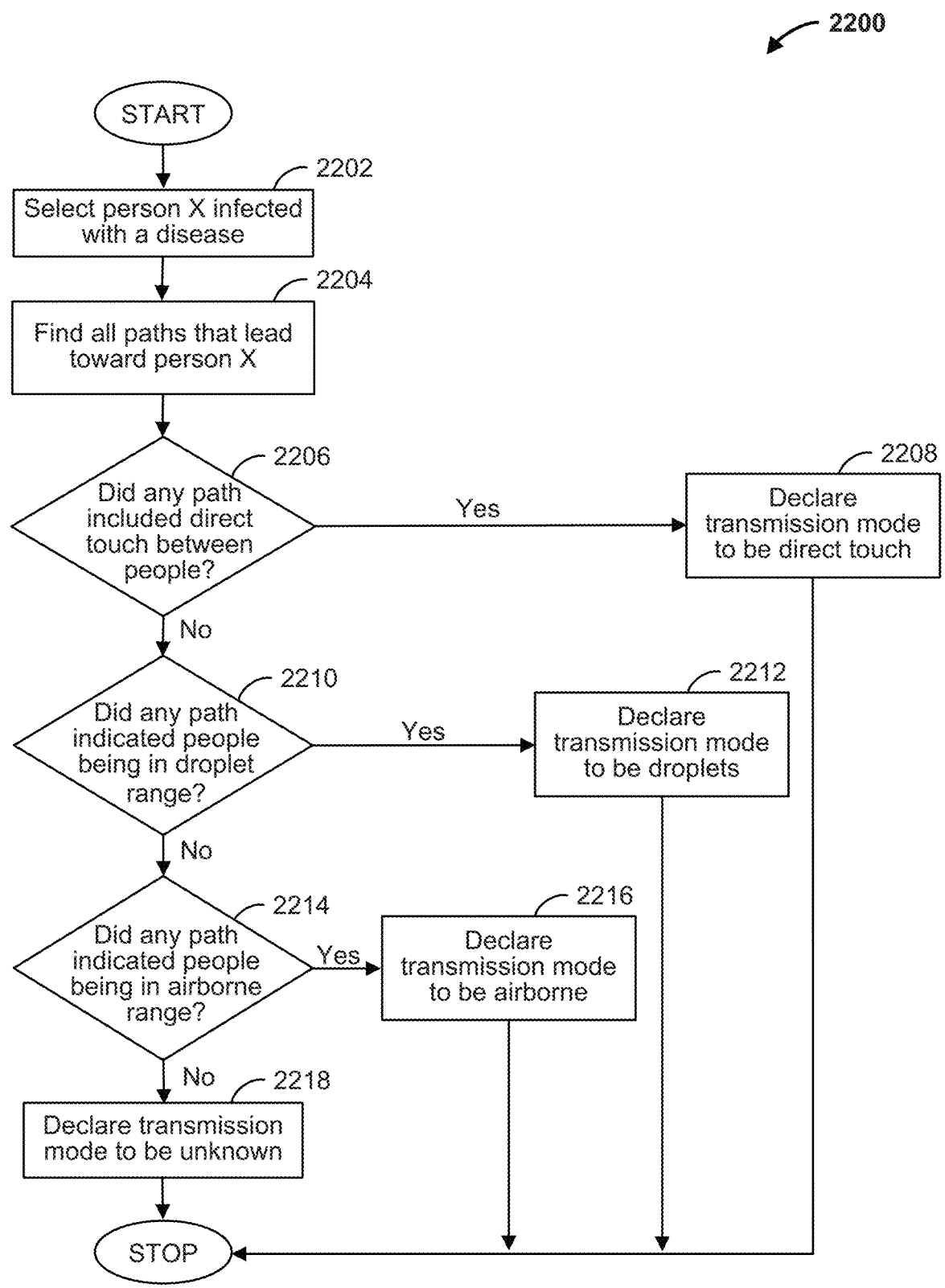
FIG. 22 is a flowchart of another example method that can be carried out by the personal monitoring system of FIG. 10 in accordance with some embodiments.

FIG. 22 illustrates a flowchart of an example method 2200 that can be carried out by the personal monitoring system 1000, and that determines modes of disease transmission. Beginning at step 2202, computing device 152 obtains graph data from a memory device, such as from database 116, and selects a node identifying a person "X" infected with a disease.

At step 2204, the computing device 152 finds all paths (e.g., a collection of connected edges) that lead to the person "X" node. At step 2206, computing device 152 determines whether any of the edges indicate (e.g., via an attribute) a direct contact (e.g., "touched") with another person. If there was contact with another person, the method proceeds to step 2208, where the edge is tagged with a transmission mode of "direct touch." The method then ends. If, however, there wasn't contact with another person, the method proceeds to step 2210.

At step 2210, computing device 152 determines whether any edges were tagged with an attribute indicating the person was in droplet range (e.g., 6 feet) of another person. If the person was in droplet range of another person, the method proceeds to step 2212, where the edge is tagged with a transmission mode of "droplets." The method then ends. If, however, the person wasn't within a droplet range of another person, the method proceeds to step 2214.

At step 2214, computing device determines whether any edges were tagged with an attribute indicating the person was in airborne range (e.g., 10 feet) of another person. If the person was in airborne range of another person, the method proceeds to step 2216, where the edge is tagged with a transmission mode of "airborne." The method then ends. If, however, the person wasn't within a droplet range of another person, the method proceeds to step 2218, where the edge is tagged with a transmission mode of "unknown." The method then ends.

In general, it is possible that a person that was infected by an airborne transmission is marked as "direct touch" (because if you are close enough to touch, you are also in the airborne range). Therefore, previous can determine possible modes of the infection—e.g., are there any patients, from the plurality of patients, that could have only be infected by the airborne mode? Therefore, the method of FIG. 22 may be applied to every patient infected with the disease, to determine statistical distributions between airborne, droplet, and direct touch/close contact based transmissions. If the results of the application of the FIG. 22 method (e.g., algorithm) indicate the presence of airborne component of the transmission in the group, then the disease is capable of airborne transmission. Furthermore, by the statistical analysis of the distribution between airborne/droplet/direct touch, the person of ordinary skills in the statistics would be able to determine percentage of the transmission over those transmission mechanisms (as in "we know that 80% of infected people touched each other, 5% were in droplet range, and remaining 15% may have only been airborne transmission").

Figure 23:
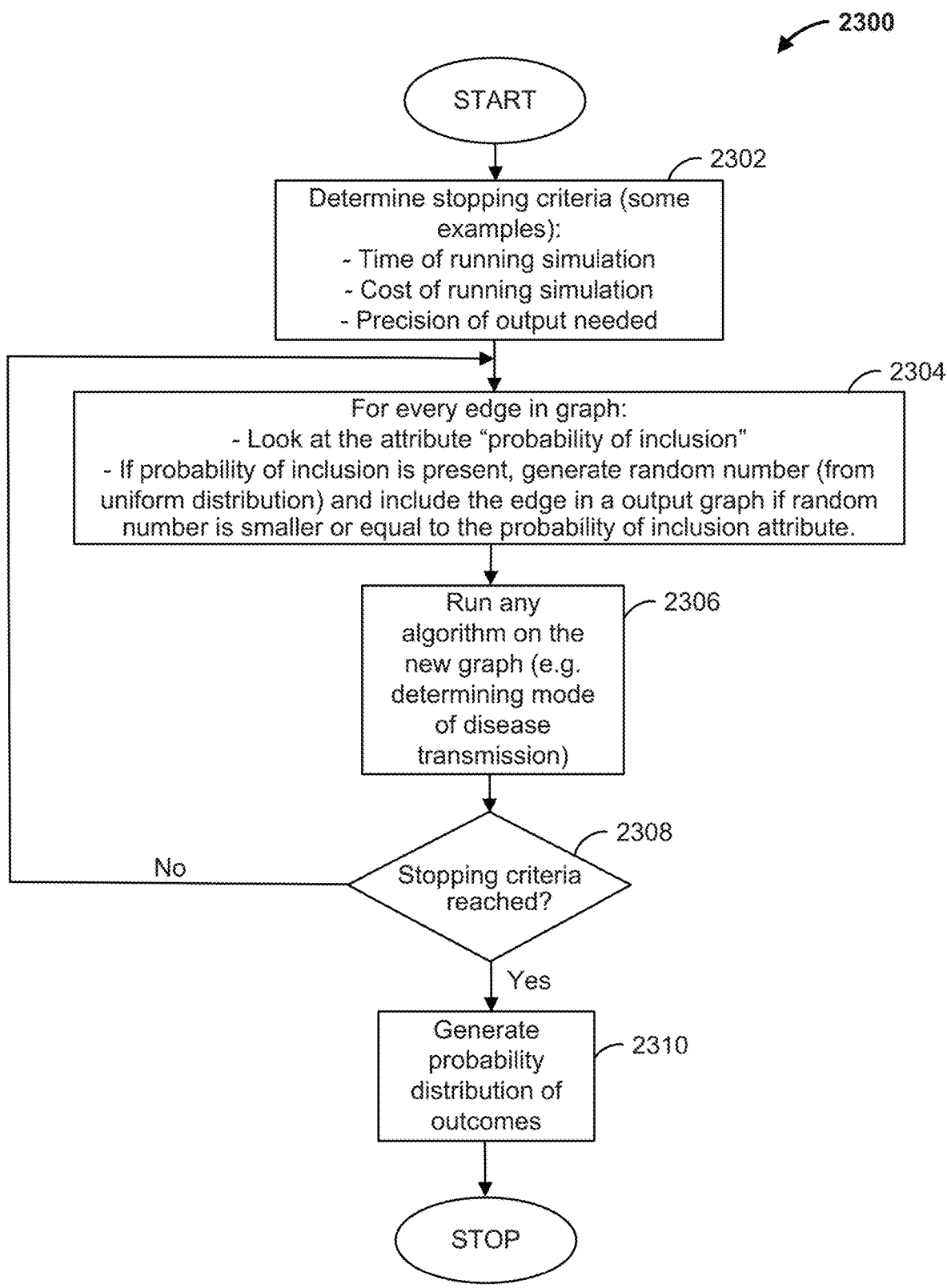
FIG. 23 is a flowchart of another example method that can be carried out by the personal monitoring system of FIG. 10 in accordance with some embodiments.

FIG. 23 illustrates a flowchart of an example method 2300 that can be carried out by the personal monitoring system 1000. This method deals with the probabilistic interpretation of the edges of the graph, when for the reasons of the imprecision of algorithms, or occlusions on the analyzed images, there are no assurances a touch occurred. An example of that situation would be if a hand of a person cannot be seen in an image. As such, a group of AI techniques known under the name of "pose estimation techniques" may be employed to determine an approximate position of the person's hand. In that case, an edge between nodes is added in the graph, and the edge is determined to be probabilistic (e.g. 90% chance there was close contact in the graph). The problem algorithm from FIG. 23 solves is how to apply the other graph analysis algorithms described in this invention on probabilistic edges that have a known probability of inclusion. It may be based on the application of the techniques from the family of Monte Carlo simulations to the contamination graph.

Beginning at step 2302, computing device 152 determines a stopping criteria for a graph. The stopping criteria may include, for example, a time of running simulation, a cost of running a simulation, or a precision of output required.

At step 2304, and for every edge in the graph, computing device 152 obtains a "probability of inclusion" attribute value for an edge of the graph. If the "probability of inclusion" attribute value is present (e.g., is greater than 0), computing device 152 generates a random number, and includes the edge in an output graph if the random number is less than or equal to the "probability of inclusion" attribute value.

Proceeding to step 2306, computing device 152 applies an algorithm to the output graph. The algorithm may determine a mode of disease transmission, such as the method described with respect to FIG. 22. At step 2308, a determination is made as to whether the stopping criteria has been met. If the stopping criteria has not been met, the method proceeds back to step 2304 to process a next edge of the graph. Otherwise, if the stopping criteria has been met, the method proceeds to step 2310, where computing device 152 generates a probability of distribution outcomes based on the output graph. The computing device 152 may provide for displaying the probability of distribution outcomes. The method then ends.

Figure 24:
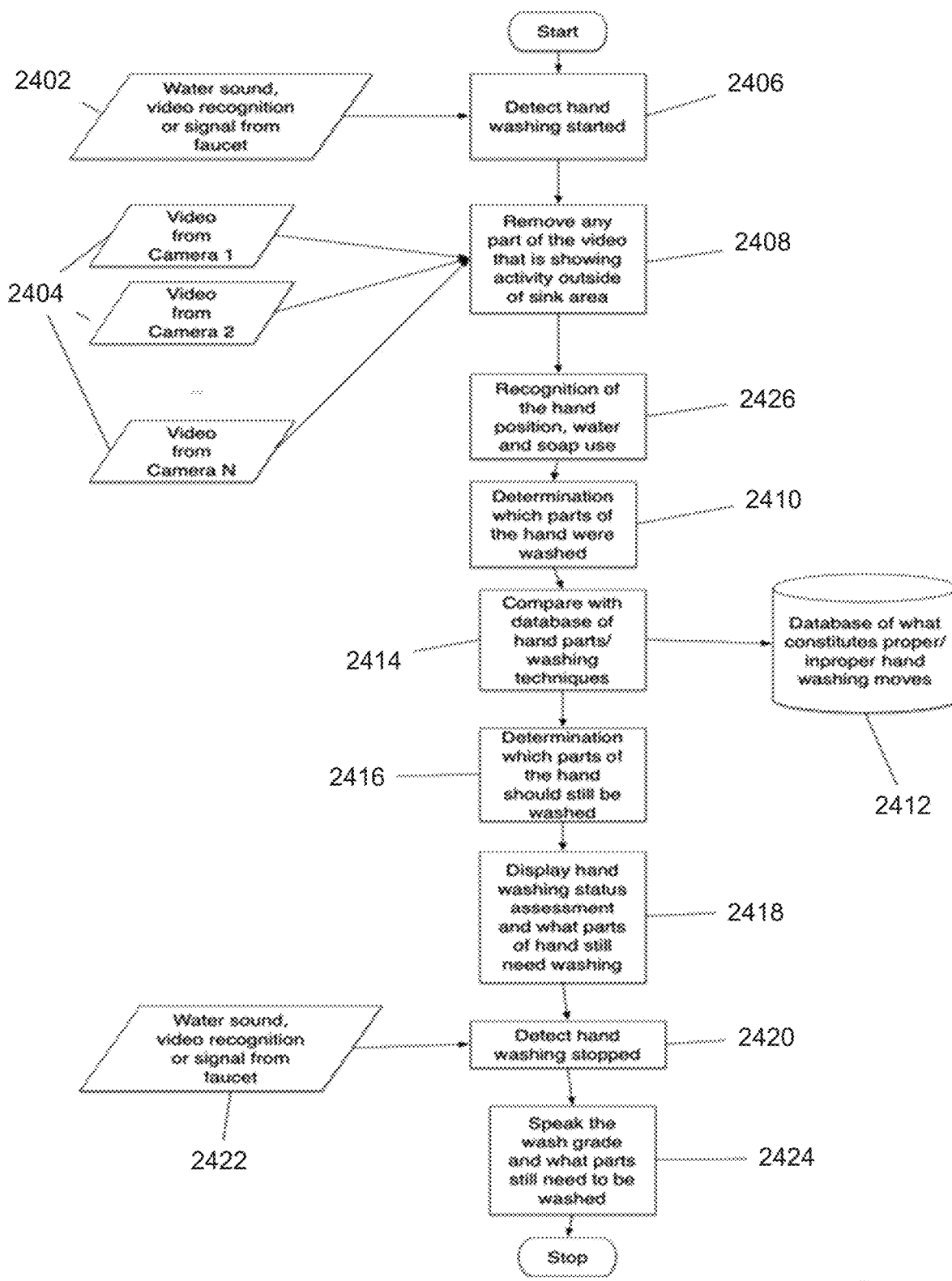
FIG. 24 is a flowchart of an example method 2400 to monitor and grade a handwashing technique, in accordance with some embodiments.

FIG. 24 is a flowchart of an example method 2400 to monitor and grade a handwashing technique. Method 2400 may be performed by a smart sink, such as the apparatus 2500 of FIG. 25, for example. Step 2406 detects that hand washing started. This detection is based on the input from the external system or environment 2402, which itself is based on the sound of the water, video recognition from a camera, such as camera 140, or any video camera that is part of the system. It could also get an external signal from the faucet, sink, or other bathroom systems.

Step 2408 may be optional and is used to remove a part of the picture falling outside of the sink to ensure the privacy of the people standing behind the sink and make a job of the video recognition of the handwashing simpler. Those videos originate from the external cameras 2404 (which themselves can be any video camera).

Step 2426 may use video streams to recognize hand position (e.g., "Handwashing the thumb") and water and soap use. Step 2410 determines what parts of the proper handwashing technique (e.g., such as those described with respect to FIG. 35) were exercised, and in step 2414, the techniques are compared with the database of the correct (and improper) handwashing techniques 2412. That allows us to detect in step 2416 which parts of the hand still need to be washed and displays (on any external display, including display on the phone or other personal device such are smart glasses) which parts of the hand still need to be washed in the step 2418.

Steps 2406 to 2420 repeat in a loop until the handwashing is stopped, which is detected in step 2420 (based on the stopping of the water sound, video analysis, or signal from faucet as shown in 2422). Then final grade of the handwashing is presented on display (e.g., display on the smartphone, smart glasses, display 2408, or any other display) and the speaker is used to pronounce the grade in step 2424, which could be any speaker connected with the system, including a speaker on the smartphone/smart glasses. Speaker and display could also be used for the training information (how to wash hands better), and the volume of the feedback could be controlled (e.g., so that in the public bathroom, it could be used as the mechanism to encourage better handwashing through the peer pressure).

For the correct recognition of the handwashing to be possible, the computer vision algorithm 2406 will need the data of the proper handwashing technique, as well as improper handwashing techniques. If this data is not readily available, it would need to be collected. This disclosure also covers a method for collecting proper handwashing technique data. It consists of bringing a person who would demonstrate proper handwashing technique near the sink, with cameras installed in various positions around the sink (cameras can be independent cameras or mounted on the set of the devices).

Figure 25:
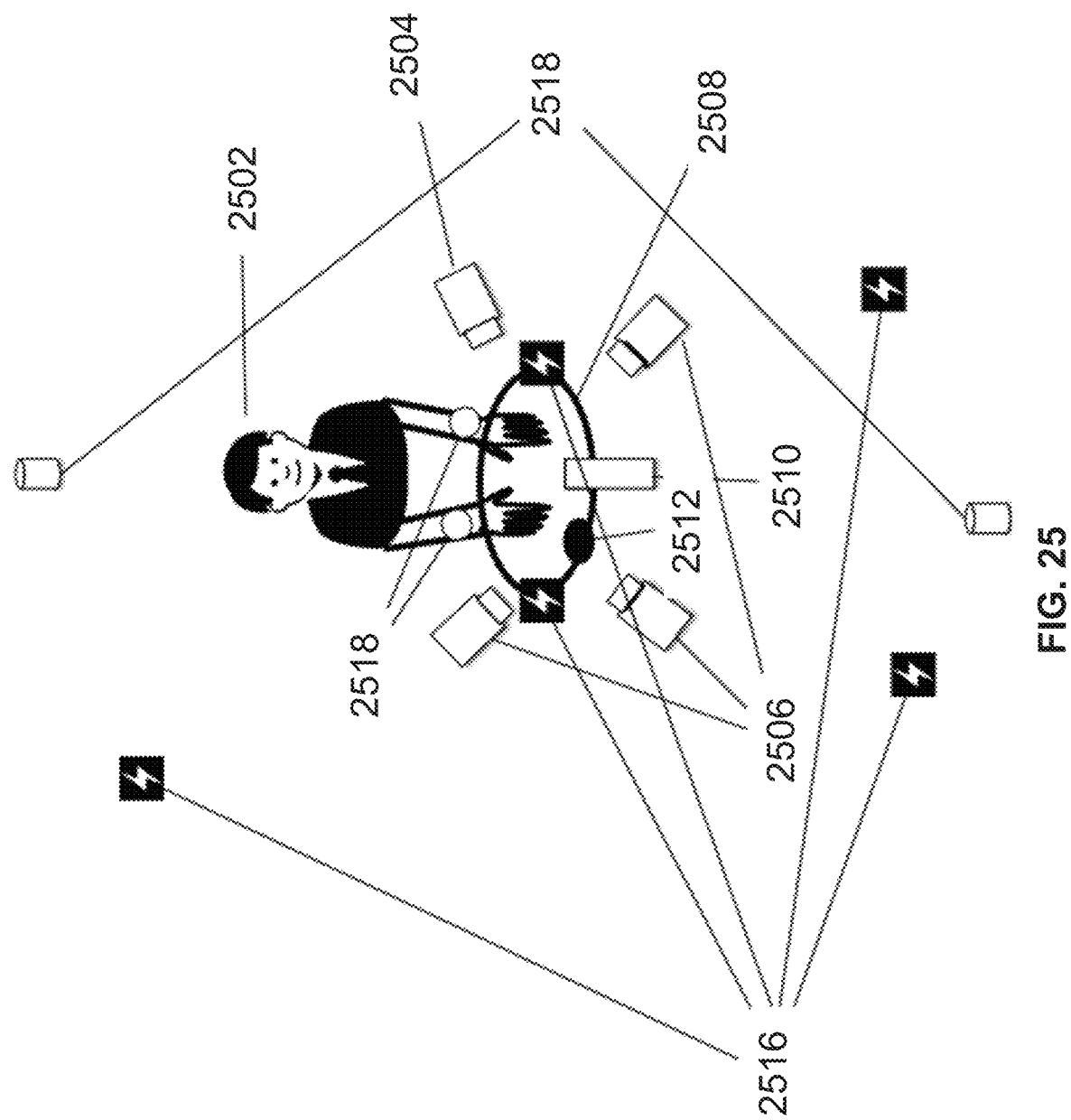
FIG. 25 is an apparatus for collecting training data for the training of a handing washing monitoring and grading algorithm, in accordance with some embodiments.

FIG. 25 is an apparatus 2500 (e.g., smart sink) for collecting training data for the training of a handing washing monitoring and grading algorithm, such as the method 2400 of FIG. 24. The location of the person 2502 with respect to the sink 2508 and video cameras 2504, 2506 is illustrated. The person 2502 would perform the sequence of the correct, as well as incorrect handwashing moves in the sink 2508 while using liquid soap or soap bar 2512 and water from the faucet 2510. In some cases, water from the faucet 2510, or soap 2512 will not be used (to demonstrate incorrect handwashing technique). The system also can control computer controllable lights 2516 and speakers 2518. The set of the video devices 2506, wrist-mounted video devices 2518, and the master video device 2604 would take the handwashing video from multiple angles. Devices 2504 and 2506 could be any form of the video device, such as a video camera or camera 140. Wrist mounted device 2518 could be any video camera, or it could be hand sanitizing device 102 equipped with the video camera. Devices 2504 and 2506 may have their video timestamps coordinated. That allows for labeling only video streams from the device 2504 as "correct/incorrect" regarding the particular technique and then automatically propagating those labels to the other devices 2506 that have taken the same picture from the different angles. Examples of the labels are "correctly washing left thumb," or "Incorrect—doesn't use soap"). Those labels are propagated so that labels from the master video device 2504 are applied on the same timestamps on the videos taken from the different angles on devices 2506 and 2514.

Furthermore, pictures taken through the different cameras look different. For example, an image from the wrist-mounted wide-angle (or even fisheye-lens) camera mounted on the watch would have a different perspective (and requires different training data) then the camera array on the device installed near or in the sink. Video is post-processed in software with various filters that simulate different cameras (e.g., different fields of view of the camera, different focal lengths, different lighting conditions, or any other lens effect specific for various types of lenses). This data augmentation technique is used to increase the size and diversity of the training set for the computer vision algorithm training.

Finally, while the person 2502 is performing handwashing, the lights 2516 are varied in the color and intensity to simulate different lighting conditions. Similarly, the speakers 2518 are used to emit different sounds to simulate different sound conditions near the sinks (which is relevant if the audio is also used as a trigger for determining that the washing was started).

Moreover, the apparatus 2500 may be employed to determine proper handwashing techniques. For example, as person 2502 is washing their hands, the apparatus 2500 may capture images with devices 2504 and 2506, and may further apply one or more AI algorithms, such as computer vision algorithms, to the captured image data to determine whether one or more hand washing moves were correctly performed. Apparatus 2500 may perform method 2400 of FIG. 24, for example.

In some examples, apparatus 2500 may be modified into a "production" unit that can be installed near existing sinks and be used to monitor and grade proper handwashing. Such a "production" unit may have similar elements as the unit in FIG. 25 (without, in some examples, speakers 2518 and video devices 2518), and would add a computing unit, such as computing device 152, and may communicate over communication network 118. Production unit may, in some examples, be enclosed in a single waterproof case integrated with faucet and sink.

For example, in one embodiment, a system can be mounted near the sink, or integrated into the sink itself. The device may comprise a shell enclosing other components, such as one or more video cameras, a microphone, a speaker, a compute unit, a wireless communication device, and one or more of power/network cables. The shell may be waterproof. The device may be positioned in such a way, and cameras are focused so that cameras would have a clear view of a sink area. Further, the compute unit may perform the calculations necessary for detecting correct hand washing movements, or it could send parts of the video (or delegate part of the calculation) to a remote device (for example, a cloud enabled device).

Figure 26:
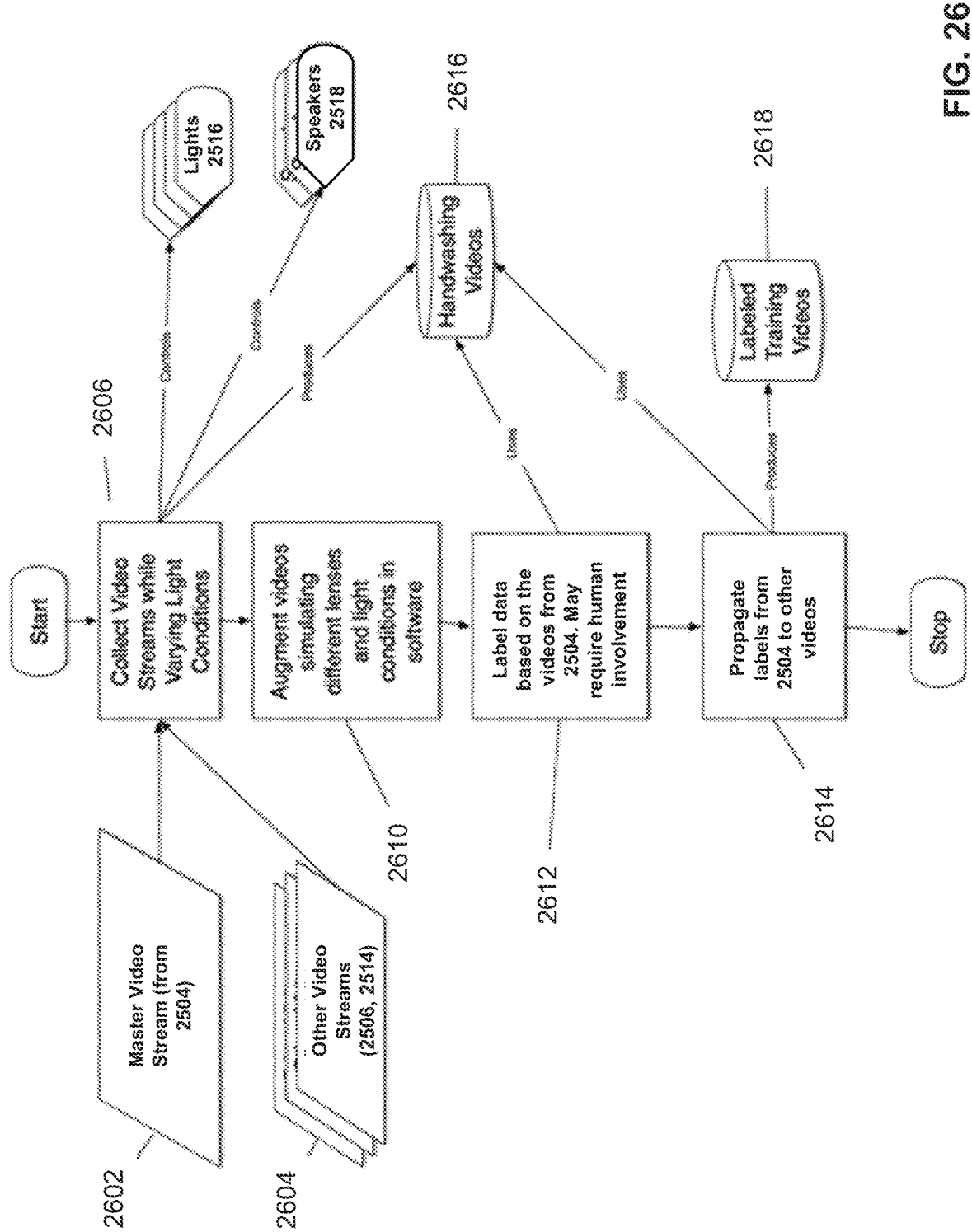
FIG. 26 is method for controlling the apparatus of FIG. 25 to collect training data, in accordance with some embodiments.

FIG. 26 is method for controlling the apparatus of FIG. 25 to collect training data, such as the training data of FIG. 25. The step 2606 collects the videos 2602 and 2604 (the videos are originating from the devices 2504, 2506, and 2514), while controlling light devices 2516 and speakers 2518 to simulate different light/sound conditions. Step 2606 stores videos in the database 2616 (that database could be in a classical database system, any big data system, file system, or any other system that could organize a set of video files). The videos are processed in software in data augmentation step 2610 to simulate various effects expected around real world-sinks, such are different lenses, lighting, and sound conditions. Step 2610 also stores those augmented videos in database 2616. Then in step 2612, labels are generated for the videos (which could be done manually or using any AI/computer vision algorithm that could label all or part of the image or any combination of the human and AI) for the video on 2504 stream. Labels for the timestamp in 2504 are propagated in step 2614 to all other videos in 2616, creating labeled handwashing videos stored in 2618.

Figure 27:
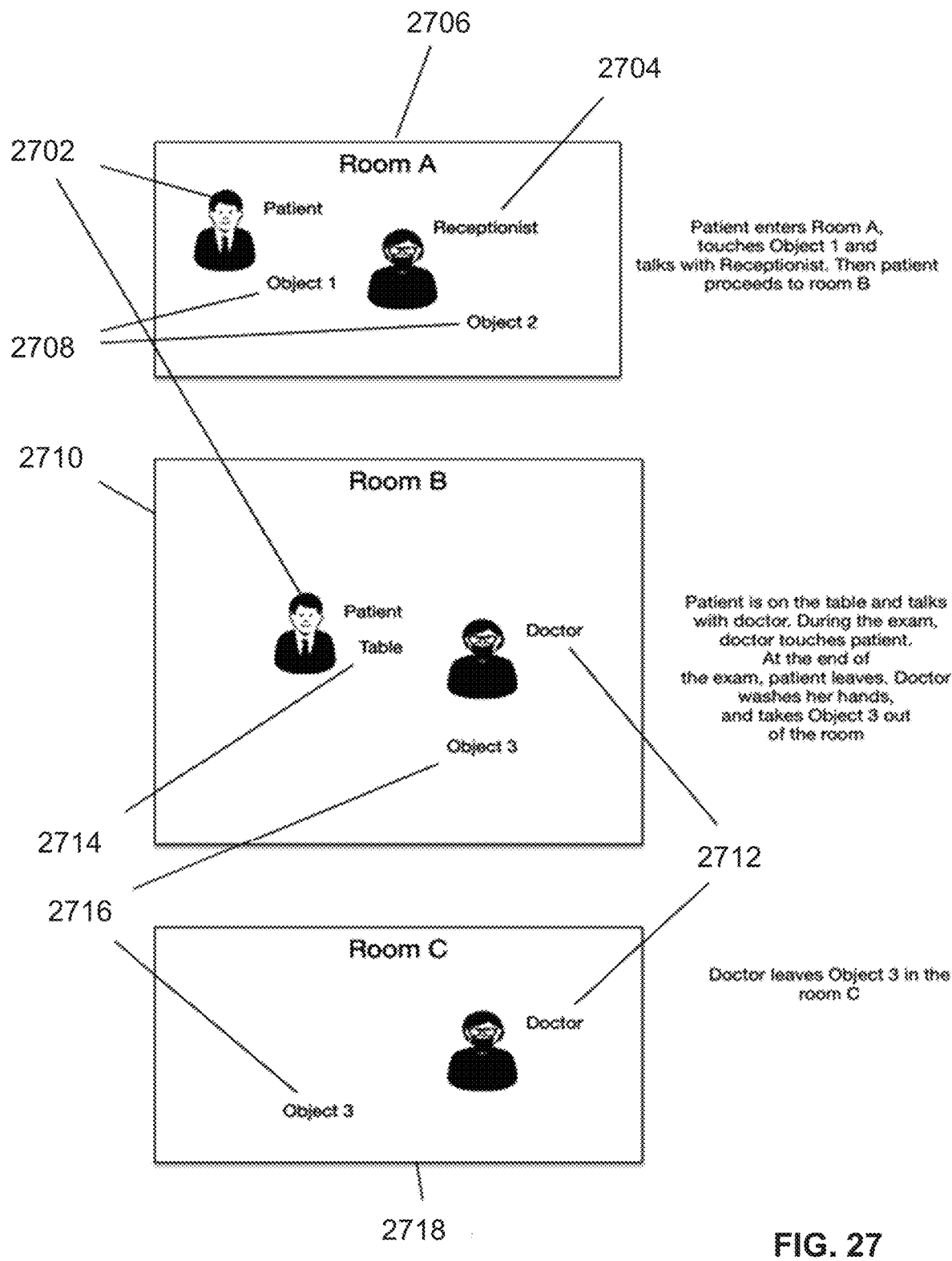
FIG. 27 illustrates a scenario of a patient visit to a hospital, in accordance with some embodiments.

FIG. 27 illustrates a scenario of a patient visit to a hospital. In this figure, patient 2702 arrives in the reception area 2706 (Room A), where the patient talks with the receptionist 2704. There are multiple objects 2708 in that room 2706, and the patient 2702 touches one of them (Object 1—e.g., a pen). After the check-in, the patient proceeds to the exam room 2710 (Room B). In Room B (2710), the patient (2702) would meet the doctor 2712 while sitting on the exam table 2714. During the exam, the doctor would touch the patient. Object 3 (e.g., doctor's phone) 2716 is in Room B (2710). At the end of the exam, the doctor (2712) washes their hands, takes Object 3 (2716), and moves to Room C (2718), where they leave the room. Patient 2702 didn't touch object 3 (2716), nor did doctor 2712 touch the object 3 (2716) between the time the doctor 2712 touched the patient 2702, and the time the doctor 2712 washed their hands.

The contamination graph would depend on the type of the disease that the patient 2702 has, and possibly of the air currents in the building. Some of the possible zones of contamination for the patient 2702 are shown on the FIG. 28.

Figure 28:
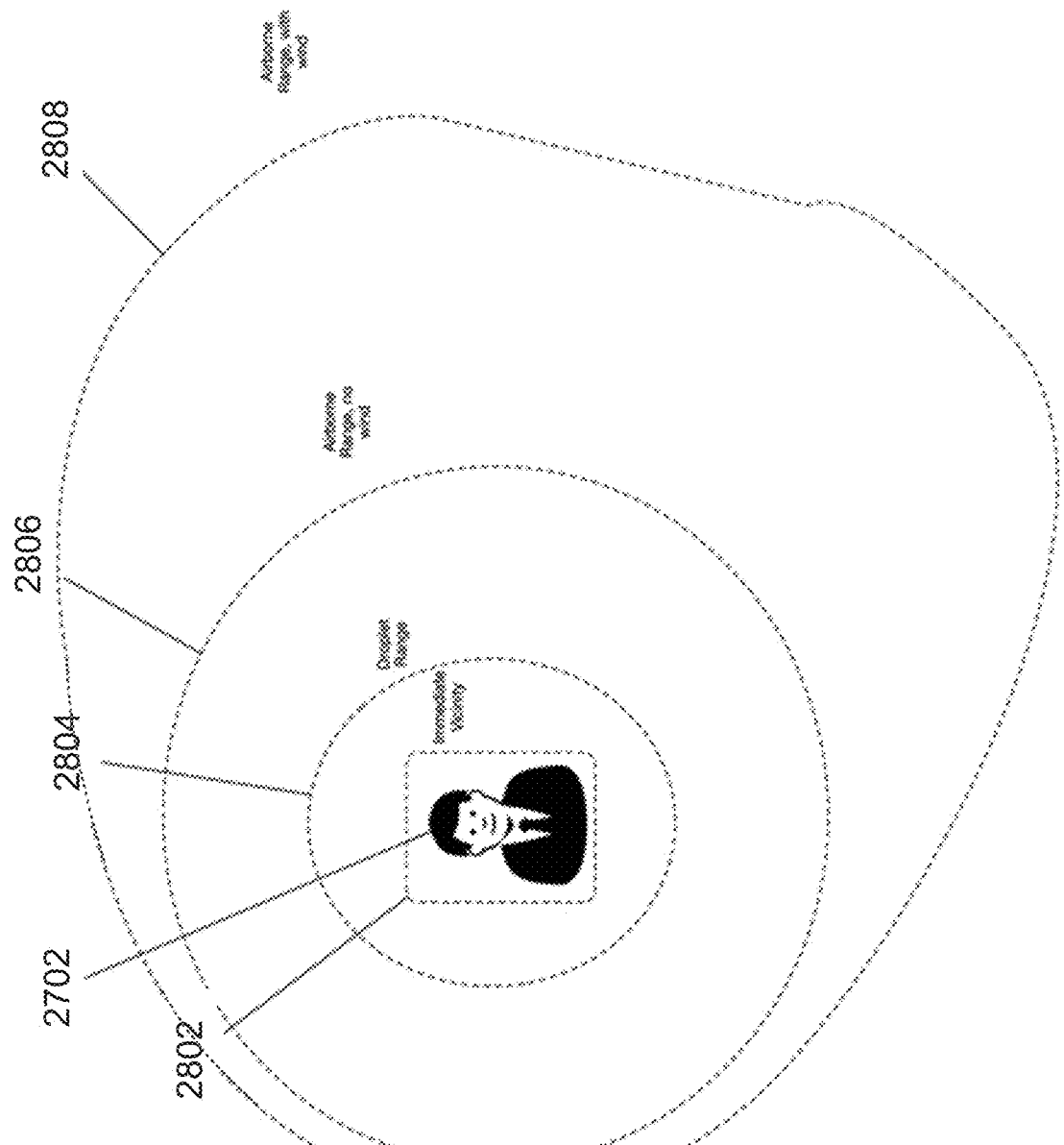
FIG. 28 illustrates contamination distances in accordance with some embodiments.

FIG. 28 illustrates distances that may be considered contaminated with respect to a person. As illustrated, there is an area near the patient 2702 that consists of what the patient 2802 touched. There is a range of the droplets 2804 (assumed to be six feet for this particular example and limited to the duration of patients 2702 presence). If the disease is airborne, it will affect the broader area 2806 for a longer time (in this case, a range of 50 feet and a duration of up to 1 hour after patient 2702 left is assumed, under the further assumption that there is no wind). However, if the building is air-conditioned or different forms of the air currents in the building, a broader and irregular airborne range 2808 is possible.

This disclosure covers the construction of the contamination graph using any of 2802, 2804, 2806, and 2808 ranges, with the range of air transmission 2808 calculated based on the computer modeling of the transmission range, based on the model of the building (some elements of which are floor plan, ducting, air conditioning, doors, filters in air conditioner, and others).

Figure 29:
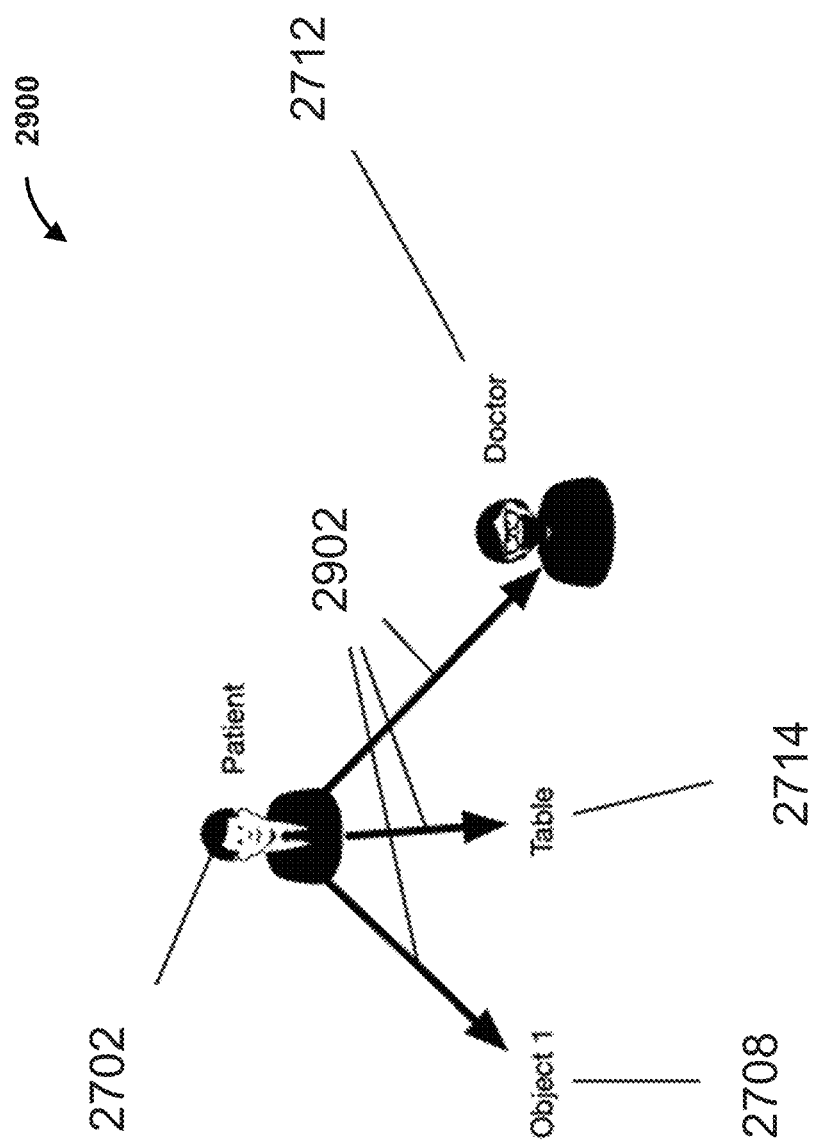
FIG. 29 illustrates a contamination graph in accordance with some embodiments.

FIG. 29 illustrates a contamination graph 2900 for the scenario of FIG. 27, with the assumption that the patient's illness is spread by direct contact with the patient. In the figure, a "Contaminated by" relation is shown by the arrows 2902. The patient 2702 has contaminated Object 1 (2708), which he touched while he was in Room A (2706). He has also contaminated Table (2714), while he was examined in Room B (2710). Finally, the doctor (2712) was briefly contaminated because the doctor has touched the patient during the exam, and then washed the hands later. While in this example, arrow 2902 represents a simple "contaminated by" relation, another embodiment assigns various other attributes to the arrow. Some examples of those attributes are the duration of the contamination, the probability of contamination, time when contamination occurs, and others.

Figure 30:
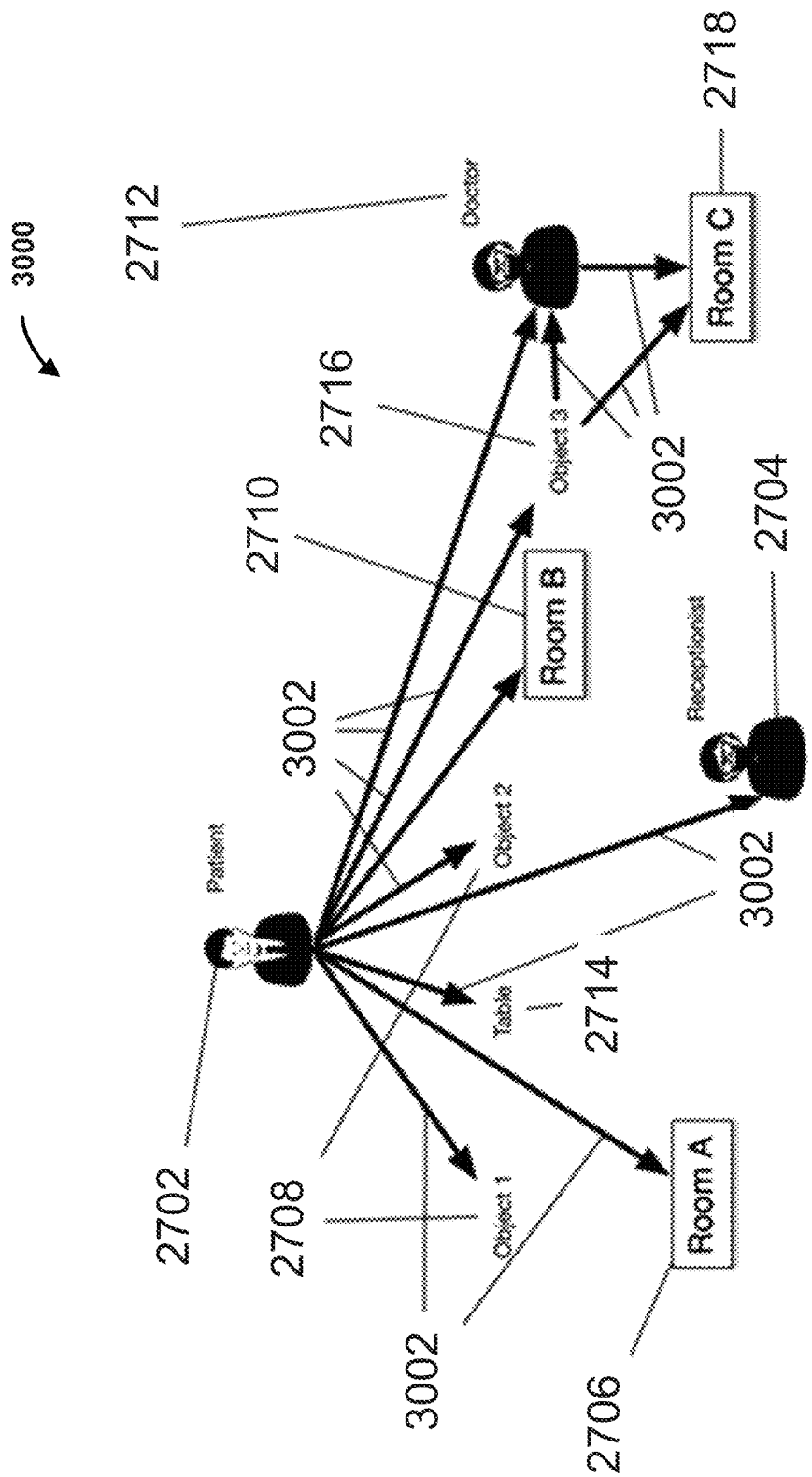
FIG. 30 illustrates a contamination graph, in accordance with some embodiments.

The contamination graph would be different if the range of the disease were airborne (ranges 2806 and 2808 in FIG. 28). For example, FIG. 30 illustrates a contamination graph 3000 with "contamination relation" edges 3002 for the scenario of FIG. 27, with the assumption that the patient's illness is airborne and that the air in the room that the patient visited doesn't flow to any other rooms. In this example, due to the presence of the patient, everything (objects, spaces, and people) in Rooms A and B was contaminated, so contaminated objects include Object 1 and Object 2 (2708), table (2714), Room A (2706), Room B (2710), doctor (2712), receptionist (2704) and Object 3 (2716). While the patient 2802 was not present in the Room C (2720), that room is contaminated by both Object 3 (2716) that the doctor (2712) carried in it, as well as the doctor's clothing (because the doctor has washed their hands, but not their clothing). This is also an excellent example of the additional attributes that could be added to the "contaminated by" relation—clearly, carrying the contaminated Object 3 (2716) in the Room C (2718) doesn't contaminate the whole Room C (2718) in the same way that the Room B (2710) in which the patient 2702 was—probably only some surfaces that the doctor 2712 and Object 3 (2716) have touched is now contaminated. Still, there is a good chance that surfaces in the Room C that are far from the Object 3 and doctor are not contaminated (so "Contaminated by" relation for Room C (2720) can be enhanced with the additional contamination attributes).

Figure 31:
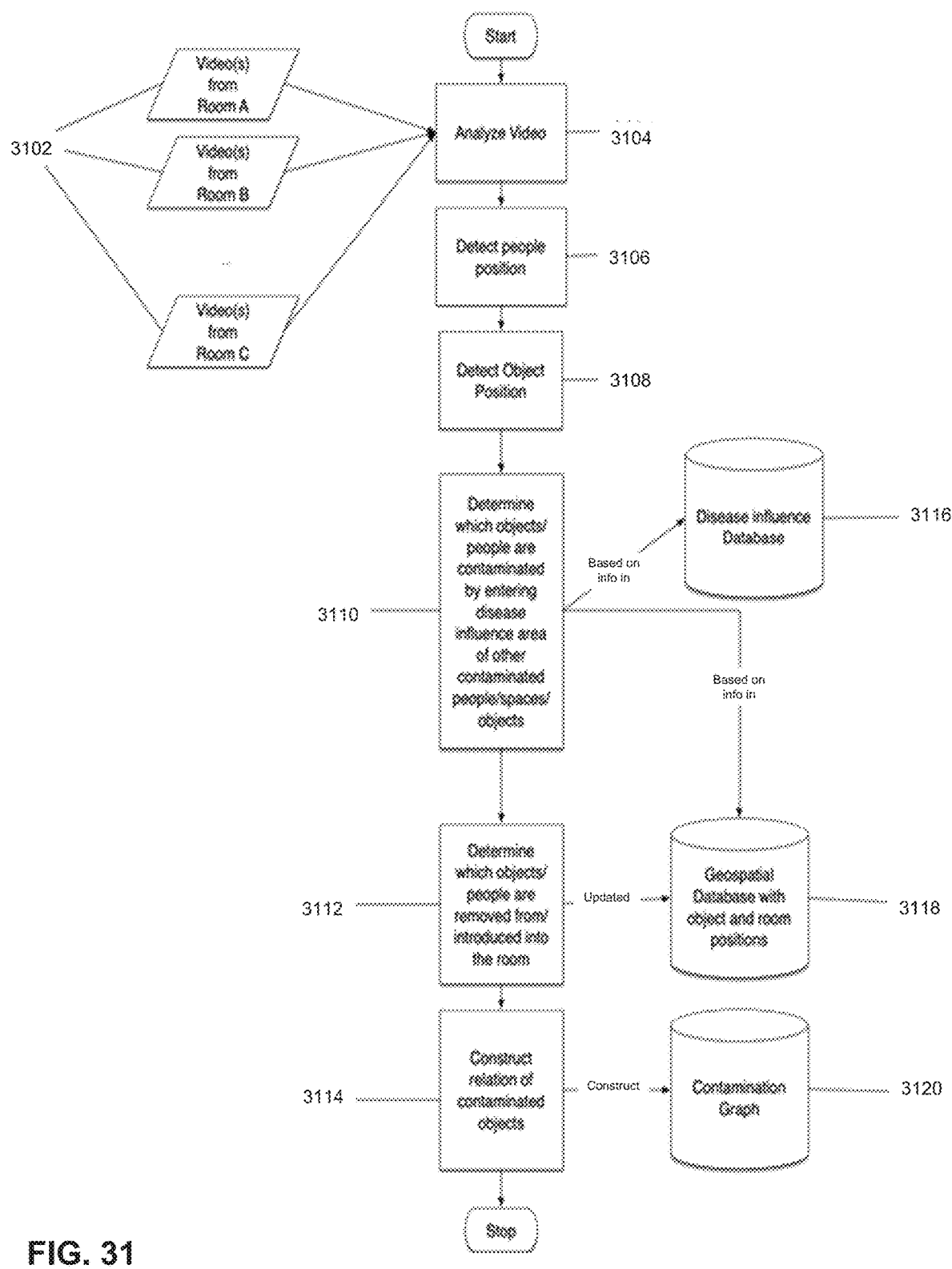
FIG. 31 illustrates a method to construct a contamination graph, in accordance with some embodiments.

FIG. 31 illustrates a method to construct a contamination graph. In this example, video sources from the rooms 3102 are sent to the computer algorithm 3104 to extract objects and people from the videos. At steps 3106 and 3108, positions of people and objects are extracted (using, for example, any of the well-known techniques for the object localization such as triangulation, reverse projection on the surface with a known location, AI-based depth map construction, and others).

In the step 3110 contamination relation between the objects, spaces and people are determined, based on the relative positions between them, data about disease influence (which is stored in the database 3116 that holds information) and the data about room positioning and airflow (which is held in the database 3118). In step 3112, the data is analyzed to determine the people and objects' entrance and exit, so that movement between the rooms could be tracked, and based on the movement of the objects, the database 3118 is updated. Finally, at step 3114, the contamination graph 3120 is constructed (e.g. using any one of the methods of FIGS. 16, 19, 20, and 21).

Figure 32:
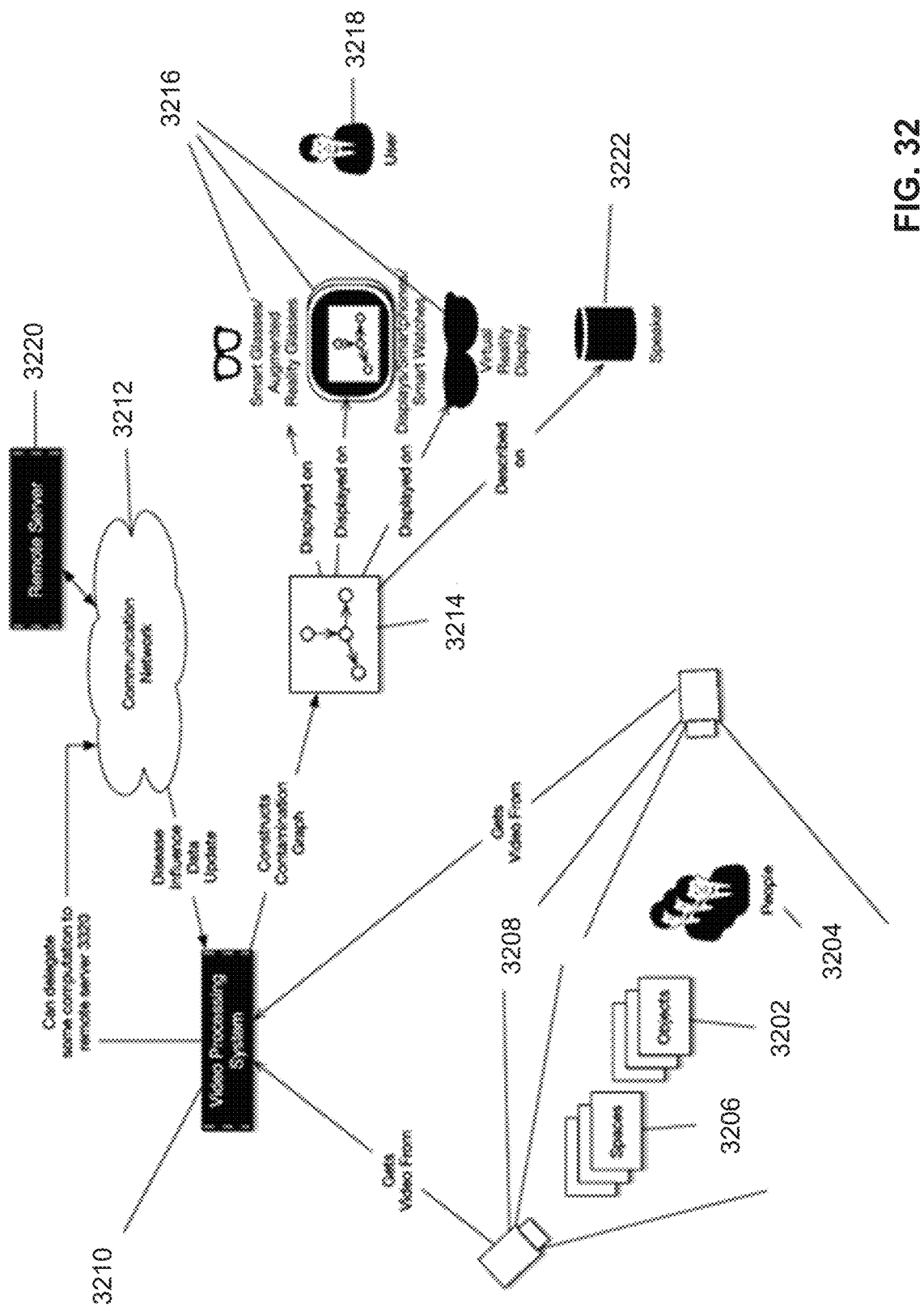
FIG. 32 illustrates an apparatus for tracking contamination travel, in accordance with some embodiments.

FIG. 32 illustrates an apparatus for tracking contamination travel. The contamination graph provides information about what objects/people/spaces are contaminated with which pathogen. To construct the contamination graph, objects 3202 (e.g., medical devices, mobile phones, etc.) and people 3204 reside in various spaces 3206 (e.g., rooms) that are monitored by the video cameras 3208. The video stream from the cameras is examined by the video processing system 3210, which constructs the contamination graph 3214. The video processing system 3210 can delegate part of the work to the remote server 3220 using communication network 3212. Components 3220 and 3210 have data about the disease propagation rules available over local or remote databases and could get "over the air" updates about the new knowledge about the disease propagation using communication network 3212. They (3220 and 3210) also can communicate with each other using the same communication network 3212.

Based on the analysis of the video, the video processing server would construct contamination graph 3214. That contamination graph is then presented to the user 3218 using various display technologies 3216 capable of displaying the contamination area on the screen or integrating an image of the contamination on the top of the video or the picture of the surrounding area. Some examples of this display technologies are flat-screen displays (possibly on the smartwatches and smartphones, on laptops and desktop computers), virtual reality glasses, augmented reality glasses/smart glasses, and other display technologies. The graph could also be described using the voice and other forms of the audio (e.g., high pitch for contaminated areas when you approach them) on the speaker 3222.

Figure 33:
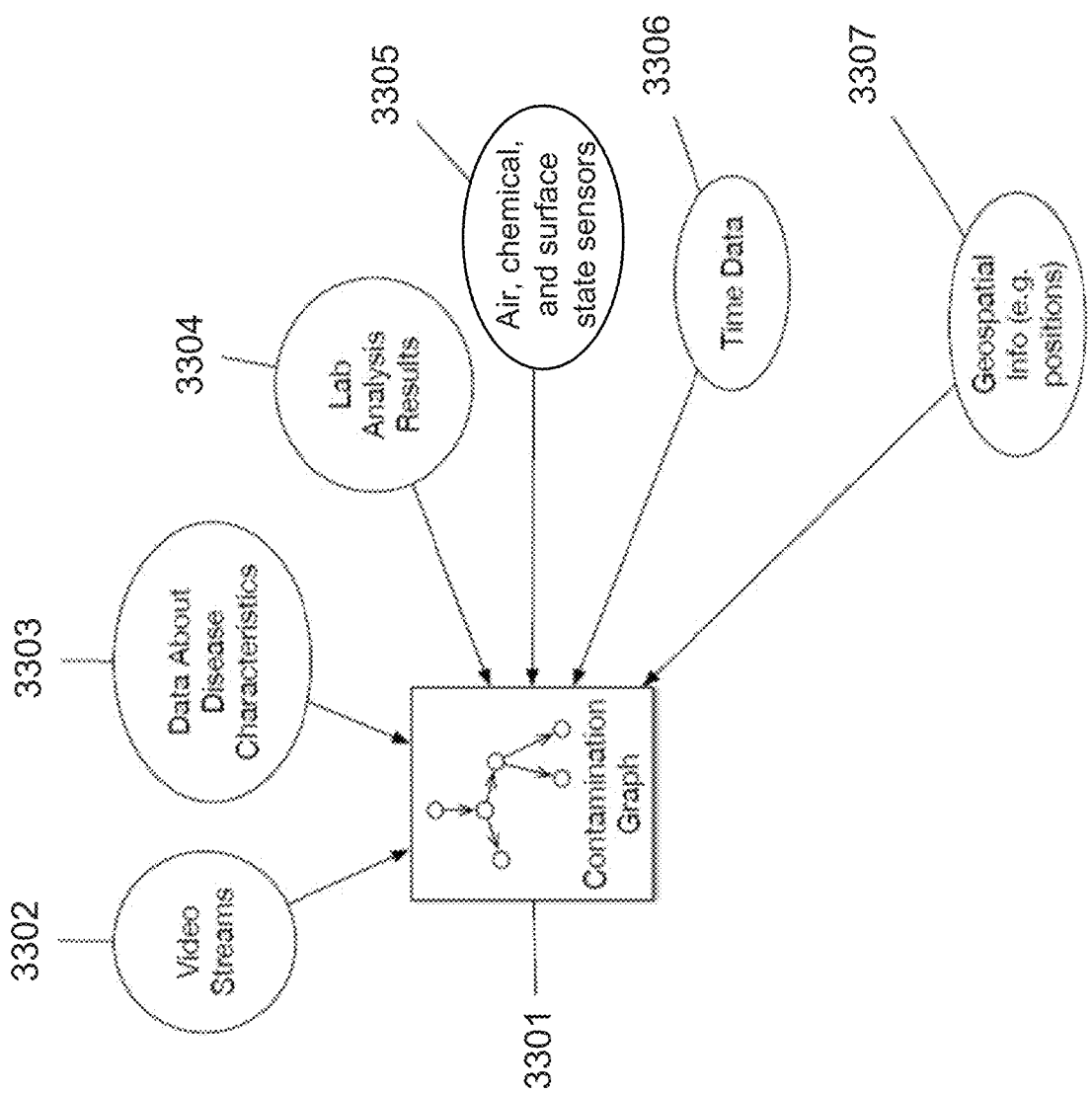
FIG. 33 illustrates data sources to generate a contamination graph, in accordance with some embodiments.

FIG. 33 illustrates data sources to generate a contamination graph. As illustrated, to generate a contamination graph 3301, data may be collected from video streams 3302 (e.g., from video cameras), disease characteristics data 3303, and lab analysis results 3304. Further, data may be collected from air, chemical, and/or surface state sensors 3305, time data 3306 (e.g., when a person entered a room, when the person was added to the contamination graph, etc.), and geospatial information 3307 (e.g., from GPS enabled devices).

FIG. 34 illustrates exemplary attributes of markers including common attributes (3412), such as an offset and presence of an object, and a taxonomy of the markers (3413), which includes data identifying a construction of various shapes for markers in both plane and 3D space. The taxonomy includes shapes such as the straight line between markers (3401), ellipse (3402), parametric curve with the additional info of which parametric curve it is (3403), platonic solid with additional info on which subtype it is (3405), cylinder (3406), cone (3407), rectangle (3408), rectangular prism (3409), parallelogram (3410), and arc (3411). Each of these exemplary shapes encode mathematical parameters necessary to fully describe each shape according to each shapes' standard mathematical definitions. The combination of given shapes allows the description of any shape or object in 3D space. Further, custom markers (3415) can be generated to identify objects, or to identify different types of markers. For example, the identity of an object may be encoded with a custom marker (3415). The type of cleaning solution that must be used on the given surface can also be another type of customer marker (3415). Further, customer markers (3415) can include custom attributes of the surfaces (3415) (including but not limited to how frequently a surface should be cleaned).

Figure 35:
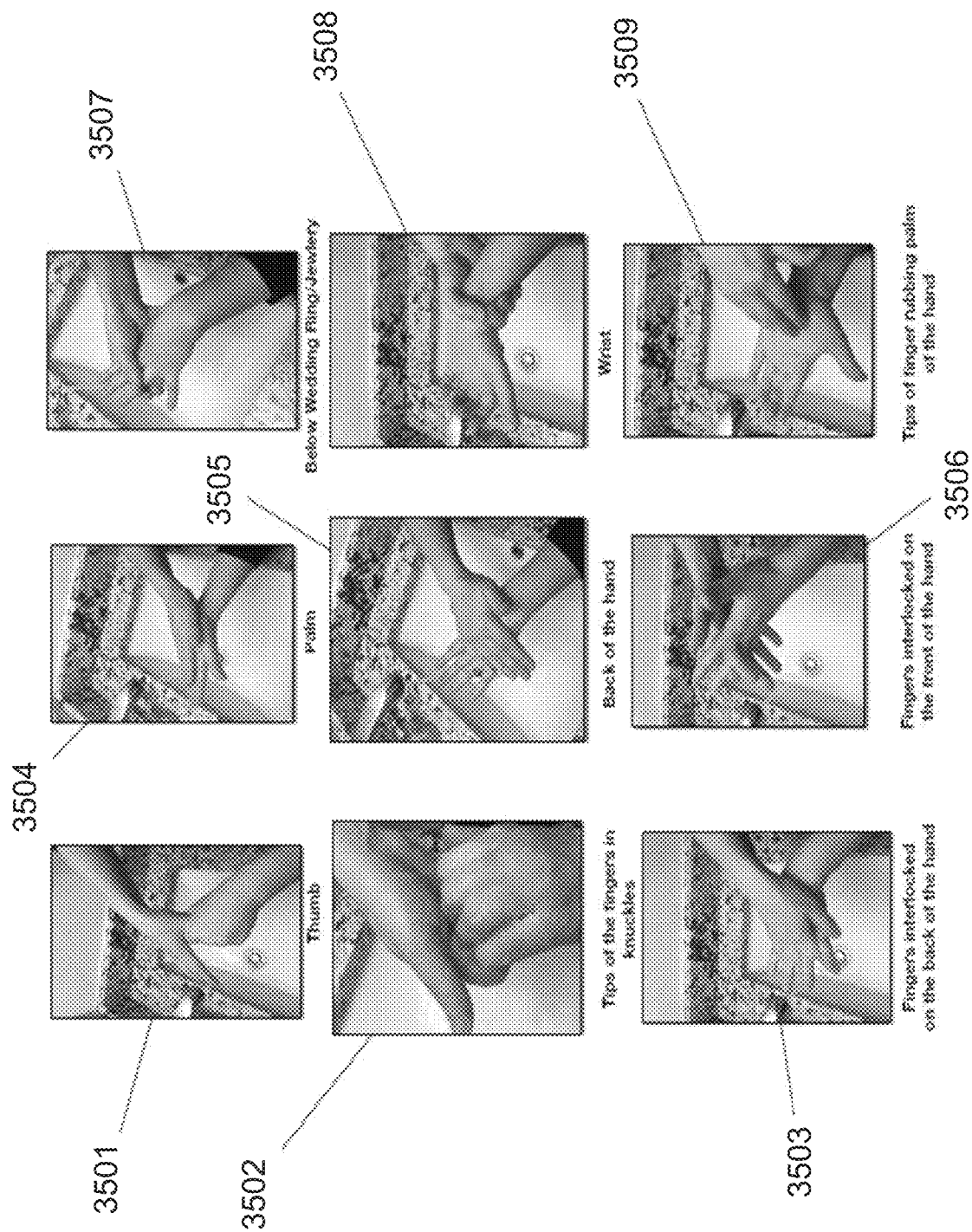
FIG. 35 illustrates proper handwashing moves, in accordance with some embodiments.

FIG. 35 illustrates proper handwashing moves. To correctly perform the handwashing, all hand parts need to be correctly washed (for both hands). That includes various moves for washing thumbs (3501), tips of the finger in the knuckles (3502), space between the fingers on the back side of the hand (3503), palms (3504), back of the hand (3505), space between the fingers on the palm side (3506), space below ring/jewelry (3507), wrist (3508), and rubbing the tips of the finger on palms (3509). Embodiments such as the smart sink of FIG. 25 can recognize that the correct moves were made, for the correct duration, using correct cleaning substances. Further, the smart sink can also recognize that the correct moves were made with the hands moving and rubbing (as opposed to being stationary). While various advanced AI techniques could be used to model precise position of the hands and ensure that there not even a small part of the hand is missed (e.g. that not even a single square mm of palm of the hands is missed in 3502), this is typically not necessary—just assuming previous positions with the hands and rubbing would ensure proper coverage (e.g., due to the anatomical constraints of the human body). For example, it is difficult to miss significant pieces of the palm when you are applying move 3506 as it is a natural physiological move to cover the entire palm area of the hand.

Figure 36:
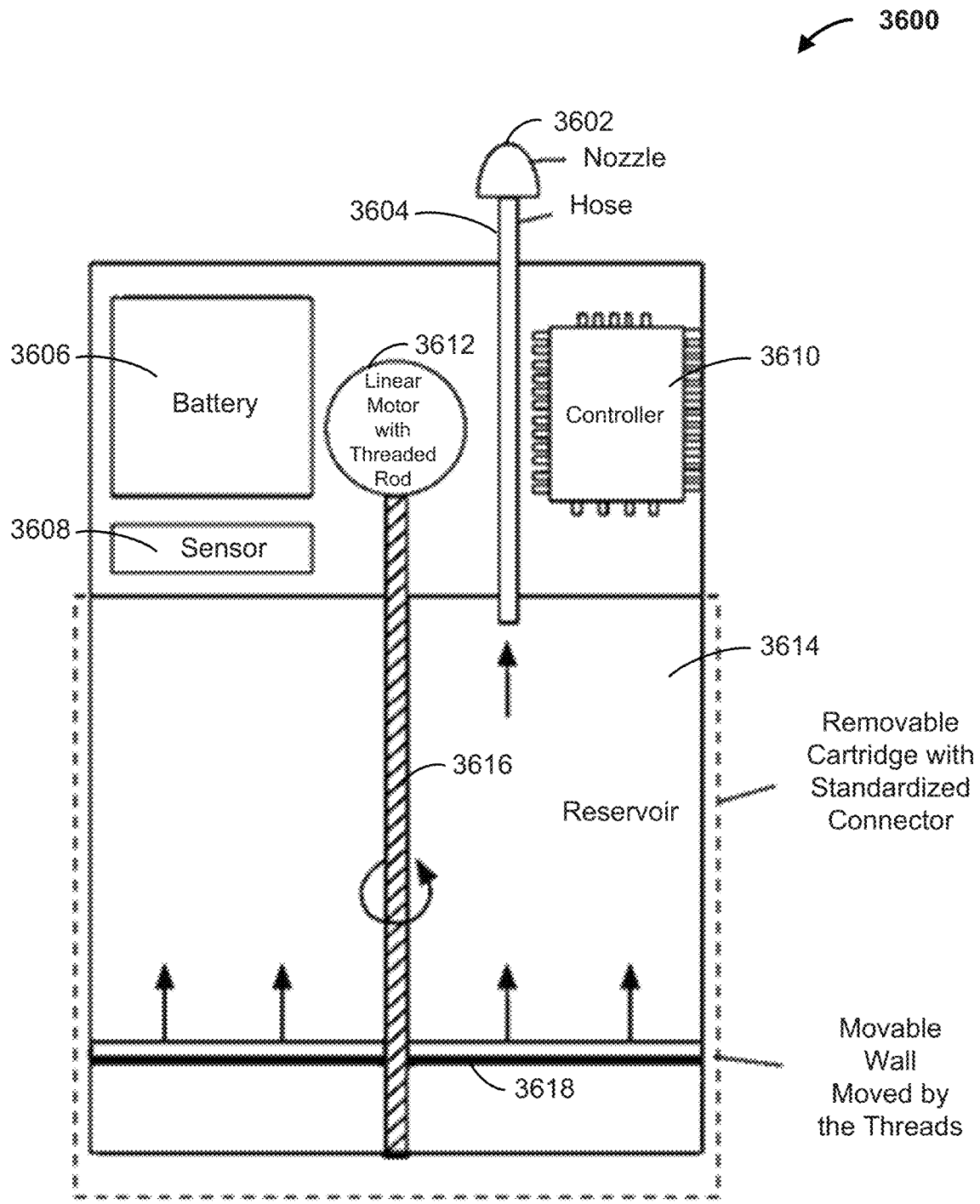
FIG. 36 illustrates another hand sanitation device, in accordance with some embodiments.

FIG. 36 illustrates a hand sanitation device 3600 which can be mounted to a user's hand and can cause the dispensing of sanitizing solution based on detected movements. Hand sanitation device 3600 includes a nozzle 3602 attached to a hose 3604 through which sanitizing solution dispenses. The sanitizing solution is held in a reservoir 3614, which may be removable (e.g., a removable cartridge). Further, hand sanitation device 3600 includes a threaded rod 3616 coupled to a motor 3612 (e.g., linear motor), where the motor 3612 can be controlled by a controller 3610. The controller 3610 may be a processor, such as a microprocessor, for example. The controller 3610 may provide one or more signals to the motor 3612, which causes the thread rod 3616 to turn. In response, a back wall 3618 of reservoir 3614, coupled to thread rod 3616, moves in a direction such as to decrease an inside volume of reservoir 3614 (e.g., towards a front wall of reservoir 3614). Thus, sanitizing solution held with reservoir 3614 is forced through hose 3604 and out through nozzle 3602.

In addition, hand sanitation device 3600 may include one or more sensors 3608 that can detect one or more movements, such as of the user's hand. For example, each sensor may be an accelerometer that can detect an acceleration movement of the user's hand, or a gyroscope that can detect a rotation movement. The sensors 3608 provide one or more signals to controller 3610 and, in response, controller 3610 may cause motor 3612 to turn threaded rod 3616 to dispense sanitizing solution out through nozzle 3602. Battery 3606 can provide power to each of one or more sensors 3608, motor 3612, and controller 3610.

Figure 37:
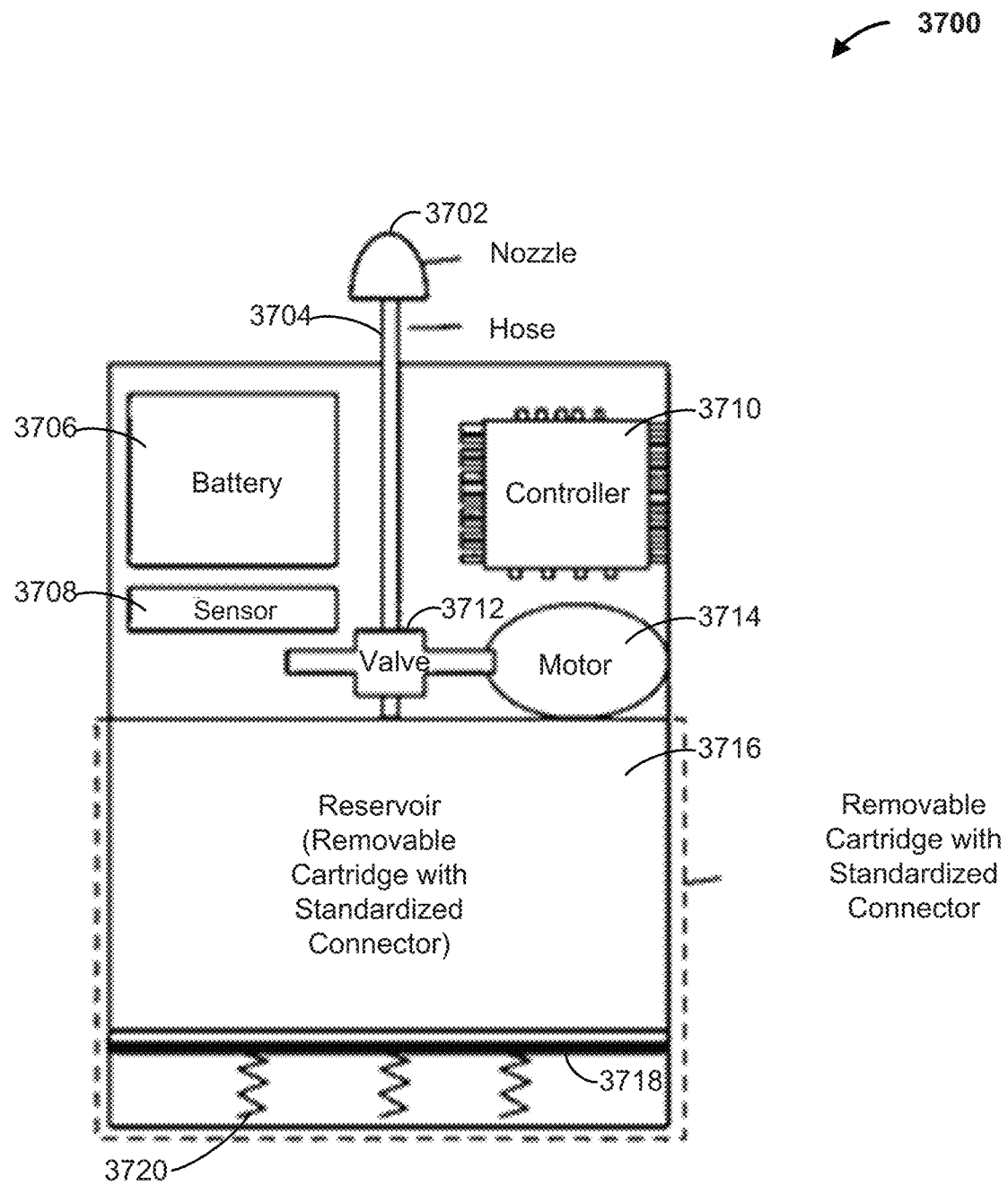
FIG. 37 illustrates yet another hand sanitation device, in accordance with some embodiments

FIG. 37 illustrates a hand sanitation device 3700 which can be mounted to a user's hand and can cause the dispensing of sanitizing solution based on detected movements. In this example, sanitizing solution is also dispensed through a hose 3704, but a valve 3712 controls the flow of the sanitizing solution. For example, opening the valve 3712 allows for flow of the sanitizing solution, and closing the valve 3712 stops the flow. Hand sanitation device 3700 includes a nozzle 3702 attached to the hose 3704 through which the sanitizing solution dispenses. The sanitizing solution is held in a reservoir 3716, which may be removable (e.g., a removable cartridge). Further, hand cleaning device 3700 includes valve 3712 that is coupled to, and can be controlled by, motor 3714. For example, controller 3710 can provide one or more signals to motor 3714 to cause valve 3712 to open or close. As valve 3712 opens, one or more springs 3720 cause a back wall 3718 of the reservoir 3716 to move such as to decrease an inside volume of reservoir 3716, thereby cause dispensing solution to dispense through nozzle 3702. To refill reservoir 3716, the back wall 3718 may be "cocked" back, such as to enlarge the inside volume of the reservoir 3716. For example, a cocking mechanism may consist of a handle connected to the outside surface of the back wall 3718 and a sealed rail through which the handle would move.

In addition, hand sanitation device 3700 includes one or more sensors 3708 that can detect one or more movements, such as of the user's hand. For example, each sensor may be an accelerometer that can detect an acceleration movement of the user's hand, or a gyroscope that can detect a rotation movement. The sensors 3708 provide one or more signals to controller 3710 and, in response, controller 3710 may activate the valve 3712 to dispense sanitizing solution. Battery 3706 can provide power to each of one or more sensors 3708, valve 3712, and controller 3710.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. An apparatus comprising:
   a memory storing instructions; and
   a processor communicatively coupled to the memory and configured to execute the instructions to:
   receive, from at least one camera, a first image of a scene;
   determine, based on the first image, a first location of at least one marker within the scene;
   based on the first location of the at least one marker within the scene, generate boundary data characterizing a boundary of an object within the scene;
   receive, from the at least one camera, a second image of the scene;
   determine, based on the second image, a second location of the at least one marker within the scene;

modify the boundary data based on the second location of the at least one marker; and track a movement of the object based on the modified boundary data.

2. The apparatus of claim 1, wherein the processor is configured to execute the instructions to determine that the tracked movement satisfies at least one predetermined movement based on movement data.

3. The apparatus of claim 2, wherein the processor is configured to execute the instructions to:

provide for displaying a first indication that the object is not cleaned when the at least one predetermined movement has not been satisfied; and provide for displaying a second indication that the object is cleaned when the at least one predetermined movement has been satisfied.

4. The apparatus of claim 1, wherein generating the boundary data comprises applying an image segmentation algorithm to the first image.

5. The apparatus of claim 1, wherein the processor is configured to execute the instructions to detect the at least one marker within the first image, wherein generating the boundary data is based on the at least one marker.

6. The apparatus of claim 1, wherein generating the boundary data comprises:

determining an area of the first image that comprises the at least one marker; and generating the boundary data based on combining the area with the boundary of the object.

7. The apparatus of claim 6, wherein determining the area of the first image that comprises the at least one marker comprises:

generating at least one virtual marker at a location of the first image based on marker configuration data, the market configuration data characterizing the location of the first image in relation to the first location of the at least one marker; and determining the area based on the location of the at least one virtual marker.

8. The apparatus of claim 1 wherein the processor is configured to execute the instructions to:

determine that the tracked movement fails to satisfy at least one predetermined movement based on movement data; and provide for display an indication that the object has not been cleaned.

9. The apparatus of claim 1 wherein the processor is configured to execute the instructions to:

detect a surface in the first image;

determine at least a portion of the surface that coincides with the object; and determine that the at least portion of the surface has been cleansed by the object.

10. The apparatus of claim 9, wherein determining the at least portion of the surface that coincides with the object comprises determining that first pixels of the first image that correspond to the at least portion of the surface coincides with second pixels of the first image that correspond to the object.

11. A method by at least one processor comprising:

receiving, from at least one camera, a first image of a scene;

determining, based on the first image, a first location of at least one marker within the scene;

based on the first location of the at least one marker within the scene, generating boundary data characterizing a boundary of an object within the scene;

receiving, from the at least one camera, a second image of the scene;

determining, based on the second image, a second location of the at least one marker within the scene;

modifying the boundary data based on the second location of the at least one marker; and tracking a movement of the object based on the modified boundary data.

12. The method of claim 11 comprising determining that the tracked movement satisfies at least one predetermined movement based on movement data.

13. The method of claim 12 comprising:

providing for display a first indication that the object is not cleaned when the at least one predetermined movement has not been satisfied; and providing for display a second indication that the object is cleaned when the at least one predetermined movement has been satisfied.

14. The method of claim 11, wherein generating the boundary data comprises applying an image segmentation algorithm to the first image.

15. The method of claim 11 comprising detecting the at least one marker within the first image, wherein generating the boundary data is based on the at least one marker.

16. A non-transitory, computer readable medium comprising instructions stored thereon, wherein the instructions, when executed by at least one processor, cause the at least one process to perform operations comprising:

receiving, from at least one camera, an image of a scene;

determining, based on the first image, a first location of at least one marker within the scene;

based on the first location of the at least one marker within the scene, generating boundary data characterizing a boundary of an object within the scene;

receiving, from the at least one camera, a second image of the scene;

determining, based on the second image, a second location of the at least one marker within the scene;

modifying the boundary data based on the second location of the at least one marker; and tracking a movement of the object based on the modified boundary data.

17. The non-transitory, computer readable medium of claim 16, wherein the performed operations comprise determining that the tracked movement satisfies at least one predetermined movement based on movement data.

18. The non-transitory, computer readable medium of claim 16, wherein the performed operations comprise:

providing for display a first indication that the object is not cleaned when the at least one predetermined movement has not been satisfied; and providing for display a second indication that the object is cleaned when the at least one predetermined movement has been satisfied.

19. The non-transitory, computer readable medium of claim 16, wherein the performed operations comprise applying an image segmentation algorithm to the first image to generate the boundary data.

20. The non-transitory, computer readable medium of claim 16, wherein the performed operations comprise detecting the at least one marker within the first image, wherein generating the boundary data is based on the at least one marker.

21. An apparatus comprising:

a memory storing instructions; and a processor communicatively coupled to the memory and configured to execute the instructions to:

receive a first image and a second image from a camera directed to a sink;

apply a computer vision algorithm to the first image and, based on the application of the computer vision algorithm to the first image, determine a first location of a hand;

apply the computer vision algorithm to the second image and, based on the application of the computer vision algorithm to the second image determine a second location of the hand;

determine a hand movement is satisfied based on the first location of the hand, the second location of the hand, and hand movement data characterizing the hand movement;

generate hand status data characterizing whether the hand is sanitized based on the hand movement; and store the hand status data in a data repository.

22. The apparatus of claim 21, wherein determining the hand movement is satisfied comprises determining a first orientation of the hand based on the first image, a second orientation of the hand based on the second image, and comparing the first orientation of the hand to the second orientation of the hand.

23. An apparatus comprising:

a memory storing instructions; and a processor communicatively coupled to the memory and configured to execute the instructions to:

receive a first image of a room;

apply a computer vision algorithm to the first image and, based on applying the computer vision algorithm to the first image, determine a first location of a first object in the room;

receive a second image of the room;

apply the computer vision algorithm to the second image and, based on applying the computer vision algorithm to the second image, determine a second location of a second object in the room;

determine a distance between the first location of the first object and the second location of the second object;

compare the distance to a predetermined threshold and, based on the comparison, determine the distance is below the predetermined threshold;

based on determining that the distance is below the predetermined threshold, determine the first object has contaminated the second object;

based on determining that the first object has contaminated the second object, generate contamination graph data characterizing that the first object has contaminated the second object; and store the contamination graph data in a database.

24. The apparatus of claim 23, wherein determining the first object has contaminated the second object comprises determining the first object has touched the second object.

25. The apparatus of claim 23, wherein the predetermined threshold is an interpersonal distance.

26. The apparatus of claim 25, wherein the predetermined threshold is an airflow distance between the first object and the second object.

* * * * *